US010536396B2

(12) United States Patent
Miller

(10) Patent No.: US 10,536,396 B2
(45) Date of Patent: *Jan. 14, 2020

(54) TECHNIQUES FOR DYNAMICALLY ALLOCATING RESOURCES IN A STORAGE CLUSTER SYSTEM

(71) Applicant: NetApp Inc., Sunnyvale, CA (US)

(72) Inventor: Evan Miller, Sunnyvale, CA (US)

(73) Assignee: NetApp Inc., Sunnyvale, CA (US)

( * ) Notice: Subject to any disclaimer, the term of this patent is extended or adjusted under 35 U.S.C. 154(b) by 155 days.

This patent is subject to a terminal disclaimer.

(21) Appl. No.: 15/820,818

(22) Filed: Nov. 22, 2017

(65) Prior Publication Data

US 2018/0109467 A1 Apr. 19, 2018

Related U.S. Application Data

(63) Continuation of application No. 14/744,522, filed on Jun. 19, 2015, now Pat. No. 9,843,536.

(Continued)

(51) Int. Cl.
*H04L 12/927* (2013.01)
*H04L 29/08* (2006.01)
*H04L 12/815* (2013.01)

(52) U.S. Cl.
CPC .......... *H04L 47/805* (2013.01); *H04L 47/225* (2013.01); *H04L 67/1008* (2013.01); *H04L 67/1097* (2013.01); *H04L 67/2823* (2013.01)

(58) Field of Classification Search
CPC ..... H04L 47/805; H04L 47/70; H04L 47/225; H04L 47/2408; H04L 47/6275;

(Continued)

(56) References Cited

U.S. PATENT DOCUMENTS 7,827,361 B1 * 11/2010 Karlsson ............... G06F 9/5083
709/212
8,725,941 B1 5/2014 Gilboa et al.
(Continued)

OTHER PUBLICATIONS

Rickard Nobel, "Storage performance: IOPS, latency and throughput," May 2011, rickardnobel.se, rickardnobel.se/storage-performance-iops-latency-throughput/ (Year: 2011).*

(Continued)

*Primary Examiner* — Ruolei Zong
(74) *Attorney, Agent, or Firm* — Cooper Legal Group, LLC

(57) ABSTRACT

Various embodiments are directed to techniques for dynamically adjusting a maximum rate of throughput for accessing data stored within a volume of storage space of a storage cluster system based on the amount of that data that is stored within that volume. An apparatus includes an access component to monitor an amount of client data stored within a volume defined within a storage device coupled to a first node, and to perform a data access command received from a client device via a network to alter the client data stored within the volume; and a policy component to limit a rate of throughput at which at least the client data within the volume is exchanged as part of performance of the data access command to a maximum rate of throughput, and to calculate the maximum rate of throughput based on the stored amount.

20 Claims, 26 Drawing Sheets

Related U.S. Application Data

(60) Provisional application No. 62/121,716, filed on Feb. 27, 2015.

(58) Field of Classification Search
CPC ............... H04L 47/781; H04L 67/1008; H04L 67/1097; H04L 67/2823; G06F 3/067; G06F 3/0653; G06F 3/0613; G06F 3/061
USPC ....................................................... 709/217
See application file for complete search history.

(56) References Cited

U.S. PATENT DOCUMENTS

| 8,793,334 | B1 | 7/2014 | Bathija | |
|---|---|---|---|---|
| 2004/0243692 | A1* | 12/2004 | Arnold | G06F 9/5016 709/220 |
| 2006/0090163 | A1* | 4/2006 | Karisson | G06F 11/3409 718/105 |
| 2008/0301255 | A1 | 12/2008 | He et al. | |
| 2009/0222569 | A1* | 9/2009 | Frick | G06F 16/10 709/230 |
| 2010/0161759 | A1* | 6/2010 | Brand | H04L 67/1097 709/218 |
| 2012/0330954 | A1* | 12/2012 | Sivasubramanian | G06F 9/5061 707/737 |
| 2013/0159255 | A1 | 6/2013 | Kaga et al. | |
| 2014/0297781 | A1 | 10/2014 | Brand | |

OTHER PUBLICATIONS

Anonymous, "How the maximum throughput limit works," Apr. 2014, NetApp, library.netapp.conn/ecmdocs/ECMP1354558/html/GUID-A039BD33-966A-4EFA-B97E-F1218EAA0CB0.htnnl (Year: 2014).*

Non-Final Office Action cited in U.S. Appl. No. 14/744,522 dated Mar. 22, 2017, 17 pgs.

Reply Non-Final Office Action cited in U.S. Appl. No. 14/744,522 dated Jun. 19, 2017, 13 pgs.

Notice of Allowance cited in U.S. Appl. No. 14/744,522 dated Aug. 16, 2017, 14 pgs.

Amendment after Notice of Allowance cited in U.S. Appl. No. 14/744,522 dated Nov. 9, 2017, 11 pgs.

* cited by examiner

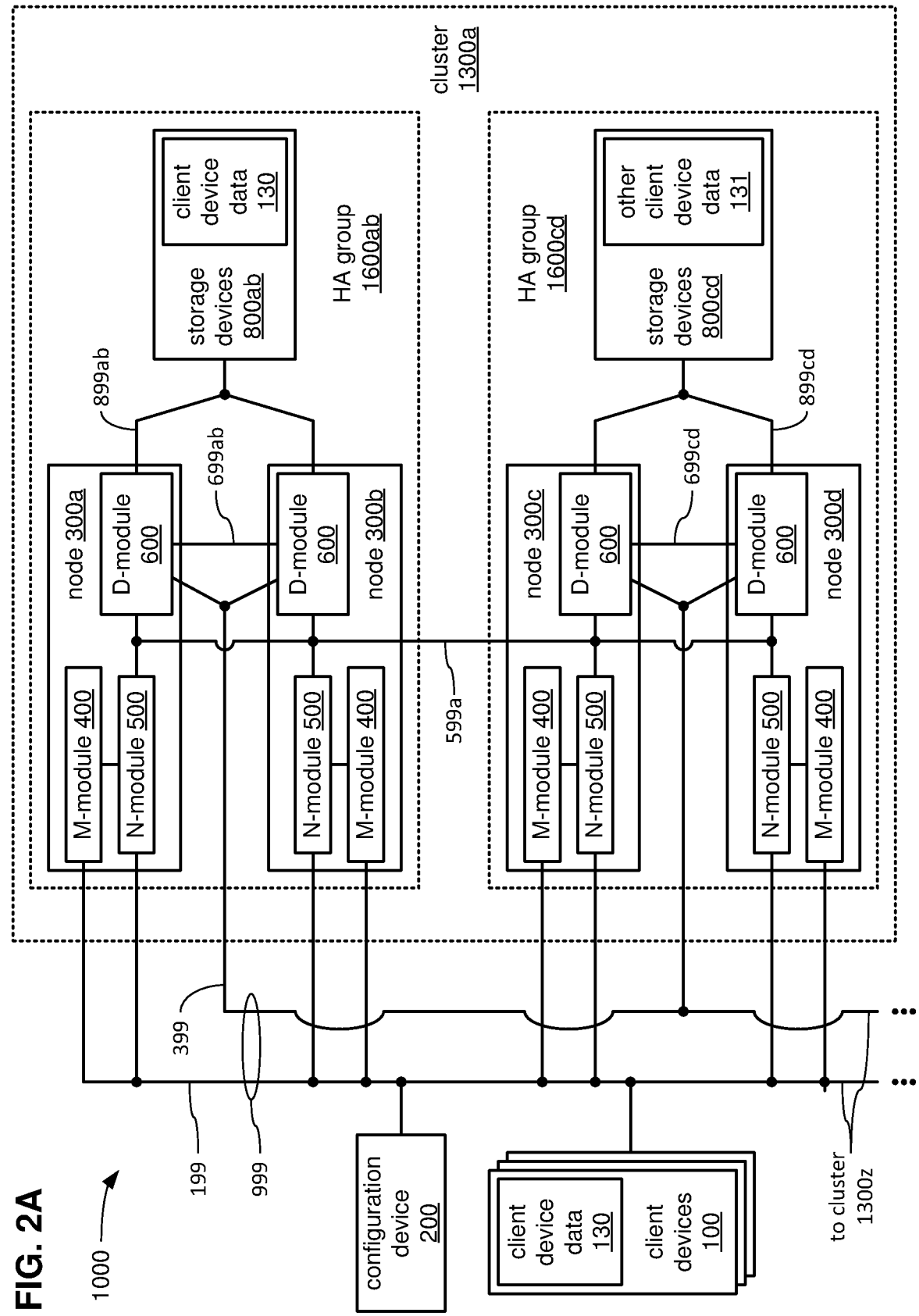

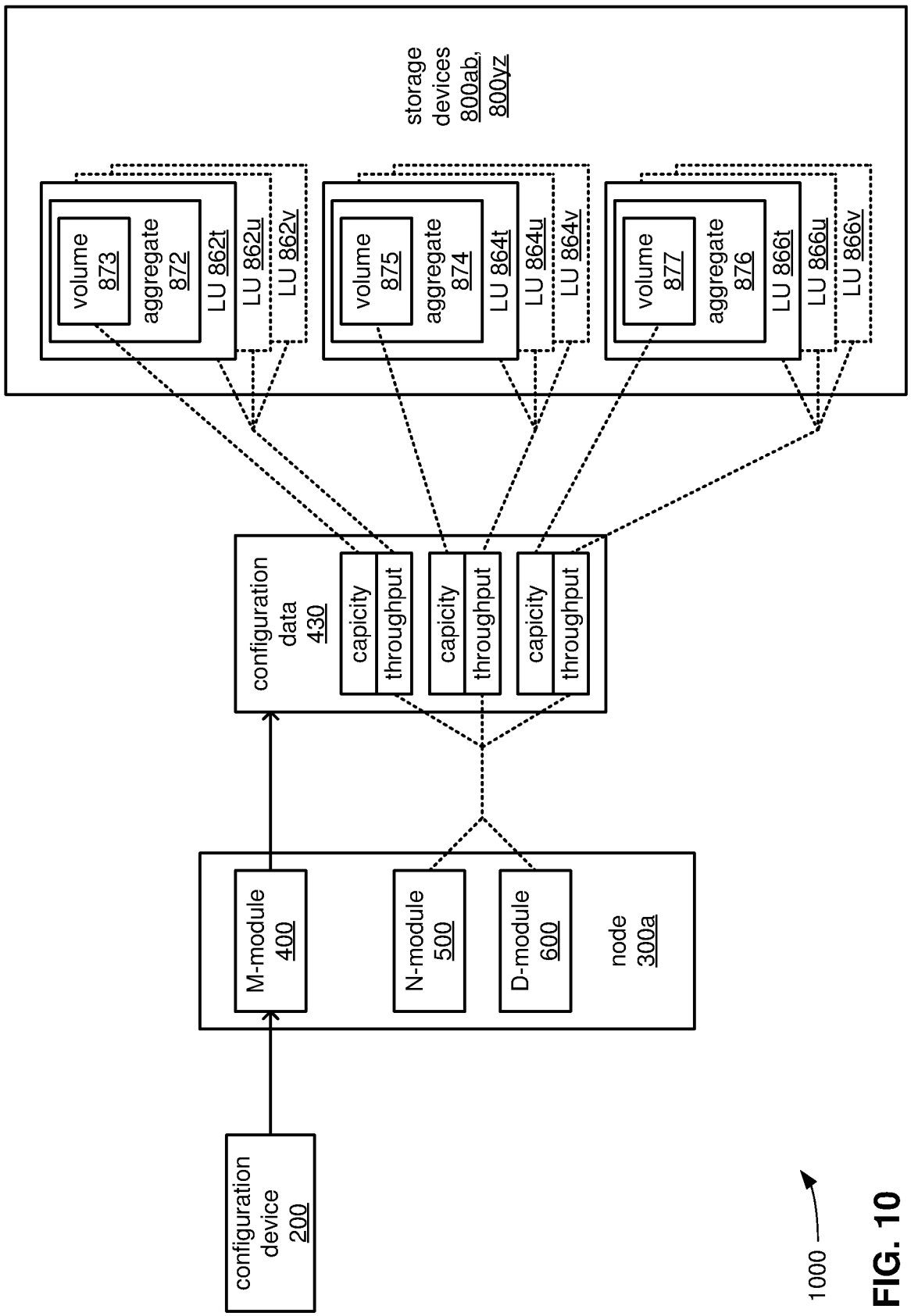

TECHNIQUES FOR DYNAMICALLY ALLOCATING RESOURCES IN A STORAGE CLUSTER SYSTEM

CROSS-REFERENCE TO RELATED APPLICATIONS

This application claims priority to and is a continuation of U.S. patent application Ser. No. 14/744,522 filed on Jun. 19, 2015 and titled "TECHNIQUES FOR DYNAMICALLY ALLOCATING RESOURCES IN A STORAGE CLUSTER SYSTEM," which claims priority to U.S. Provisional Application 62/121,716, filed on Feb. 27, 2015 and titled "TECHNIQUES FOR DYNAMICALLY ALLOCATING RESOURCES IN A STORAGE CLUSTER SYSTEM," which are incorporated herein by reference.

BACKGROUND

Remotely accessed storage cluster systems may provide storage services in support of multiple applications simultaneously in which each of the applications may have widely different storage requirements. For example, one application may require the provision of a relatively large quantity of storage space with relatively modest throughput requirements, while another application may require the provision of relatively high throughput with relatively small capacity requirements. Still other variations of such storage requirements may be imposed by still other applications as those skilled in the art will readily appreciate.

Efforts to provide storage cluster systems capable of simultaneously satisfying such wide variations in storage requirements have often resulted in relatively imprecise selection and oversight of components of storage cluster systems. This often leads to either costly overprovision of or unforeseen underperformance in capacity and/or throughput provided for one or more applications. As a result, as different ones of multiple applications are put to varying degrees of use over time, the quality of service provided to one or more of those applications may vary unpredictably.

BRIEF DESCRIPTION OF THE DRAWINGS

FIG. 2A illustrates an example embodiment of a pair of high availability groups of a cluster.

FIG. 10 illustrates an example embodiment of configuration data.

DETAILED DESCRIPTION

Figure 1:
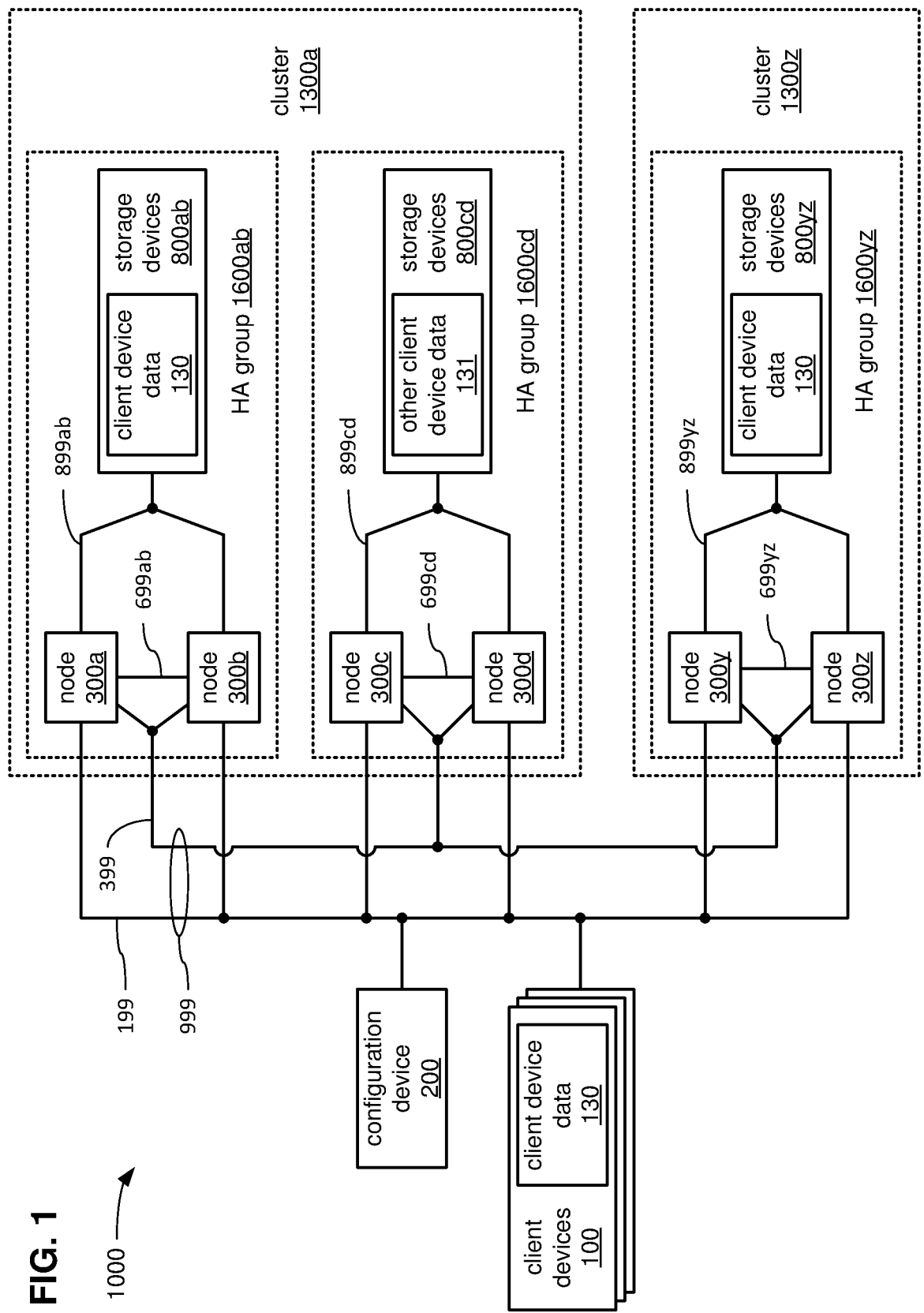
FIG. 1 illustrates an example embodiment of a storage cluster system.

Various embodiments are generally directed to techniques for dynamically adjusting a maximum rate of throughput for accessing data stored within a volume of storage space of a storage cluster system based on the amount of that data that is stored within that volume. The maximum rate of throughput for access through a node of a storage cluster system to client data stored within a volume may be specified in configuration data provided to the node as a ratio between a maximum rate of throughput and the amount of data stored within that volume. The amount of data that is stored within that volume may be recurringly determined and used in a calculation employing the ratio to dynamically adjust the maximum rate of throughput for accessing the data. Enacting the maximum rate of throughput may entail limiting the translation and/or performance of storage service requests received by the node from one or more client devices.

Correlating the rate of throughput allowed by a node for accessing the stored data to the amount of data stored may be deemed a desirable approach to implementing a quality of service (QoS) policy for accessing data stored in a storage cluster system based on a presumption that the frequency with which data is accessed is generally related to the amount that exists to be accessed. In other words, the more data there is stored within a volume, the more likely the data needs to be accessed, and therefore, the greater the frequency with which the data is likely to be accessed and the greater the maximum rate of throughput for accessing it that should be supported.

In a storage cluster system, multiple nodes may be grouped into two or more clusters that may each be made up of one or more high availability (HA) groups of nodes. The two or more clusters may be positioned at geographically distant locations and may be coupled via one or more interconnects extending through networks such as the Internet or dedicated leased lines. A single node of a HA group of each cluster may be an active node that communicates with the other(s) via an active communications session to exchange replicas of data access commands to enable at least partially parallel performance of those data access commands to synchronize the state of the client data between their HA groups. Further, one of those active nodes may additionally communicate with one or more client devices to receive requests for storage services and to translate those requests into the data access commands that may be replicated for such at least partially parallel performance. Within each HA group, at least one other node may be an inactive node partnered with the active node and prepared via duplication of metadata among the nodes within the HA group to take over for the active node in response to an error.

Thus, to provide at least some degree of fault tolerance, a volume of client data that is stored within the storage cluster system may be stored within more than one set of storage devices, with each set operated under the control of the active node of a different HA group. Such active nodes may cooperate to maintain such multiple copies of the volume of client data in the same state across each of the sets of storage devices in which a copy of the volume of client data is stored such that all of those copies are up to date mirrors of each other. Thus, the amount of the client data stored in each of such copies should remain the same such that the amount of the client data that is stored should be accurately measurable using any of those copies of that volume.

Each of the nodes may include one or more of each of a management module (Management module), a network protocol module (Network module) and a data storage module (Disk module). The Management module may couple an active node to a client interconnect and/or a configuration interconnect to provide one or more client devices and/or a configuration device a mechanism to configure at least a portion of the storage cluster system. As one mechanism to configure at least a portion of the storage cluster system, the Management module may accept configuration data specifying maximum rates of throughput and/or maximum storage capacities for one or more volumes from the configuration device. Such a configuration device may visually present various assortments of components from which may be selected one or more sets of components to make up some or all of the storage cluster system, and an assortment of levels of QoS that the storage cluster system may be configured to provide. As selections are made, the configuration device may provide visual feedback concerning whether the selections of components made thus far will be capable of supporting the provision of one or more selected levels of QoS. Upon completion of the making of such selections, the configuration device may generate configuration data made up at least of indications of one or more levels of QoS of a QoS policy that are to be provided for each of one or more volumes of client data to be stored by the storage cluster system. The configuration device may transmit such configuration data to an active node of at least one of the HA groups of the storage cluster system to configure the storage cluster system with such indications.

The Network module may couple an active node to the client interconnect to receive requests for storage services from the one or more client devices, and may translate a storage services request into at least one data access command. The Network module may also recurringly perform a calculation by which a maximum rate of throughput for access to client data stored within a volume is recurringly derived based on the amount of client data that is stored within that volume, and then the Network module may act to limit the rates of throughput for accessing that volume by the client devices to the maximum rate of throughput most recently calculated.

The Disk module may be coupled to the Network module to receive the at least one data access command therefrom, and to then perform the at least one data access command such that the Disk module may store or modify client data within a volume, and/or retrieve client data therefrom. The Disk module may also couple a node to the one or more storage devices that store volume(s) within which client data is stored and from which client data may be retrieved. Individual ones of those storage devices and/or groups of those storage devices may be designated and treated by the Disk module as logical units (LUs). The Disk module of an active node may define an aggregate within the storage space provided by a single LU or a group of LUs, and may define one or more volumes within the storage space of that aggregate. The client data may be stored within one or more volumes that may be defined within one or more aggregates.

Thus, there may be multiple volumes in which client data may be stored, and each of those volumes may be subject to a separate maximum rate of throughput to be enacted by the Network module based on the amount of client data stored within each. This may be done as part of providing specified level(s) of QoS for each such volume in the configuration data. In support of the recurring performance of calculation(s) by the Network module to recurringly derive a maximum rate of throughput for each volume, the Disk module may monitor the amount of client data stored within each volume and may recurringly provide the Network module with indication(s) of those amounts. Also, an amount of extra storage space may also be defined within an aggregate to allow for at least a temporary expansion of a volume to accommodate an instance of the amount of client data stored within that volume at least temporarily exceeding a specified maximum amount of storage space that may be allocated to that volume.

In some embodiments, the Disk module may additionally implement any of a variety of known types of deduplication to reduce the amount of storage space occupied by client data by identifying multiple blocks of client data that are identical to each other such that the Disk module may store only a single block within the volume that represents all of the identified identical multiple blocks. In such embodiments, the amount of client data indicated by the Disk module to the Network module as having been stored within a volume may be the amount of client data represented by the de-duplicated form of the client data that is actually stored within that volume, rather than the amount of storage space within the volume taken up by that client data in a form in which it has been subjected to deduplication.

As a result of accommodating expansion of a volume to allow more storage space to store client data and/or implementing deduplication to enable storage of more client data within the storage space of a volume without expanding it, the amount of client data indicated as stored within a volume to the Network module may result in a maximum rate of throughput for accessing the client data within that volume that cannot be supported by the Network module and/or another component of a node. To address this, the configuration data received by a node of the storage cluster system may specify an absolute maximum rate of throughput that is not to be exceeded for one or more volumes, regardless of the amount of client data stored within any of those one or more volumes. Alternatively or additionally, a priority ordering of the volumes and/or some other aspect of QoS policy may be incorporated into the configuration data that specifies which volume(s) are to have their maximum rate(s) of throughput reduced, and in what order and/or to what degree to accommodate limitations on the overall rate of throughput imposed by one or more components of a node.

In addition to performing a data access command received from the Network module, the Disk module of one active node of a first HA group may replicate the data access command and transmit the resulting replica of that data access command to another Disk module of another active node of a second HA group to enable at least partially parallel performance of the data access command by the Disk modules of the two active nodes. Such transmission of a replica data access command may be performed via an inter-cluster interconnect that may extend through the same network through which the client interconnect may extend. The Disk module of that other node may reply to the transmission of the replica data access command with an indication of success or failure in the performance of the replica data access command.

Further, the Disk module of at least one inactive node of each of the first and second HA groups may monitor the status of at least the Disk module of the active node in that HA group for an indication of failure within that active node. Within each of the first and second HA groups, such monitoring may entail an exchange of signals between the active node and the at least one inactive node on a recurring basis in which the lack of receipt of a signal within an expected period of time may be taken as an indication of failure. Alternatively or additionally, such monitoring may entail an exchange of signals providing an explicit indication of status of performance of a data access command and/or status of a component of a node (e.g., the status of a Management module or a Network module). In response to an indication of a failure of the active node of one of the first or second HA groups, an inactive node of that HA group may effect a takeover of that active node in which that inactive node takes over the communications that were performed by that active node and/or takes over participation by that active node in at least partial parallel performance of data access commands.

Thus, determinations of what is the maximum overall rate of throughput that a node is able to support may need to take into account the processing and/or memory resources required to perform replication of data access commands and/or exchanging of the resulting replica data access commands to enable such partial parallel performance of data access commands. Alternatively or additionally, determinations of what is the maximum overall rate of throughput that a node is able to support may need to take into account the processing and/or memory resources required to engage in the exchange of signals required to effect such monitoring of status in preparation for responding to a failure within a node. In some embodiments, the configuration device may take such considerations into account as selections of components and/or levels of QoS are selected.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of an example embodiment of a storage cluster system 1000 incorporating one or more client devices 100, a configuration device 200, and/or one or more clusters, such as the depicted clusters 1300a and 1300z. As depicted, the cluster 1300a may incorporate one or more of nodes 300a-d and sets of storage devices 800ab and 800cd, and the cluster 1300z may incorporate one or more of nodes 300y-z and a set of storage devices 800yz. As further depicted, the cluster 1300a may include a HA group 1600ab incorporating the nodes 300a-b as partners and the set of storage devices 800ab. The cluster 1300a may also include a HA group 1600cd incorporating the nodes 300c-d as partners and the set of storage devices 800cd. Correspondingly, the cluster 1300z may include a HA group 1600yz incorporating the nodes 300y-z as partners and the set of storage devices 800yz.

In some embodiments, the clusters 1300a and 1300z may be positioned at geographically distant locations to enable a degree of redundancy in storing and retrieving client data 130 provided by one or more of the client devices 100 for storage. Such positioning may be deemed desirable to enable continued access to the client data 130 by one or more of the client devices 100 and/or the configuration device 200 despite a failure or other event that may render one or the other of the clusters 1300a or 1300z inaccessible thereto. As depicted, one or both of the clusters 1300a and 1300z may additionally store other client data 131 that may be entirely unrelated to the client data 130.

The formation of the HA group 1600ab with at least the two nodes 300a and 300b partnered to share access to the set of storage devices 800ab may enable a degree of fault tolerance in accessing the client data 130 as stored within the set of storage devices 800ab by enabling one of the nodes 300a-b in an inactive state to take over for its partner in an active state (e.g., the other of the nodes 300a-b) in response to an error condition within that active one of the nodes 300a-b. Correspondingly, the formation of the HA group 1600yz with at least the two nodes 300y and 300z partnered to share access to the set of storage devices 800*yz* may similarly enable a degree of fault tolerance in accessing the client data 130 as stored within the set of storage devices 800*yz* by similarly enabling one of the nodes 300*y-z* in an inactive state to similarly take over for its partner in active state (e.g., the other of the nodes 300*y-z*).

As depicted, any active one of the nodes 300*a-d* and 300*y-z* may be made accessible to the client devices 100 and/or the configuration device 200 via a client interconnect 199. As also depicted, the nodes 300*a-d* and 300*y-z* may be additionally coupled via an inter-cluster interconnect 399. In some embodiments, the interconnects 199 and 399 may both extend through the same network 999. Each of the interconnects 199 and 399 may be implemented as virtual private networks (VPNs) defined using any of a variety of network security protocols through the network 999. The network 999 may be a single network limited to extending within a single building or other relatively limited area, may include a combination of connected networks extending a considerable distance, and/or may include the Internet. As an alternative to coexisting within the same network 999, the interconnects 199 and 399 may be implemented as entirely physically separate networks. By way of example, the client interconnect 199 may extend through the Internet to enable the client devices 100 and/or the configuration device 200 to be positioned at geographically diverse locations, while the inter-cluster interconnect 399 may extend through a leased line between the two geographically distant locations at which each of the clusters 1300*a* and 1300*z* are positioned.

As depicted, the partnered nodes within each of the HA groups 1600*ab*, 1600*cd* and 1600*yz* may be additionally coupled via HA interconnects 699*ab*, 699*cd* and 699*yz*, respectively. As also depicted, the nodes within each of the HA groups 1600*ab*, 1600*cd* and 1600*yz* may be coupled to the sets of storage devices 800*ab*, 800*cd* and 800*yz* in a manner enabling shared access via storage interconnects 899*ab*, 899*cd* and 899*yz*, respectively. The partnered nodes and set of storage devices making up each of the HA groups 1600*ab*, 1600*cd* and 1600*yz* may be positioned within relatively close physical proximity to each other such that the interconnects 699*ab*, 899*ab*, 699*cd*, 899*cd*, 699*yz* and 899*yz* may each traverse a relatively short distance (e.g., extending within a room and/or within a cabinet).

More broadly, the network 999 and/or one or more of the interconnects 199, 399, 699*ab*, 699*cd* and 699*yz* may be based on any of a variety (or combination) of communications technologies by which signals may be exchanged, including without limitation, wired technologies employing electrically and/or optically conductive cabling, and wireless technologies employing infrared, radio frequency or other forms of wireless transmission. Each of the interconnects 899*ab*, 899*cd* and 899*yz* may be based on any of a variety of widely known and used storage interface standards, including and not limited to, SCSI, serially-attached SCSI (SAS), Fibre Channel, etc.

It should be noted that despite the depiction of specific quantities of clusters and nodes within the storage cluster system 1000, other embodiments are possible that incorporate different quantities of clusters and nodes. Similarly, despite the depiction of specific quantities of HA groups and nodes within each of the clusters 1300*a* and 1300*z*, other embodiments are possible that incorporate differing quantities of HA groups and nodes. Further, although each of the HA groups 1600*ab*, 1600*cd* and 1600*yz* is depicted as incorporating a pair of nodes 300*a-b*, 300*c-d* and 300*y-z*, respectively, other embodiments are possible in which one or more of the HA groups 1600*ab*, 1600*cd* and 1600*yz* may incorporate more than two nodes.

Figure 2B:
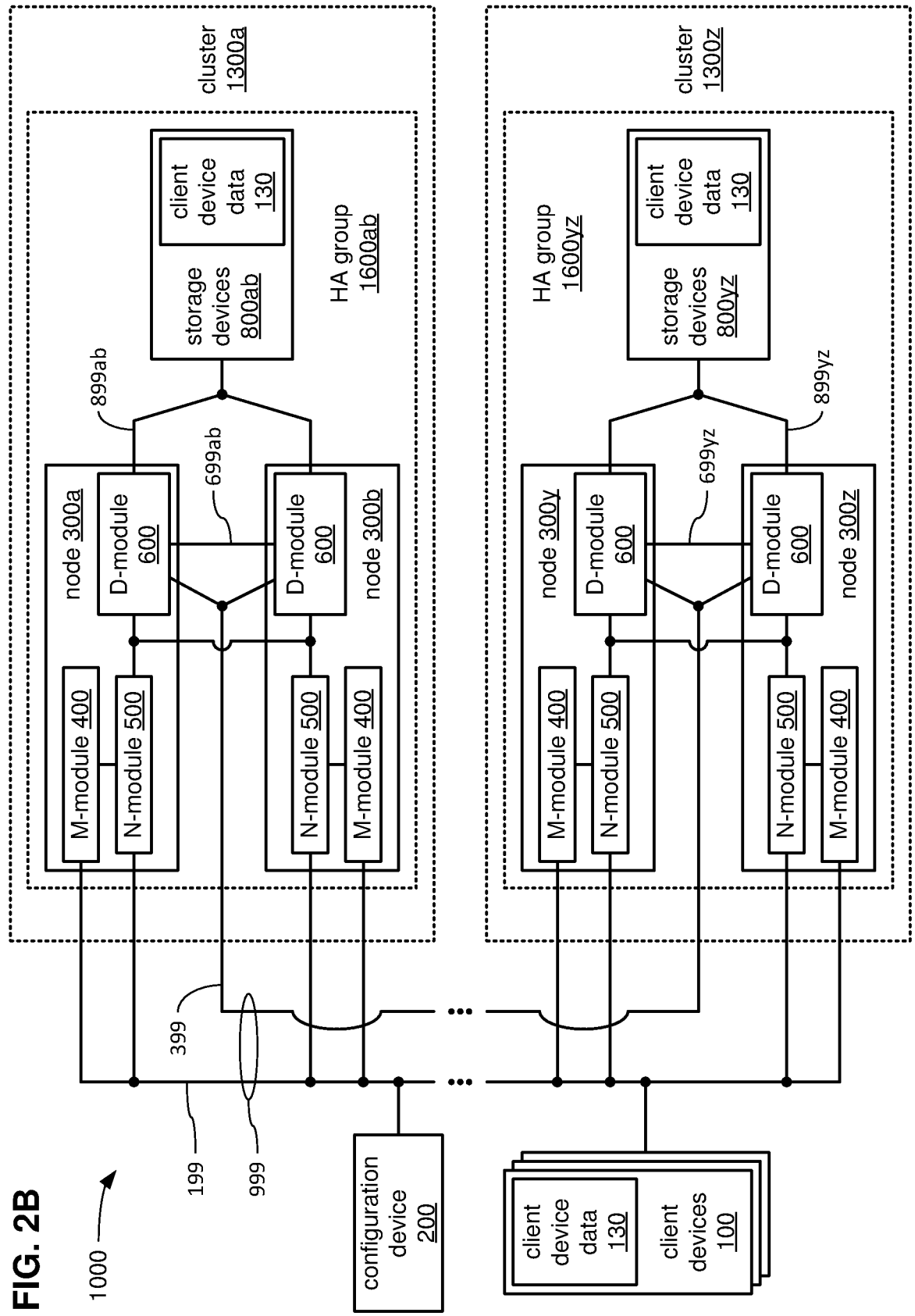
FIG. 2B illustrates an example embodiment of a pair of high availability groups of different clusters.

FIGS. 2A and 2B each illustrate a block diagram of an example portion of the storage cluster system 1000 in greater detail. More specifically, FIG. 2A depicts aspects of the nodes 300*a-d* and interconnections thereamong within the cluster 1300*a* in greater detail. FIG. 2B depicts aspects of the interconnections among the nodes 300*a-b* and 300*y-z*, including interconnections extending between the clusters 1300*a* and 1300*z*, in greater detail.

Referring to both FIGS. 2A and 2B, each of the nodes 300*a-d* and 300*y-z* may incorporate one or more of a Management module 400, a Network module 500 and a Disk module 600. As depicted, each of the Management modules 400 and the Network modules 500 may be coupled to the client interconnect 199, by which each may be accessible to one or more of the client devices 100 and/or the configuration device 200. The Management module 400 of one or more active ones of the nodes 300*a-d* and 300*y-z* may cooperate with the configuration device 200 via the client interconnect 199 to allow an operator of the configuration device 200 to configure various aspects of the manner in which the storage cluster system 1000 stores and provides access to the client data 130 provided by one or more of the client devices 100. The Network module 500 of one or more active ones of the nodes 300*a-d* and 300*y-z* may receive and respond to requests for storage services received from one or more of the client devices 100 via the client interconnect 199, and may perform a protocol conversion to translate each storage service request into one or more data access commands.

As depicted, the Disk modules 600 of all of the nodes 300*a-d* and 300*y-z* may be coupled to each other via the inter-cluster interconnect 399. Also, within each of the HA groups 1600*ab*, 1600*cd* and 1600*yz*, Disk modules 600 of partnered nodes may share couplings to the sets of storage devices 800*ab*, 800*cd* and 800*yz*, respectively. More specifically, the Disk modules 600 of the partnered nodes 300*a* and 300*b* may both be coupled to the set of storage devices 800*ab* via the storage interconnect 899*ab*, the Disk modules 600 of the partnered nodes 300*c* and 300*d* may both be coupled to the set of storage devices 800*cd* via the storage interconnect 899*cd*, and the Disk modules 600 of the nodes partnered 300*y* and 300*z* may both be coupled to the set of storage devices 800*yz* via the storage interconnect 899*yz*. The Disk modules 600 of active ones of the nodes 300*a-d* and 300*y-z* may perform the data access commands derived by one or more of the Network modules 500 of these nodes from translating storage service requests received from one or more of the client devices 100.

Thus, the Disk modules 600 of active ones of the nodes 300*a-d* and 300*y-z* may access corresponding ones of the sets of storage devices 800*ab*, 800*cd* and 800*yz* via corresponding ones of the storage interconnects 899*ab*, 899*cd* and 899*yz* to store and/or retrieve client data 130 as part of performing the data access commands. The data access commands may be accompanied by portions of the client data 130 to store and/or newer portions of the client data 130 with which to update the client data 130 as stored. Alternatively or additionally, the data access commands may specify portions of the client data 130 to be retrieved from storage for provision back to one or more of the client devices 100.

Further, and referring to FIG. 2B, the Disk module 600 of an active one of the nodes 300*a-b* and 300*y-z* of one of the clusters 1300*a* or 1300*z* may replicate the data access commands and transmit the resulting replica data access commands via the inter-cluster interconnect 399 to another active one of the nodes 300a-b and 300y-z of the other of the clusters 1300a or 1300z to enable at least partial parallel performance of the data access commands by two of the Disk modules 600. In this way, the state of the client data 130 as stored within one of the sets of storage devices 800ab or 800yz may be mirrored within the other of the sets of storage devices 800ab or 800yz, as depicted.

Such mirroring of the state of the client data 130 between multiple sets of storage devices associated with different clusters that may be geographically distant from each other may be deemed desirable to address the possibility of the nodes of one of the clusters becoming inaccessible as a result of a regional failure of the client interconnect 199 (e.g., as a result of a failure of a portion of the network 999 through which a portion of the client interconnect extends in a particular geographic region). As familiar to those skilled in the art, the use of additional interconnect(s) between partnered nodes of a HA group (e.g., the HA interconnects 699ab, 699cd and 699yz) tends to encourage physically locating partnered nodes of a HA group in close proximity to each other such that a localized failure of a network may render all nodes of a HA group inaccessible to the client devices 100. For example, a failure of a portion of a network that includes the client interconnect 199 in the vicinity of both of the nodes 300a and 300b may render both of the nodes 300a and 300b inaccessible to the client devices 100 such that the client data 130 stored within the sets of storage devices 800ab becomes inaccessible through either of the nodes 300a or 300b. With both of the sets of the storage devices 800ab and 800yz mirroring the state of the client data 130, the client devices 100 are still able to access the client data 130 within the set of storage devices 800yz, despite the loss of access to the set of storage devices 800ab.

Referring again to both FIGS. 2A and 2B, and as previously discussed, the sharing of access via the storage interconnects 899ab, 899cd and 899yz to each of the sets of storage devices 800ab, 800cd and 800yz, respectively, among partnered ones of the nodes 300a-d and 300y-z may enable continued access to one of the sets of storage devices 800ab, 800cd and 800yz in the event of a failure occurring within one of the nodes 300a-d and 300y-z. The coupling of Disk modules 600 of partnered ones of the nodes 300a-d and 300y-z within each of the HA groups 1600ab, 1600cd and 1600yz via the HA interconnects 699ab, 699cd and 699yz, respectively, may enable such continued access in spite of such a failure. Through the HA interconnects 699ab, 699cd or 699yz, Disk modules 600 of each of these nodes may each monitor the status of the Disk modules 600 their partners. More specifically, the Disk modules 600 of the partnered nodes 300a and 300b may monitor each other through the HA interconnect 699ab, the Disk modules 600 of the partnered nodes 300c and 300d may monitor each other through the HA interconnect 699cd, and the Disk modules 600 of the partnered nodes 300y and 300z may monitor each other through the HA interconnect 699yz.

Such monitoring may entail recurring exchanges of "heartbeat" and/or other status signals (e.g., messages conveying the current state of performance of a data access command) via one or more of the HA interconnects 699ab, 699cd or 699yz in which an instance of an absence of receipt of such a signal within a specified recurring interval may be taken as an indication of a failure of the one of the Disk modules 600 from which the signal was expected. Alternatively or additionally, such monitoring may entail awaiting an indication from a monitored one of the Disk modules 600 that a failure of another component of one of the nodes 300a-d or 300y-z has occurred, such as a failure of a Management module 400 and/or of a Network module 500 of that one of the nodes 300a-d or 300y-z. In response to such an indication of failure of an active one of the nodes 300a-d or 300y-z belonging to one of the HA groups 1600ab, 1600cd or 1600yz, an inactive partner among the nodes 300a-d or 300y-z of the same one of the HA groups 1600ab, 1600cd or 1600yz may take over. Such a "takeover" between partnered ones of the nodes 300a-d or 300y-z may be a complete takeover inasmuch as the partner that is taking over may take over performance of all of the functions that were performed by the failing one of these nodes.

However, in some embodiments, at least the Network modules 500 and the Disk modules 600 of multiple ones of the nodes 300a-d and/or 300y-z may be interconnected in a manner enabling a partial takeover in response to the failure of a portion of one of the nodes 300a-d or 300y-z. Referring more specifically to FIG. 2A, the Network modules 500 of each of the nodes 300a-d may be coupled to the Disk modules 600 of each of the nodes 300a-d via an intra-cluster interconnect 599a. In other words, within the cluster 1300a, all of the Network modules 500 and all of the Disk modules 600 may be coupled to enable data access commands to be exchanged between Network modules 500 and Disk modules 600 of different ones of the nodes 300a-d. Thus, by way of example, where the Network module 500 of the node 300a has failed, but the Disk module 600 of the node 300a is still operable, the Network module 500 of its partner node 300b (or of one of the nodes 300c or 300d with which the node 300a is not partnered in a HA group) may take over for the Network module 500 of the node 300a.

Although the clusters 1300a and 1300z may be geographically distant from each other, within each of the clusters 1300a and 1300z, nodes and/or components of nodes may be positioned within relatively close physical proximity to each other such that the intra-cluster interconnects 599a and 599z may each traverse a relatively short distance (e.g., extending within a room and/or within a single cabinet). More broadly, one or more of the intra-cluster interconnects 599a and 599z may be based on any of a variety (or combination) of communications technologies by which signals may be exchanged, including without limitation, wired technologies employing electrically and/or optically conductive cabling, and wireless technologies employing infrared, radio frequency or other forms of wireless transmission. By way of example, the intra-cluster interconnect 599a may be made up of a mesh of point-to-point interconnects coupling each Network module 500 of each of the nodes 300a-d to each Disk module 600 of each of the nodes 300a-d. Alternatively, by way of another example, the intra-cluster interconnect 599a may include a network switch (not shown) to which each of the Network modules 500 and each of the Disk modules 600 of the nodes 300a-d may be coupled.

It should be noted, however, that it may be deemed desirable to disallow (or at least limit instances of) such partial takeovers in favor of complete takeovers in which one node takes over all functions of another node in which a failure has occurred. This may be the result of portions of the intra-cluster interconnects 599a and/or 599z that extend between Network modules 500 and Disk modules 600 within a single one of the nodes 300a-d and/or 300y-z having the capability to transfer commands and/or data significantly more quickly than portions of the intra-cluster interconnects 599a and/or 599z that extend between Network modules 500 and Disk modules 600 of different nodes. Thus, in some embodiments, portions of the intra-cluster interconnects 599a and/or 599z that extend between different ones of the nodes 300a-d or 300y-z, respectively, may not be used such that they remain inactive.

It should also be noted that despite the depiction of only a single one of each of the Management module 400, the Network module 500 and the Disk module 600 within each of the nodes 300a-d and 300y-z, other embodiments are possible that may incorporate different quantities of one or more of the Management module 400, the Network module 500 and the Disk module 600 within one or more of these nodes. By way of example, embodiments are possible in which one or more of the nodes 300a-d and/or 300y-z incorporate more than one Network module 500 to provide a degree of fault-tolerance within a node for communications with one or more of the client devices 100, and/or incorporate more than one Disk module 600 to provide a degree of fault-tolerance within a node for accessing a corresponding one of the sets of storage devices 800ab, 800cd or 800yz.

Figure 3:
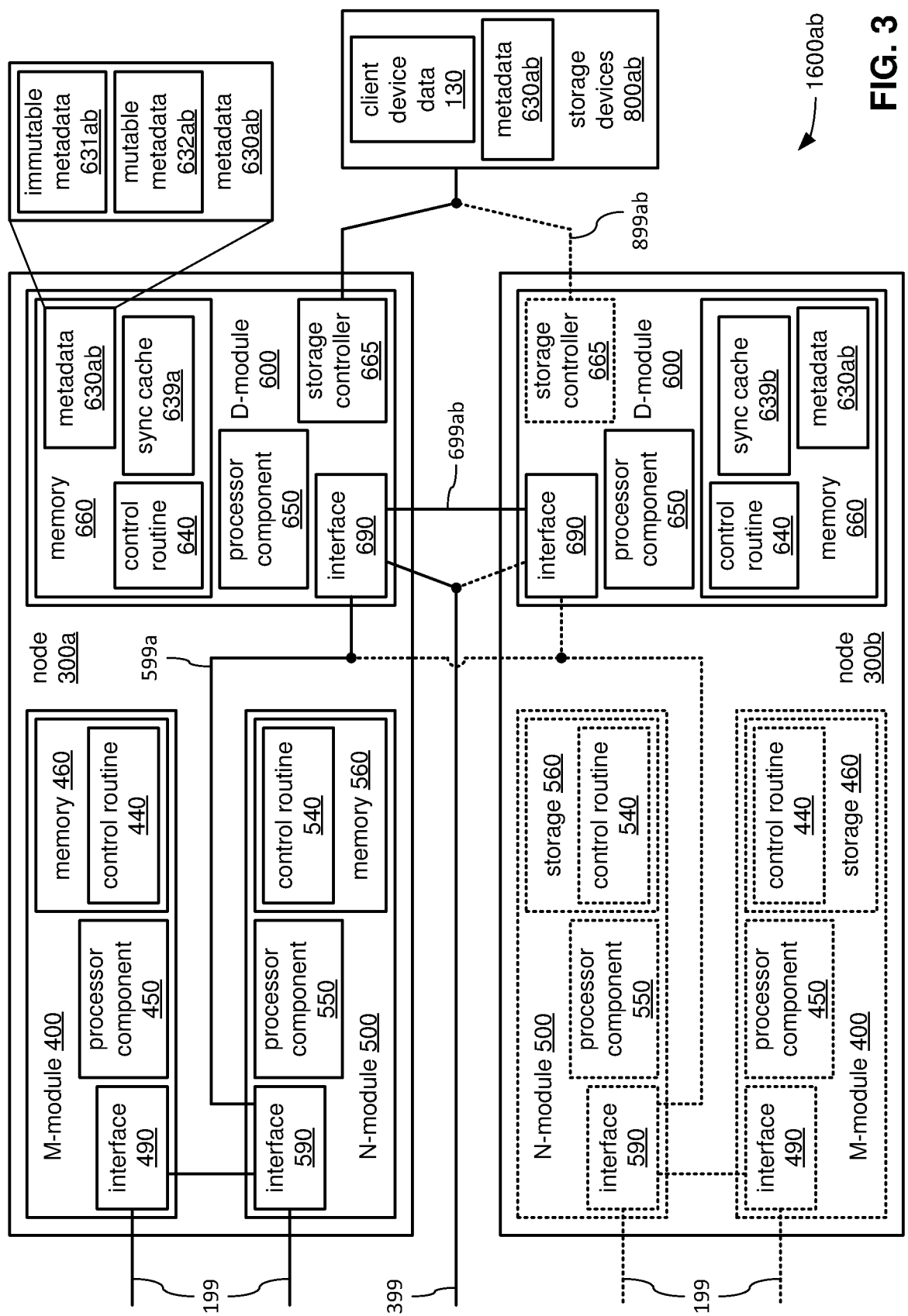
FIG. 3 illustrates an example embodiment of a HA group of partnered nodes.

FIG. 3 illustrates a block diagram of an example embodiment of the HA group 1600ab of the cluster 1300a of the storage cluster system 1000 in greater detail. As depicted, of the nodes 300a and 300b of the HA group 1600ab, the node 300a may be active to engage in communications with a client device 100 and/or the configuration device 200, and may be active to perform operations altering the client data 130 within the set of storage devices 800ab, while the node 300b may be inactive and awaiting a need to take over for the node 300a. More specifically, the Management module 400 and the Network module 500 of the node 300a may engage in communications with the client devices 100 and/or the configuration device 200 (as indicated with the Management module 400 and the Network module 500 of the node 300a being drawn with solid lines), while the Management module 400 and the Network module 500 of the node 300b may not (as indicated with the Management module 400 and the Network module 500 being drawn with dotted lines).

In various embodiments, the Management module 400 of each of the nodes 300a-b incorporates one or more of a processor component 450, a memory 460 and an interface 490 to couple the Management module 400 to at least the client interconnect 199. The memory 460 may store a control routine 440. The control routine 440 may incorporate a sequence of instructions operative on the processor component 450 in its role as a main processor component of the Management module 400 to implement logic to perform various functions. As a result of the node 300a being active to engage in communications with one or more of the client devices 100 and/or the configuration device 200, the processor component 450 of the Management module 400 of the node 300a may be active to execute the control routine 440. In contrast, as a result of the node 300b being inactive, the processor component 450 may not be active to execute the control routine 440 within the Management module 400 of the node 300b. However, if the node 300b takes over for the node 300a, then the control routine 440 within the node 300b may begin to be executed, while the control routine 440 within the node 300a may cease to be executed.

In executing the control routine 440, the processor component 450 of the Management module 400 of the active node 300a may operate the interface 490 to accept remotely supplied configuration data. In some embodiments, such remote configuration data may emanate from the configuration device 200. By way of example, which one(s) of the nodes 300b-d or 300y-z may be partnered to form one or more HA groups (e.g., the HA groups 1600ab, 1600cd or 1600yz) may be remotely configured, as well as what nodes and/or HA groups may cooperate to provide further fault tolerance (e.g., geographically dispersed fault tolerance), what network addresses may be allocated to one or more of the nodes 300a-d and/or 300y-z on various interconnects, etc. Alternatively or additionally, types of storage service that each provide a specified amount of storage space and/or a specified throughput in accessing the storage space may be remotely configured, as well as a quality of service (QoS) policy to be employed in controlling access to a specified storage space, etc. Specifically, the processor component 450 may provide telnet access, file transfer protocol (FTP) access and/or other communications service(s) by which configuration data that specifies one or more of such aspects may be received from the configuration device 200 via the client interconnect 199 or another interconnect.

In other embodiments, such remote configuration may emanate from one or more of the client devices 100. By way of example, security protocols and/or credentials by which each of the client devices 100 may be authenticated to allow access to the client data 130 stored within the set of storage devices 800ab may be remotely configured, as well as what protocols may be employed in communications via the client interconnect 199, and/or what file system may be employed in storing client data 130. Specifically, the processor component 450 may provide a web server, telnet access, instant messaging and/or other communications service(s) by which such aspects of operation may be remotely configured from one or more of the client devices 100 via the client interconnect 199. Regardless of the exact manner in which configuration information is remotely provided, as the processor component 450 receives such configuration information and/or subsequent to receiving such information, the processor component 450 may operate the interface 490 to relay it and/or updates thereto to the Network module 500 and/or the Disk module 600 as a portion of metadata.

In various embodiments, the Network module 500 of each of the nodes 300a-b incorporates one or more of a processor component 550, a memory 560 and an interface 590 to couple the Network module 500 to one or both of the client interconnect 199 and the intra-cluster interconnect 599a. The memory 560 may store a control routine 540. The control routine 540 may incorporate a sequence of instructions operative on the processor component 550 in its role as a main processor component of the Network module 500 to implement logic to perform various functions. As a result of the node 300a being active to engage in communications with one or more of the client devices 100 and to perform data access commands, the processor component 550 of the Network module 500 of the node 300a may be active to execute the control routine 540. In contrast, as a result of the node 300b being inactive, the processor component 550 may not be active to execute the control routine 540 within the Network module of the node 300b. However, if the node 300b takes over for the node 300a, then the control routine 540 within the node 300b may begin to be executed, while the control routine 540 within the node 300a may cease to be executed.

In executing the control routine 540, the processor component 550 of the Network module 500 of the active node 300a may operate the interface 590 to perform various tests to detect other devices with which to communicate and/or assign network addresses by which other devices may be contacted for communication. At least as part of rebooting following being reset or powered on, the processor component 550 may perform various tests on the client interconnect 199 and/or the intra-cluster interconnect 599a to determine addresses and/or communications protocols for communicating with one or more components (e.g., Management modules 400, Network modules 500 and/or Disk modules 600) of one or more of the nodes 300*a-d* and/or 300*y-z*. Alternatively or additionally, in embodiments in which at least a portion of the intra-cluster interconnect 599*a* supports internet protocol (IP) addressing, the processor component 550 may function in the role of a dynamic host control protocol (DHCP) server to assign such addresses. Also alternatively or additionally, the processor component 550 may receive configuration information from the Management module 400 (e.g., a portion of metadata).

In some embodiments, configuration information received from the Management module 400 may be employed by the processor component 550 in performing such tests on the client interconnect 199 and/or the intra-cluster interconnect 599*a* (e.g., the configuration information so received may include a range of IP addresses to be tested). As the processor component 550 performs such tests and/or subsequent to performing such tests, the processor component 550 may operate the interface 590 to relay indications of the results of those tests and/or updates thereto to the Disk module 600 as a portion of metadata. Further, as the processor component 550 interacts with one or more of the client devices 100 and/or other devices, the processor component 550 may detect changes in information determined from the performance of various tests, and may operate the interface 590 to provide indications of those changes to the Disk module 600 as portions of updated metadata.

In further executing the control routine 540, the processor component 550 may operate the interface 590 to exchange storage service requests, responses thereto and/or client data 130 with one or more of the client devices 100 via the client interconnect 199. The client devices 100 and the Network module(s) 500 of one or more active ones of the nodes 300*a-d* and 300*y-z* may interact with each other via the client interconnect 199 in accordance with a client/server model for the handling of client data 130. Stated differently, each of the client devices 100 may issue requests for storage services related to the storage of client data 130 to one or more of the nodes 300*a-d* and 300*y-z* that are active to engage in communications with the client devices 100. In so doing, the client devices 100 and the Network module 500 may exchange packets over the client interconnect 199 in which storage service requests may be transmitted to the Network module 500, responses (e.g., indications of status of handling of the requests) may be transmitted to the client devices 100, and client data 130 may be exchanged therebetween. The exchanged packets may utilize any of a variety of file-based access protocols, including and not limited to, Common Internet File System (CIFS) protocol or Network File System (NFS) protocol, over TCP/IP. Alternatively or additionally, the exchanged packets may utilize any of a variety of block-based access protocols, including and not limited to, Small Computer Systems Interface (SCSI) protocol encapsulated over TCP (iSCSI) and/or SCSI encapsulated over Fibre Channel (FCP).

Also in executing the control routine 540, the processor component 550 may operate the interface 590 to exchange commands and/or data, including client data 130, with the Disk module 600 via the intra-cluster interconnect 599*a*. Such exchanges of commands and/or data may or may not employ a protocol in which packets are used. In some embodiments, data access commands to effect exchanges of client data 130 may be exchanged through the intra-cluster interconnect 599*a* in a manner that may be agnostic of any particular file system that may be selected for use in storing the client data 130 within the set of storage devices 800*ab*. More specifically, the manner in which portions of client data 130 may be referred to in data access commands to store and/or retrieve client data 130 may entail identification of file names, identification of block identifiers, etc. in a manner meant to be independent of a selection of a file system.

Given the possible differences in protocols and/or other aspects of communications, the processor component 550 may be caused to translate between protocols employed in communications with one or more of the client devices 100 via the client interconnect 199 and protocols employed in communications with the Disk module 600 via the intra-cluster interconnect 599*a*. Alternatively or additionally, one or more of the protocols employed in communications via the client interconnect 199 may employ file and/or block identification in a manner enabling a minimal degree of protocol translation between such communications and communications via the intra-cluster interconnect 599*a*.

In performing such protocol translations, the processor component 550 may be caused to relay a storage service request from one of the client devices 100 to the Disk module 600 as one or more data access commands to store and/or retrieve client data 130. More specifically, a request received via the client interconnect 199 for storage services to retrieve client data 130 may be converted into one or more data access commands conveyed to the Disk module 600 via the intra-cluster interconnect 599*a* to retrieve client data 130 from the set of storage devices 800*ab* and to provide the client data 130 to the Network module 500 to be relayed by the Network module 500 back to the requesting one of the client devices 100. Also, a request received via the client interconnect 199 for storage services to store client data 130 may be converted into one or more data access commands conveyed to the Disk module 600 via the intra-cluster interconnect 599*a* to store the client data 130 within the set of storage devices 800*ab*.

In further executing the control routine 540, the processor component 550 may act to restrict the rate of throughput of the data access commands associated with one or more specific storage spaces in which the client data 130 may be stored. Again, this may be based on a QoS policy received by the Management module 400 (e.g., from the configuration device 200) and relayed to the Network module 500 as a portion of metadata. Such a rate of throughput may be dynamically adjustable based on any of a variety of factors, including and not limited to, an amount of client data 130 stored within the set of storage devices 800*ab*. The Network module 500 may recurringly receive indications from the Disk module 600 of that amount of client data 130 to enable such dynamic adjustment. In some embodiments, the processor component 550 may provide an indication to the Management module 400 of a limit of throughput and/or of available storage space nearly being reached, having been reached and/or being exceeded to enable the Management module 400 to relay such an indication onward to the configuration device 200 and/or one of the client devices 100.

In various embodiments, the Disk module 600 of each of the nodes 300*a-b* incorporates one or more of a processor component 650, a memory 660, a storage controller 665 to couple the Disk module 600 to the set of storage devices 800*ab* via the storage interconnect 899*ab*, and an interface 690 to couple the Disk module 600 to one or more of the intra-cluster interconnect 599*a*, the inter-cluster interconnect 399 and the HA interconnect 699*ab*. The memory 660 stores one or more of a control routine 640 and metadata 630*ab*. Also, and as will be explained in greater detail, in the Disk module 600 of the node 300*a*, a portion of the memory 660 may be allocated to serve as a synchronization cache (sync cache) 639*a*, while a portion of the memory 660 may be similarly allocated to serve as a sync cache 639*b* in the Disk module of the node 300*b*. The control routine 640 incorporates a sequence of instructions operative on the processor component 650 in its role as a main processor component of the Disk module 600 to implement logic to perform various functions. However, as a result of the node 300*a* being active to engage in communications with one or more of the client devices 100 and to perform data access commands, a different portion of the control routine 640 may be executed by the processor component 650 of the Disk module 600 of the node 300*a* from a portion of the control routine 640 that may be executed by the processor component 650 of the Disk module of the node 300*b*. As a result, different logic may be implemented by the executions of different portions of the control routine 640 within each of these Disk modules 600.

In executing the control routine 640, the processor component 650 of the Disk module 600 of the active node 300*a* may operate the interface 690 to receive portions of metadata and/or updates thereto from the Management module 400 and/or the Network module 500 via the intra-cluster interconnect 599*a*. Regardless of whether aspects of the operation of at least the node 300*a* are remotely configured via the Management module 400 and/or are configured based on the results of tests performed by the Network module 500, the processor component 650 may generate the metadata 630*ab* from those received metadata portions indicating the resulting configuration of those aspects, and may store the metadata 630*ab* within the memory 660 for subsequent use by the processor component 650. The processor component 650 may repeat the generation of the metadata 630*ab* in response to receiving updated portion(s) of metadata from the Management module 400, the Network module 500 and/or other possible sources of updated metadata portions, thereby creating an updated version of the metadata 630*ab* which the processor component 650 may store within the memory 660 in place of earlier version(s).

Following generation of the metadata 630*ab* and/or each updated version thereof, the processor component 650 may store the metadata 630*ab* within the set of storage devices 800*ab* for later retrieval. During subsequent rebooting of the Disk module 600 of the node 300*a*, the processor component 650 may be caused by its execution of the control routine 640 to access the set of storage devices 800*ab* to retrieve the metadata 630*ab*. In this way, the processor component 650 retrieves indications of the manner in which various aspects of the operation of at least the node 300*a* are to be configured, including aspects of the manner in which the Disk module 600 is to operate the set of storage devices 800*ab* and/or the manner in which the Disk module 600 is to interact with other devices (e.g., the Management module 400 or the Network module 500 of the node 300*a*, and/or the Network module 500 or the Disk module 600 of one or more of the other nodes 300*b-d* or 300*y-z*). It may be deemed desirable to enable the Disk module 600 of the node 300*a* to obtain information concerning aspects of operation of at least the node 300*a* as quickly as possible by doing so independently of the Management module 400 and/or the Network module 500.

There may be occasions where multiple components of the node 300*a*, including more than one of the Management module 400, the Network module 500 and the Disk module 600, are caused to reboot, including and not limited to, implementing updates, upgrades, expansions of storage space, repairs, etc. By storing the metadata 630*ab* within the set of storage devices 800*ab* for later retrieval following a rebooting of the Disk module 600, the need for the Disk module 600 to await completion of rebooting of the Management module 400 and/or the Network module 500 before being provided with metadata portions from which to again derive the metadata 630*ab* is avoided.

Alternatively or additionally, a situation may arise in which the Management module 400 and/or the Network module 500 may become inoperative. By way of example, where more than one of the Management module 400, the Network module 500 and the Disk module 600 are rebooted, the Management module 400 and/or the Network module 500 may fail to successfully reboot such that either of the Management module 400 or Network module 500 remain unresponsive to any request from the Disk module 600 to provide metadata portions making up the metadata 630*ab* for an extended period of time. Thus, the ability of the Disk module 600 to independently retrieve the metadata 630*ab* may allow the Disk module 600 to still cooperate with Network modules 500 and/or Disk modules 600 of one or more of the other nodes 300*b-d* and/or 300*y-z* to provide fault-tolerant storage and retrieval of the client data 130, despite the loss of at least some functionality of the node 300*a*.

Also following generation of the metadata 630*ab* and/or each updated version thereof, the processor component 650 of the Disk module 600 of the node 300*a* may operate the interface 690 to transmit a duplicate of the metadata 630*ab* to the Disk module 600 of the inactive node 300*b* via the HA interconnect 699*ab* to enable the node 300*b* to more speedily take over for the active node 300*a* in response to a failure within the node 300*a*. In this way, the node 300*b* is directly provided with the metadata 630*ab* and/or updated versions thereof to provide information needed by the node 300*b* to more readily take over communications with one or more client devices, take over communications with one or more others of the nodes 300*c-d* and/or 300*y-z*, and/or take over control of and/or access to the set of storage devices 800*ab*.

Still further following generation of the metadata 630*ab* and/or each updated version thereof, the processor component 650 of the Disk module 600 of the node 300*a* may operate the interface 690 to transmit a portion of the metadata 630*ab* to the Disk module 600 of an active one of the nodes 300*y-z* of the HA group 1600*yz* of the other cluster 1300*z*. Alternatively or additionally, the processor component 650 of the Disk module 600 of the node 300*a* may operate the interface 690 to transmit metadata portion(s) received from the Management module 400 and/or the Network module 500 of the node 300*a* to the active one of the nodes 300*y-z*. Such metadata portion(s) may include indications of aspects of operation of all of the nodes 300*a-b* and 300*y-z* together in storing and/or providing access to the client data 130, and may be provided to the active one of the nodes 300*y-z* as an input to other metadata that may be separately generated and/or maintained by the nodes 300*y-z*.

In further executing the control routine 640, the processor component 650 of the Disk module 600 of the node 300*a* may operate the set of storage devices 800*ab* through the storage controller 665 to store and retrieve client data 130 in response to data access commands to do so received via the intra-cluster interconnect 599*a*, as has been described. The processor component 650 may operate the interface 690 to receive the data access commands from and/or exchange data (including client data 130) with the Network module 500 via the intra-cluster interconnect 599*a*. The processor component 650 may be caused to retry the performance of a data access command to store or retrieve client data 130 at least in response to the occurrence of a short term failure in performance (e.g., a failure that is likely to be resolved relatively quickly). However, if the failure in performance is a longer term failure (e.g., a failure that cannot be resolved quickly and/or requires intervention of personnel), then a takeover may occur in which, for example, the node 300b becomes the new active node of the HA group 1600ab.

As the processor component 650 performs the data access commands received from the Network module 500, the processor component 650 may monitor the amount of the client data 130 stored within the set of storage devices 800ab, and may recurringly transmit indications of that amount to the Network module 500 to enable the dynamic adjustment of a rate of throughput by the Network module 500 in accordance with a QoS policy. In some embodiments, the processor component 650 may additionally employ any of a variety of data deduplication techniques to identify blocks of client data 130 that are identical, and may reduce the amount of storage space actually occupied by the client data 130 stored within the set of storage devices 800 by avoiding storing multiple copies of identical blocks of data therein. This may be deemed desirable where multiple versions of a piece of data are stored in which the differences between two or more of the versions are relatively minor such that storage space within the set of storage devices 800 is able to be conserved by storing a single copy of multiple identical blocks of the client data 130. In such embodiments, the processor component 650 may recurringly transmit indications of both the amount of the client data 130 that is stored within the set of storage devices 800ab and the amount of storage space that the client data occupies within the set of storage devices 800ab to the Network module 500.

In addition to operating the storage controller 665 to execute data access commands to store client data 130 within the set of storage devices 800ab and/or retrieve client data 130 therefrom, the processor component 650 of the Disk module 600 of the node 300a may also replicate the data access commands and operate the interface 690 to transmit the resulting replica data access commands via the inter-cluster interconnect 399 to a Disk module 600 of an active one of the nodes 300y-z of the HA group 1600yz of the other cluster 1300z. As has been discussed, the transmission of such replica data access commands to an active node of another HA group may provide an additional degree of fault tolerance in the storage and/or retrieval of client data 130 in which the replica data access commands may be performed by an active node of another cluster at least partly in parallel with the performance of the original data access command by the node 300a. The processor component 650 may be caused to retry the transmission of such replica data access commands to either the same active one of the nodes 300y-z within the HA group 1600yz and/or to a different inactive one of the nodes 300y-z within the HA group 1600yz in response to indications of errors in either the receipt or performance of the replica data access commands Retrying transmission of replica data access commands to an inactive one of the nodes 300y-z may cause or arise from a takeover of the active one of the nodes 300y-z by the inactive one thereof.

In support of such exchanges of replica data access commands and responses thereto between the Disk module 600 of the node 300a and a Disk module 600 of an active one of the nodes 300y-z, the processor component 650 of the Disk module 600 of the node 300a may employ information included within the metadata 630ab to form an active communications session with the Disk module 600 of that other active node through the inter-cluster interconnect 399. The processor component 650 may additionally form an inactive communications session with a Disk module of the inactive one of the nodes 300y-z through the inter-cluster interconnect 399 in preparation for retrying a transmission of a replica data access command to the Disk module 600 of that inactive node. Further, if the processor 650 retries the transmission of a replica data access command to the Disk module 600 of that inactive one node, then the processor component 650 may act to change the state of the inactive communications session formed with the Disk module 600 of that inactive node from inactive to active.

In executing the control routine 640, the processor component 650 of the Disk module 600 of the inactive node 300b may operate the interface 690 to receive the metadata 630ab and/or updates thereto from the Disk module 600 of the node 300a via the HA interconnect 699ab. The processor component 650 may then store the received metadata 630ab and/or the received updates thereto within the memory 660 for subsequent use. Again, provision of the metadata 630ab and updates thereto directly to the node 300b by the node 300a may be deemed desirable to enable the node 300b to more quickly take over for the node 300a (thereby transitioning from being an inactive node of the HA group 1600ab to becoming the active node of the HA group 1600ab) in response to a failure occurring within the node 300a. More specifically, with the metadata 630ab already provided to the Disk module 600 of the node 300b, the need for the processor component 650 of the Disk module 600 of the node 300b to take additional time to retrieve the metadata 630ab from other sources is alleviated. More precisely, the need for the processor component to retrieve the metadata 630ab from the set of storage devices 800ab, or to request portions of metadata from the Management module 400 and/or the Network module 500 of either of the nodes 300a or 300b upon taking over for the node 300a is alleviated.

As depicted, the metadata 630ab may include immutable metadata 631ab and mutable metadata 632ab. What pieces of metadata are included in each of the immutable metadata 631ab and the mutable metadata 632ab may be based on the relative frequency with which each piece of metadata is expected to change. By way of example, aspects of the storage of client data 130 within the set of storage devices 800ab, such as a selection of file system, a "level" of redundancy of a Redundant Array of Independent Disks (RAID), etc. may be deemed immutable as a result of being deemed less likely to change or likely to change less frequently than other metadata. In contrast, a network address of a Management module, a Network module or a Disk module of one of the other nodes 300a-d or 300y-z with which the node 300a may communicate via one of the interconnects 399, 599a or 699ab may be deemed mutable as a result of being deemed more likely to change or likely to change more frequently than other metadata.

Since the mutable metadata 632ab includes indications of aspects of the operation of at least the node 300a that are deemed likely to change with greater frequency than similar indications included in the immutable metadata 631ab, the information included in at least the mutable metadata 632ab may more frequently become out of date. Following rebooting of the Disk module 600 of the node 300a, if an attempt by the processor component 650 to employ information in the mutable metadata 632ab obtained from the storage devices 800ab to communicate with other components of the node 300a and/or with components of others of the nodes 300b-d and/or 300y-z is unsuccessful, then the processor component 650 may operate the interface 690 to transmit a request to the Management module 400 and/or the Network module 500 via the intra-cluster interconnect 599a for metadata portions that include updated versions of the information included in the mutable metadata 632ab. Depending on whether the Management module 400 and/or the Network module 500 are also rebooting, the processor component 650 may be caused to await completion of their rebooting and to then retransmit its request for those updated metadata portions. In response to receiving the request, the processor components 450 and/or 550 may be caused by execution of the control routines 440 and/or 540 to operate the interfaces 490 and/or 590, respectively, to transmit such updated metadata portions to the Disk module 600 via the intra-cluster interconnect 599a. Upon receiving the updated information, the processor component 650 may then incorporate the updated information into the mutable metadata 632ab, again generate the metadata 630ab incorporating the updated mutable metadata 632ab, store the now updated metadata 630ab within the memory 660 and the set of storage devices 800ab, and employ the now updated metadata 630ab within the memory 660 to operate the interface 690 to make another attempt to communicate with other components of the node 300a and/or with components of others of the nodes 300b-d and/or 300y-z.

In some embodiments, if the attempt by the processor component 650 to communicate using the metadata 630ab incorporating the now updated mutable metadata 632ab is also unsuccessful, then the processor component 650 may operate the interface 690 to transmit a request to the Management module 400 and/or the Network module 500 for updated versions of the information making up the immutable metadata 631ab. It may be that an updated version of the immutable metadata 631ab includes indications of aspects of operation that are needed in conjunction with using the information contained within the updated version of the mutable metadata 632ab. Upon receiving the updated information, the processor component 650 may then incorporate the updated information into the immutable metadata 631ab, again generate the metadata 630ab incorporating the updated immutable metadata 631ab, store the now updated metadata 630ab within the memory 660 and the set of storage devices 800ab, and employ the now updated metadata 630ab to make a further attempt to communicate with other components of the node 300a and/or with components of others of the nodes 300b-d and/or 300y-z.

As part of determining whether one of the nodes 300a or 300b needs to take over for the other, the processor components 650 of the Disk modules of each of the nodes 300a and 300b may cooperate to recurringly exchange indications of the status of their nodes via the HA interconnect 699ab extending therebetween. As previously discussed such exchanges of status indications may take the form of recurring "heartbeat" signals and/or indications of the current state of performing an operation (e.g., a performing a data access command) Again, an indication that a component of one of the nodes 300a-b has suffered a malfunction may be the lack of receipt of an expected heartbeat signal or other status indication by the other of the nodes 300a-b within a specified period of time (e.g., within a recurring interval of time). Where the Disk module 600 of the active node 300a receives an indication of a failure within the inactive node 300b, the processor component 650 of the Disk module 600 of the node 300a (or another component of the node 300a) may refrain from taking action to take over the node 300b, since the node 300b is inactive such that the node 300b may not be performing a task that requires a takeover of the node 300b.

However, where the Disk module 600 of the inactive node 300b receives an indication of a failure within the active node 300a, the processor component 650 of the Disk module 600 of the inactive node 300b (or another component of the inactive node 300b) may take action to take over the node 300a, since the node 300a is active to engage in communications with the client devices 100, to perform data access commands, and to cooperate with another active node to cause at least partial parallel performance of data access commands therebetween. By way of example, the processor component 650 of the Disk module 600 of the node 300b may signal the Network module 500 of the node 300b to take over communications with one or more of the client devices 100 and/or may begin performing the data access commands that were performed by the processor component 650 of the Disk module 600 of the node 300a. In taking over the performance of those data access commands, the processor component 650 of the Disk module 600 of the node 300b may take over access to and control of the set of storage devices 800ab via the coupling that the Disk modules 600 of both of the nodes 300a and 300b share to the set of storage devices 800ab through the storage interconnect 899ab.

Where the inactive node 300b does take over for the active node 300a in response to a failure occurring within the node 300a, the active and inactive roles of the nodes 300a and 300b may fully reverse, at least after the failure within the node 300a has been corrected. More specifically, the Management module 400 and the Network module 500 of the node 300b may become active to engage in communications with the client devices 100 and/or the configuration device 200 via the client interconnect 199 to receive configuration information and storage service requests, and thereby take over for the Management module 400 and the Network module 500 of the node 300a, while the Management module 400 and the Network module 500 of the node 300a become inactive. Similarly, the Disk module 600 of the node 300b may become active to perform and replicate data access commands, and to transmit replica data access commands to another active node via the inter-cluster interconnect 399 to cause at least partial parallel performance of the data access commands, and thereby take over for the Disk module 600 of the node 300a, while the Disk module 600 of the node 300a becomes inactive. However, in becoming active, the processor component 650 of the Disk module 600 of the now inactive node 300a may cooperate with the processor component 650 of the Disk module 600 of the node 300b to receive new versions of the metadata 630ab generated within the node 300b and to exchange indications of status with the Disk module 600 of the node 300b via the HA interconnect 699ab to determine if the node 300a should subsequently take over for the now active node 300b.

The processor components 650 of the Disk modules 600 of each of the nodes 300a and 300b may designate or otherwise use a portion of corresponding ones of the memories 660 as the synchronization (sync) caches 639a and 639b, respectively, in communications with Disk module(s) 600 of others of the nodes 300a-d and/or 300y-z. More specifically, the processor components 650 of the Disk modules 600 of the nodes 300a and 300b may employ the sync caches 639a and 639b, respectively, to buffer versions of the metadata 630ab and/or status indications exchanged therebetween. Alternatively or additionally, the processor component 650 of the Disk module 600 of the node 300a may maintain and employ the synchronization cache 639a to buffer replica data access commands transmitted to another active node of another HA pair of another cluster and/or indications of status of performance of those replica data access commands received from that other active node.

Broadly, each of the client devices 100, the configuration device 200, the nodes 300a-d and 300y-z, the Management modules 400, the Network module 500, the Disk modules 600 and/or the storage devices 800ab, 800cd and 800yz may be any of a variety of types of computing device, including without limitation, a desktop computer system, a data entry terminal, a laptop computer, a netbook computer, a tablet computer, a handheld personal data assistant, a smartphone, smart glasses, a smart wristwatch, a digital camera, a body-worn computing device incorporated into clothing, a computing device integrated into a vehicle (e.g., a car, a bicycle, a wheelchair, etc.), a server, a cluster of servers, a server farm, etc.

In some embodiments, one or more of the nodes 300a-d and 300y-z may be physically implemented as an assembly of one or more Management modules 400, one or more Network modules 500 and one or more Disk modules 600 that are each implemented as separate computing devices coupled by a physical implementation of a corresponding one of the intra-cluster interconnect 599a or 599z. However, in other embodiments, more than one of the Management module(s) 400, the Network module(s) 500 and Disk module(s) 600 of one or more of the nodes 300a-d and 300y-z may be implemented as sets of instructions that are executed as processes by a shared processor component (e.g., one of the processor components 450, 550 or 650). In such other embodiments, at least a portion of the intra-cluster interconnect 599a or 599z that does not extend between nodes may be implemented as a buffer or other data structure defined within a shared memory (e.g., one of the memories 460, 560 or 660) and employed to exchange data access commands, client data 130 and metadata 630ab among the control routines 440, 540 and/or 640.

In the examples presented herein, one or more of the client devices 100 may be a computing device directly operated by one or more persons to generate and/or work with client data 130, and one or more of the nodes 300a-d and 300y-z may be a computing device functioning as a server to remotely store such client data 130, as well as to provide the client devices 100 with access thereto in a fault-tolerant manner. Alternatively or additionally, in examples presented herein, one or more of the client devices 100 may be a computing device functioning as a server to store and provide access to at least a portion of client data 130, and one or more of the nodes 300a-d and 300y-z may be a computing device functioning as an additional server to augment the storage provided by one or more of the client devices 100.

Figure 4:
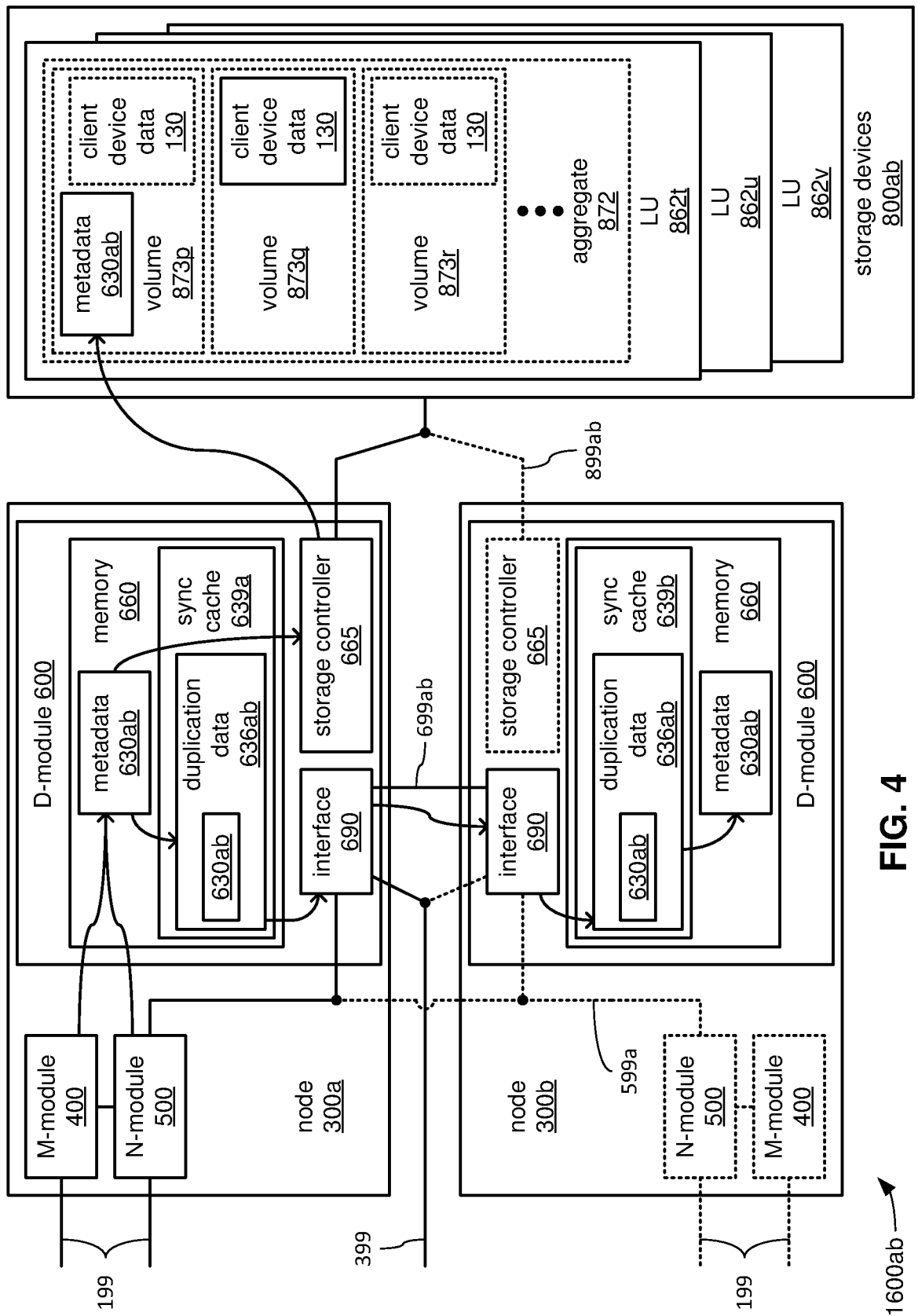
FIG. 4 illustrates an example embodiment of duplication and storage of metadata within a shared set of storage devices.

FIG. 4 illustrates a block diagram of another example embodiment of the HA group 1600ab of the cluster 1300a of the storage cluster system 1000 in greater detail. As again depicted, of the nodes 300a and 300b of the HA group 1600ab, the node 300a may be active to engage in communications with a client device 100 and/or the configuration device 200, and/or may be active to perform operations altering the client data 130 within the set of storage devices 800ab, while the node 300b may be inactive and awaiting a need to take over for the node 300a. FIG. 4 also depicts various aspects of the generation, duplication and storage of the metadata 630ab within the set of storage devices 800ab alongside the client data 130 in greater detail.

Each of the sets of storage devices 800ab, 800cd and 800yz may be made up of storage devices based on any of a variety of storage technologies, including and not limited to, ferromagnetic "hard" or "floppy" drives, magneto-optical media drives, optical media drives, non-volatile solid state drives, etc. As depicted, the set of storage devices 800ab may include LUs 862t-v that may be operated together to form an array of storage devices. In some embodiments, the processor component 650 of the Disk module 600 of the node 300a may operate the storage controller 665 to treat each of the storage devices of the set of storage devices 800ab as a separate LU and/or may be caused to treat a group of those storage devices as a single LU. Multiple LUs may be operated together via the storage controller 665 to implement a level of RAID or other form of array that imparts fault tolerance in the storage of data therein. The manner in which LUs are defined among one or more storage devices of the set of storage devices 800ab, and/or the manner in which multiple LUs may be operated together may be specified within the metadata 630ab.

The processor component 650 may be caused to allocate storage space in any of a variety of ways within a single LU and/or within multiple LUs operated together to form an array. In so doing, the processor component 650 may be caused to subdivide storage space in any of a variety of ways within a single LU and/or within multiple LUs that are operated together. By way of example, such subdivisions may be effected as part of organizing client data 130 into separate categories based on subject, as part of separating client data 130 into different versions generated over time, as part of implementing differing access policies to different pieces of client data 130, etc. In some embodiments, and as depicted, the storage space provided by within the LU 862t or within a combination of the LUs 862t-v may be designated as an aggregate 872. Further, the aggregate 872 may be subdivided into volumes 873p-r. The manner in which aggregates and/or volumes are defined may be selected to conform to the specification(s) of one or more widely known and used file systems, including and not limited to, Write Anywhere File Layout (WAFL). The manner in which aggregates and/or volumes within aggregates are allocated among a single LU or multiple LUs that are operated together may be specified within the metadata 630ab.

The client data 130 may be stored entirely within one of the volumes 873p-r, or may be distributed among multiple ones of the volumes 873p-r (as depicted). As also depicted, the metadata 630ab may also be stored within the set of storage devices 800ab along with client data 130, at least within the same aggregate 872. In some embodiments, the metadata 630ab may be stored within one or more of the same volumes 873p-r as client data 130 (as depicted). In other embodiments, the metadata 630ab may be stored within one of the volumes 873p-r that is separate from one or more others of the volumes 873p-r within which client data 130 may be stored. The manner in which the metadata 630ab and/or the client data 130 are to be organized within aggregates and/or values may be specified within the metadata 630ab itself.

As previously discussed, the Management module 400 of the active node 300a may provide portions of metadata, including updates thereof, to the Network module 500 and/or the Disk module 600 in response to receiving configuration information from one of the client devices 100. Again, such portions of metadata so provided by the Management module 400 (and/or updates thereto) may include configuration information received in configuration data from the configuration device 200 and/or one or more of the client devices 100. Also, the Network module 500 of the active node 300a may provide portions of metadata, including updates thereof, to the Disk module 600 that indicate results of various tests performed by the Network module 500. Again, the portions of metadata so provided by the Network module 500 (and/or updates thereto) may include configuration information derived by the Network module 500 through the performance of various tests. The metadata 630ab and/or updated versions thereof may be generated from these portions of metadata received by the Disk module 600 of the active node 300a, and may then be stored within the memory 660 for subsequent use by the processor component 650 and/or within the set of storage devices 800ab for subsequent retrieval following rebooting of the Disk module 600. Alternatively or additionally, a duplicate of the metadata 630ab may be generated and stored within the sync cache 639a as a portion of duplication data 636ab, by which the duplicate of the metadata 630ab may be transmitted via the interface 690 and the HA interconnect 699ab to the Disk module 600 of the inactive node 300b. Upon receipt via the interface 690 of the Disk module 600 of the node 300b, the duplication data 636ab may be stored within the sync cache 639b from which the duplicate of the metadata 630ab may be retrieved and stored elsewhere within the memory 660 for subsequent use by the processor component 650 of the Disk module 600 of the node 300b.

Figure 5A:
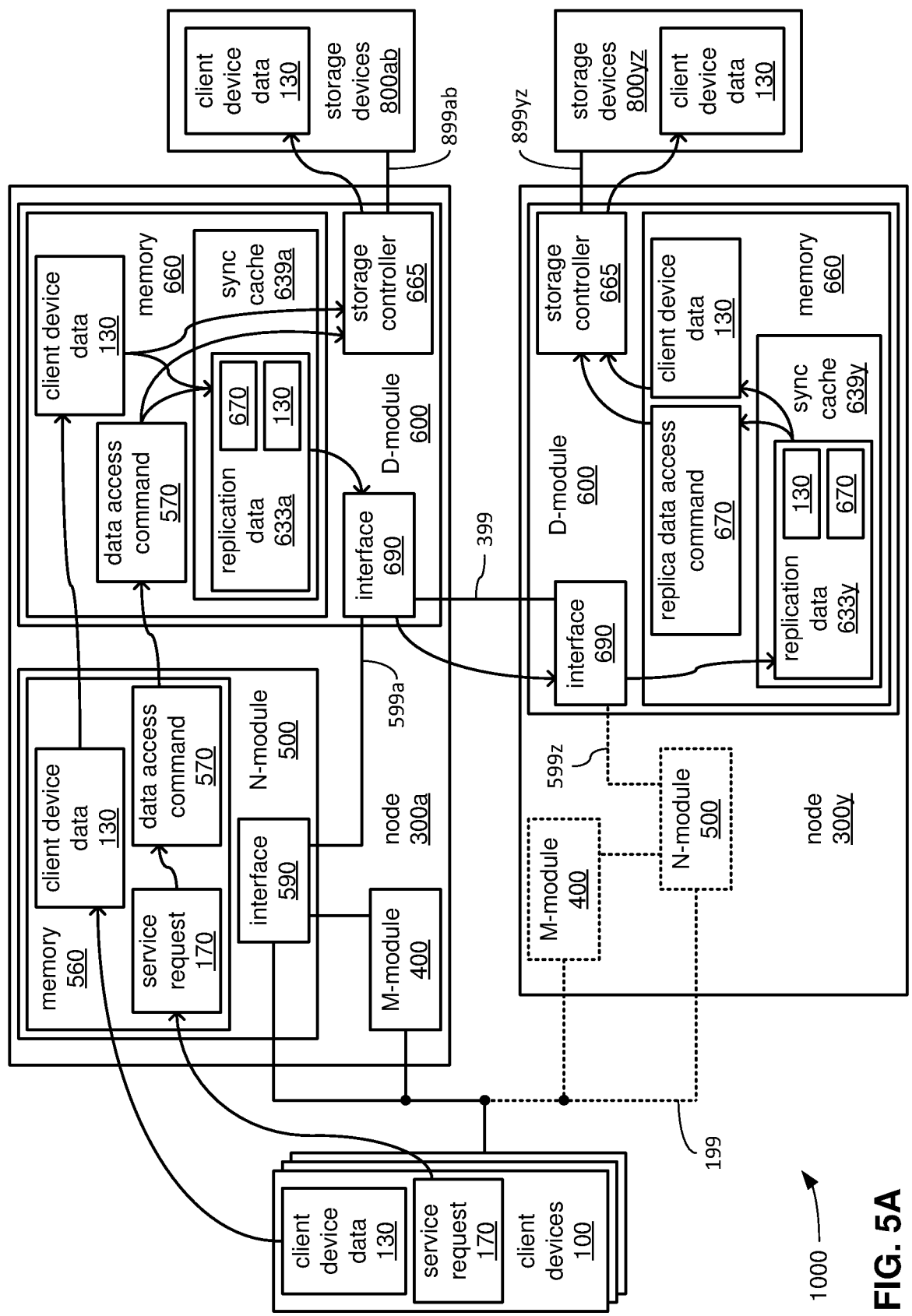
FIG. 5A illustrates an example embodiment of replication of commands between nodes.
Figure 5B:
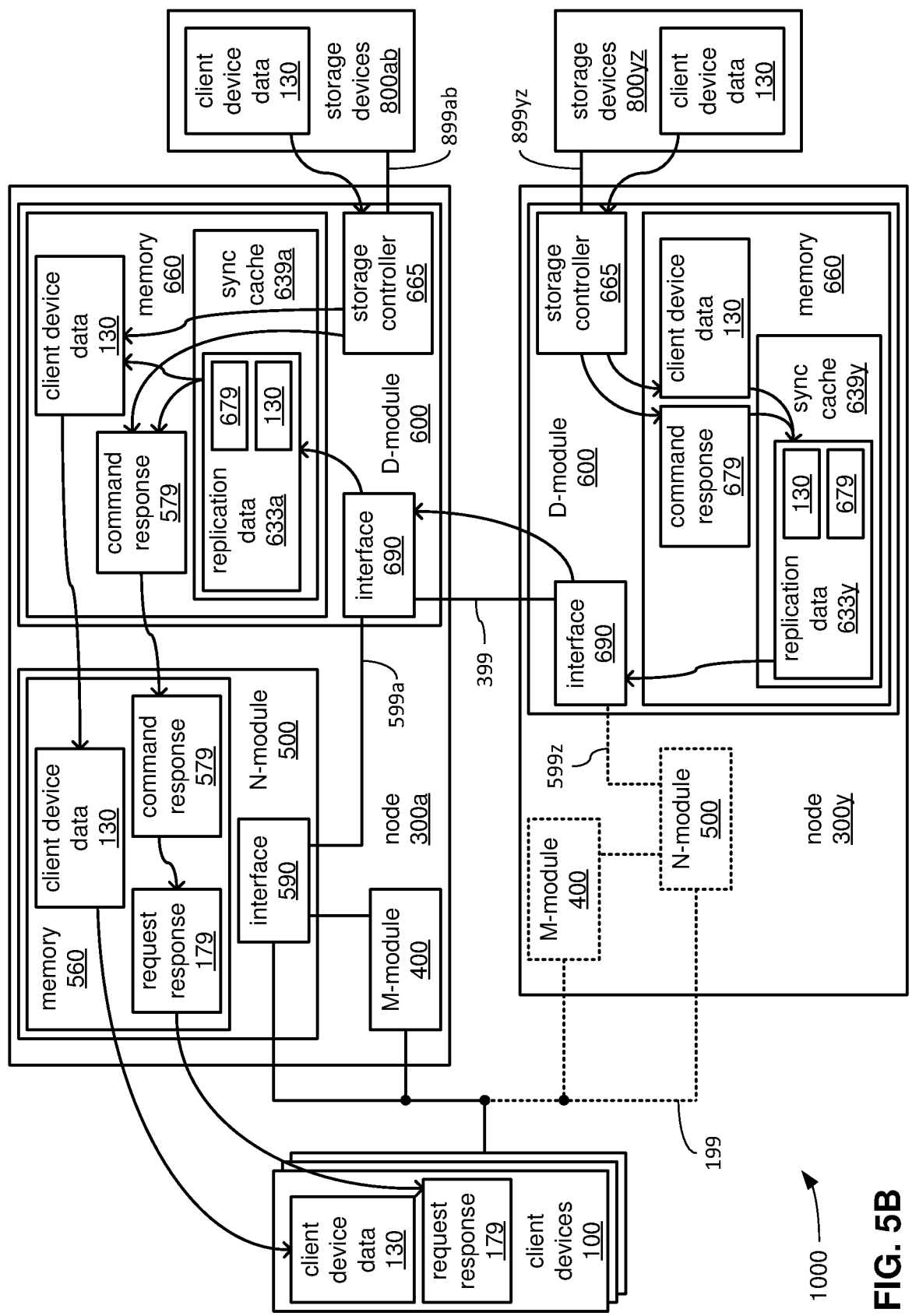
FIG. 5B illustrates an example embodiment of relaying responses to replicated commands between nodes.

FIGS. 5A and 5B both illustrate a block diagram of an example embodiment of the interconnections between active nodes 300a and 300y of the storage cluster system 1000 in greater detail. More specifically, FIG. 5A depicts aspects of replication and at least partial parallel performance of data access commands between the nodes 300a and 300y in greater detail. FIG. 5B depicts aspects of combining and relaying responses generated by such at least partial parallel performance by the nodes 300a and 300y in greater detail. As depicted in both FIGS. 5A and 5B, the node 300a may be active to engage in communications with a client device 100 and to perform data access commands altering the client data 130 within the set of storage devices 800ab, while the node 300y may be active to engage in communications with the node 300a and to perform replica data access commands altering the client device 130 within the set of storage devices 800yz at least partly in parallel with the node 300a.

Turning to FIG. 5A, as previously discussed, the Network module 500 of the active node 300a may receive client data 130 and/or storage service requests 170 from one of the client devices 100, which may then be temporarily stored within the memory 560. The storage service requests 170 to store and/or retrieve client data 130 may then be translated into data access commands 570 to store and/or retrieve client data 130, respectively. Following such translation and/or as such translation occurs, client data 130 and/or data access commands 570 may be relayed to the Disk module 600 of the active node 300a, where the client data 130 and/or the data access commands 570 may then be temporarily stored within the memory 660 in preparation for being performed by the Disk module 600 of the node 300a. However, in addition to such performance, the data access commands 570 may be replicated to generate corresponding replica data access commands 670 that may be stored within the sync cache 639a as a portion of replication data 633a. The replication data 633a may serve as a buffer of which the contents are transmitted on a recurring basis to the Disk module 600 of the active node 300y via the interface 690 and the inter-cluster interconnect 399. Where the replica data access commands 670 include commands to store a piece of the client data 130, such a piece may be stored within the synchronization cache 639a as another portion of the replication data 633a to be transmitted to the node 300y along with the replica data access commands 670.

Upon receipt via the interface 690 of the Disk module 600 of the node 300y, the recurringly transmitted contents of the replication data 633a may be temporarily stored within the sync cache 639y as a portion of the replication data 633y. The received replica data access commands 670 and/or associated pieces of the client data 130 may then be retrieved from the replication data 633y and temporarily stored elsewhere within the memory 660 in preparation for performance of the replica data access commands 670 by the Disk module 600 of the node 300y. The Disk module 600 of the node 300y then performs the replica data access commands 670 to store client data 130 within and/or retrieve client data 130 from the set of storage devices 800yz at least partly in parallel with the Disk module 600 of the node 300a performing the data access commands 570 to similarly store client data 130 within and/or retrieve client data 130 from the set of storage devices 800ab.

Turning to FIG. 5B, as the replica data access commands 670 are performed by the Disk module 600 of the node 300y, command responses 679 to the performances of those replica data access commands 670 may be generated and may be temporarily stored within the sync cache 639y as a portion of the replication data 633y. The command responses 679 may include one or more of indications of successful commencement and/or completion of performance of replica data access commands 670, and/or indications of failure occurring in attempts to perform replica data access commands 670. The replication data 633y may serve as a buffer of which the contents are transmitted on a recurring basis to the Disk module 600 of the active node 300a via the interface 690 and the inter-cluster interconnect 399. Where the replica data access commands 670 include commands to retrieve a piece of the client data 130, such a piece may be stored within the sync cache 639y as another portion of the replication data 633y to be transmitted back to the node 300a along with the command responses 679.

Upon receipt via the interface 690 of the Disk module 600 of the node 300a, the recurringly transmitted contents of the replication data 633y may be temporarily stored within the sync cache 639a as a portion of the replication data 633a. The received command responses 679 and/or associated pieces of the client data 130 may then be retrieved from the replication data 633a and temporarily stored elsewhere within the memory 660 in preparation for analysis alongside results of performance of the data access commands 570 by the Disk module 600 of the node 300a. The Disk module 600 of the node 300a then generates command responses 579 from such analysis and relays the command responses 579 and/or associated pieces of data 130 to the Network module 500 of the node 300a where one or both may be temporarily stored within the memory 560. The command responses 579 may then be translated into storage service request responses 179, and then the request responses 179 and/or associated pieces of client data 130 may be transmitted back to one of the client devices 100.

The storage service request responses 179 may include a portion of the client data 130 provided to one of the client devices 100 in response to a storage service request 170 to retrieve that portion of the client data 130. Alternatively or additionally, the storage service request responses 179 may include the earlier described status indications indicating the status of performance of data access command(s) translated from a storage service request 170. Thus, it should be noted that a single storage service request 170 may beget more than one storage service request response 179. By way of example, a single storage service request 170 to retrieve a portion of the client data 130 may be responded to with a first storage service request response 179 indicating that a retrial of performance is underway due to a short term failure, followed by at least a second storage service request response 179 that may include both a status indication of successful performance and the portion of the client data 130 that was requested.

Figure 6:
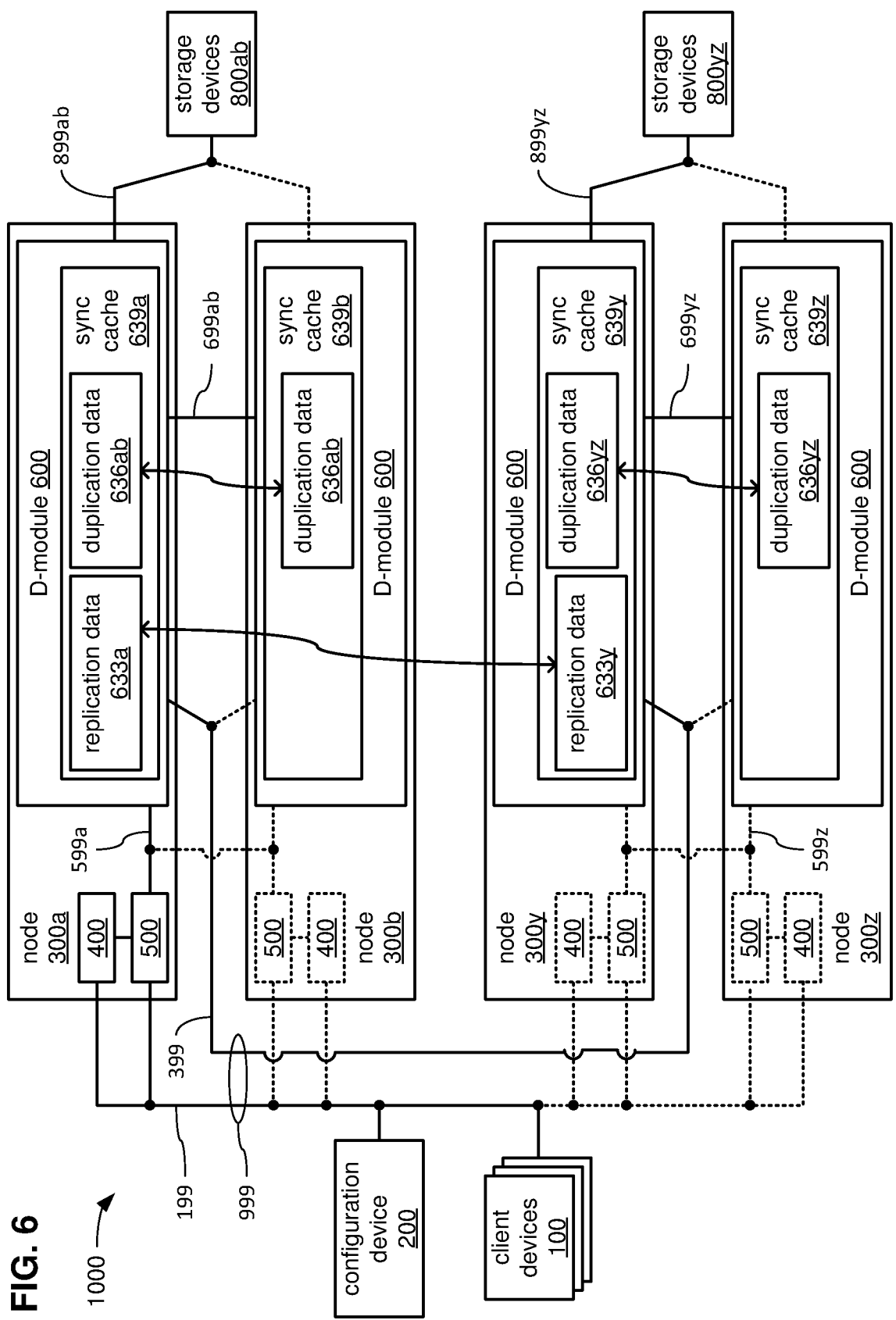
FIG. 6 illustrates an example embodiment of synchronization of commands and metadata among nodes.

FIG. 6 depicts an example embodiment of duplication of metadata within a HA group, and replication of data access commands relating to the client data 130 between nodes of different HA groups in greater detail. As depicted, the node 300a may be active within the HA group 1600ab to communicate with the client devices 100 and/or the configuration device 200 via the client interconnect 199, and/or may be active to communicate with node 300y, which may be active within the HA group 1600yz to communicate with the node 300a via the inter-cluster interconnect 399. The nodes 300b and 300z may be inactive as each awaits the need to take over for the nodes 300a or 300y, respectively. The active state of the node 300a for communication with the client devices 100 and/or the configuration device 200 such that the Management module 400 and the Network module 500 of the node 300a is in use to do so is indicated by the portions of the client interconnect 199 coupling the node 300a to the client devices 100 being drawn with solid lines, while portions for coupling each of the nodes 300b and 300y-z to the client interconnect 199 are drawn with dotted lines. The active states of both the nodes 300a and 300y for communication with each other are indicated by the portions of the inter-cluster interconnect 399 coupling the nodes 300a and 300y being drawn with solid lines, while portions for coupling each of the nodes 300b and 300z to the inter-cluster interconnect 399 are drawn with dotted lines.

As depicted and as has been described, the sync caches 639a-b and 639y-z may be formed within the memories 660 of the Disk modules 600 of each of the nodes 300a-b and 300y-z, respectively, to enable the duplication of metadata and/or the replication of data access commands. As also previously discussed, the sync caches 639a and 639b may both include the duplication data 636ab as part of enabling cooperation between the Disk modules 600 of the partnered nodes 300a and 300b to exchange the metadata 630ab generated from metadata portions received from the Management module 400 and/or the Network module 500. However, the sync caches 639a-b and/or the duplication data 636ab may also be employed in exchanges of status occurring between the Disk modules 600 of the nodes 300a and 300b as part of each monitoring the other for indications of failure that may necessitate a takeover of one of the nodes 300a-b by the other. The sync caches 639a and 639b may be operated in a manner in which they are functionally linked to provide a portal between the Disk modules 600 of the nodes 300a and 300b that may be buffered at both ends of the HA interconnect 699ab. Indications of current status of these Disk modules 600 and/or duplicates of versions of the metadata 630ab may be exchanged by writing such indications and/or metadata into the duplication data 636ab of one of the sync caches 639a or 639b, and retrieving such indications and/or pieces of metadata from the duplication data 636ab of the other of the sync caches 639a or 639b. Stated differently, the contents of the duplication data 636ab may be recurringly "synchronized" between the sync caches 639a and 639b.

As also previously discussed, the sync cache 639y may include replication data 633y as a counterpart to the replication data 633a within the sync cache 639a as part of cooperation between the Disk modules 600 of the nodes 300a and 300y to perform data access commands and replicas thereof at least partially in parallel. The replication data 633a and 633y may buffer information conveyed between the Disk modules 600 of the nodes 300a and 300y via the inter-cluster interconnect 399. More specifically, indications of current status of the replication of data access commands by the Disk module 600 of the node 300a, current status of at least partial parallel performance of the replica data access commands by the Disk module 600 of at least the node 300y, and/or current status of communications therebetween concerning the replica data access commands may be maintained as part of the replication data 633a. Alternatively or additionally, replica data access commands transmitted to the Disk module 600 of the node 300y, portions of client data 130 conveyed with those replica data access commands and/or in response to those replica data access commands may also be maintained as part of the replication data 633a. Correspondingly, the replica data access commands received by the Disk module 600 of the node 300y via the inter-cluster interconnect 399 from the Disk module 600 of the node 300a may be buffered within the replication data 633y, along with any client data 130 that accompanies those replica data access commands and/or responses thereto. Indications of the current status of performance of those replica data access commands by the Disk module 600 of the node 300y may also be buffered within the replication data 633y before being transmitted to the Disk module 600 of the node 300a.

As further depicted, the sync caches 639y and 639z may include duplication data 636yz as part of enabling cooperation between the Disk modules 600 of the partnered nodes 300y and 300z to exchange status indications and duplicates of metadata therebetween in much the same manner as described above between the Disk modules 600 of the nodes 300a and 300b. Stated differently, the Disk modules 600 of the nodes 300y and 300z may cooperate to recurringly exchange status indications (e.g., "heartbeat" signals and/or status of performing various operations) therebetween via the HA interconnect 699yz as part of each monitoring the other for indications of failure in a manner not unlike that in which the partnered nodes 300a and 300b exchange signals via the HA interconnect 699ab to monitor each other. Further, the Disk module 600 of the active node 300y may transmit versions of metadata to the Disk module of the inactive node 300z via the HA interconnect 699yz in a manner not unlike that in which the partnered nodes 300a and 300b exchange versions of metadata, in addition to storing such versions within the set of storage devices 800yz. It should be noted that the metadata used by and exchanged between the nodes 300y and 300z may be at least partly different from the metadata 630ab used by and exchanged between the nodes 300a and 300b. This may arise at least partly due to the nodes 300a-b and the nodes 300y-z belonging to different HA groups and/or belonging to different clusters.

Figure 7:
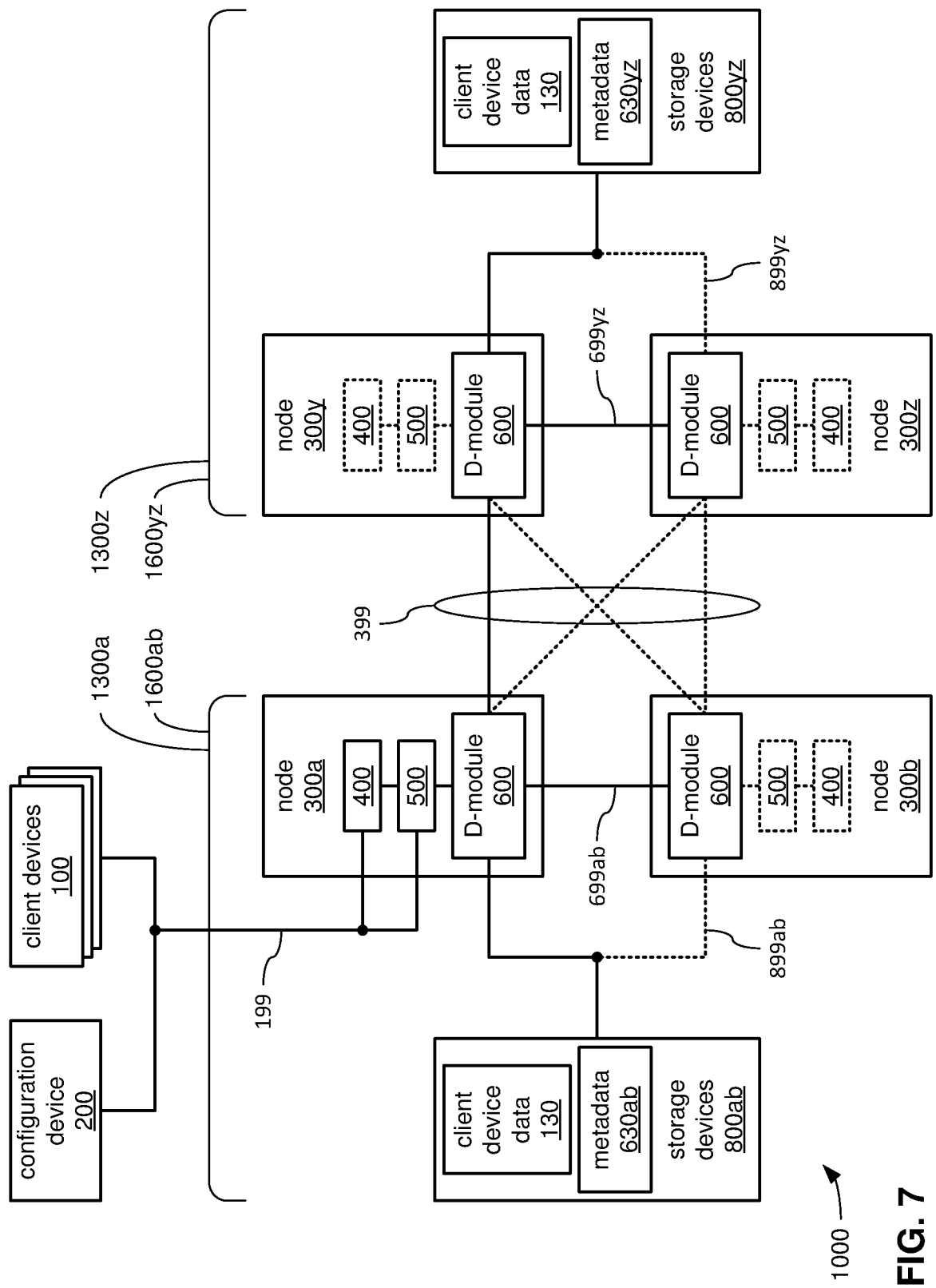
FIG. 7 illustrates an example embodiment of a mesh of communications sessions among nodes.

FIG. 7 depicts an example embodiment of a mesh of communications sessions formed among the nodes 300a-b and 300y-z through the inter-cluster interconnect 399 in greater detail. More specifically, through the inter-cluster interconnect 399, each of the nodes 300a and 300b of the HA group 1600ab forms a communications session with each of the nodes 300y and 300z of the HA group 1600yz, thereby forming the depicted mesh of communications sessions among the nodes 300a-b and 300y-z. As depicted, of these communications sessions, the communications session extending between the nodes 300a and 300y may be an active communications session (as indicated with a solid line), while the others of these communications sessions may be inactive communications sessions (as indicated with dotted lines). This reflects the fact that the nodes 300a and 300y, at least initially, are each the active nodes of the HA groups 1600ab and 1600yz, respectively, that engage in communications to exchange replica data access commands and associated data to enable at least partly parallel performance of data access commands between the HA groups 1600ab and 1600yz.

Thus, during normal operation of the storage cluster system 1000 in which the nodes 300a and 300y are active nodes and no errors occur within either of the nodes 300a or 300y, a request for storage services is received by the node 300a via the client interconnect 199 from one of the client devices 100. Following conversion of the storage services request into a data access command by the Network module 500 of the node 300a, the Disk module 600 of the node 300a may both begin performance of the data access command and transmit a replica of that data access command to the node 300y via the active communications session formed through inter-cluster interconnect 399 between the nodes 300a and 300y. The Disk module 600 of the node 300y may then perform the replica data access command at least partly in parallel with the performance of the data access command by the Disk module 600 of the node 300a.

In preparation for such a transmission, the Disk module 600 of the node 300a may cooperate with the Disk module 600 of the node 300y to form the depicted active communications session between the nodes 300a to 300y through an exchange of messages requesting and accepting formation of the active communications session. Following its formation, the Disk modules 600 of the nodes 300a and 300y may cooperate to maintain the active communications session by recurring exchanges of test signals (e.g., test messages) therethrough to monitor the state of the active communications session.

In addition to the Disk modules 600 of the nodes 300a and 300y cooperating to form and maintain the depicted active communications session through the inter-cluster interconnect 399 to support such exchanges of replica data access commands, the Disk modules 600 of all of the nodes 300a-b and 300y-z may cooperate to form and maintain the depicted inactive communications sessions through the inter-cluster interconnect 399 in preparation for handling an error condition affecting one of the nodes 300a or 300y. More specifically, test signals (e.g., test messages) may be exchanged through one or more of the inactive communications sessions to monitor their state.

In the event of a failure of at least a portion of the node 300a, the node 300b may take over for the node 300a, and in so doing, may change the state of the inactive communications session extending between the Disk modules 600 of the nodes 300b and 300y into an active communications session. By doing so, the node 300b becomes able to transmit replica data access commands to the node 300y in place of the node 300a. Correspondingly, in the event of a failure of at least a portion of the node 300y, the node 300z may take over for the node 300y, and in so doing, may change the state of the inactive communications session extending between the Disk modules 600 of the nodes 300a and 300z into an active communications session. By doing so, the node 300z becomes able to receive and perform replica data access commands from the node 300a in place of the node 300y. In either of these events, the active communications session extending between the Disk modules of the nodes 300a and 300y may become inactive.

In various embodiments, each of the processor components 450, 550 and 650 may include any of a wide variety of commercially available processors. Also, one or more of these processor components may include multiple processors, a multi-threaded processor, a multi-core processor (whether the multiple cores coexist on the same or separate dies), and/or a multi processor architecture of some other variety by which multiple physically separate processors are in some way linked.

In various embodiments, each of the control routines 440, 540 and 640 may include one or more of an operating system, device drivers and/or application-level routines (e.g., so-called "software suites" provided on disc media, "applets" obtained from a remote server, etc.). As recognizable to those skilled in the art, each of the control routines 440, 540 and 640, including the components of which each may be composed, are selected to be operative on whatever type of processor or processors may be selected to implement applicable ones of the processor components 450, 550 or 650, or to be operative on whatever type of processor or processors may be selected to implement a shared processor component. In particular, where an operating system is included, the operating system may be any of a variety of available operating systems appropriate for corresponding ones of the processor components 450, 550 or 650, or appropriate for a shared processor component. Also, where one or more device drivers are included, those device drivers may provide support for any of a variety of other components, whether hardware or software components, of corresponding ones of the modules 400, 500 or 600.

In various embodiments, each of the memories 460, 560 and 660 may be based on any of a wide variety of information storage technologies, possibly including volatile technologies requiring the uninterrupted provision of electric power, and possibly including technologies entailing the use of machine-readable storage media that may or may not be removable. Thus, each of these memories may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a RAID array). It should be noted that although each of these memories is depicted as a single block, one or more of these may include multiple storage devices that may be based on differing storage technologies. Thus, for example, one or more of each of these depicted memories may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these memories may be made up of multiple storage components based on identical storage technology, but which may be maintained separately as a result of specialization in use (e.g., some DRAM devices employed as a main memory while other DRAM devices employed as a distinct frame buffer of a graphics controller).

In various embodiments, the interfaces 490, 590 and 690 may employ any of a wide variety of signaling technologies enabling these computing devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

As has been discussed in detail, redundancy in storing and accessing the client data 130 may be provided by effecting at least partly parallel performance of data access operations between at least two nodes that belong to different HA groups of different clusters that may be geographically dispersed. As familiar to those skilled in the art, various challenges are presented in coordinating such performances occurring at geographically distant locations, including delays imposed in transmitting commands across a long distance. Further challenges may be imposed by the use of a network in such long distance transmissions, including receiving duplicates of the commands and/or receiving the commands in an order that differs from the order in which they were transmitted and/or from the order in which they are to be executed.

Figure 8:
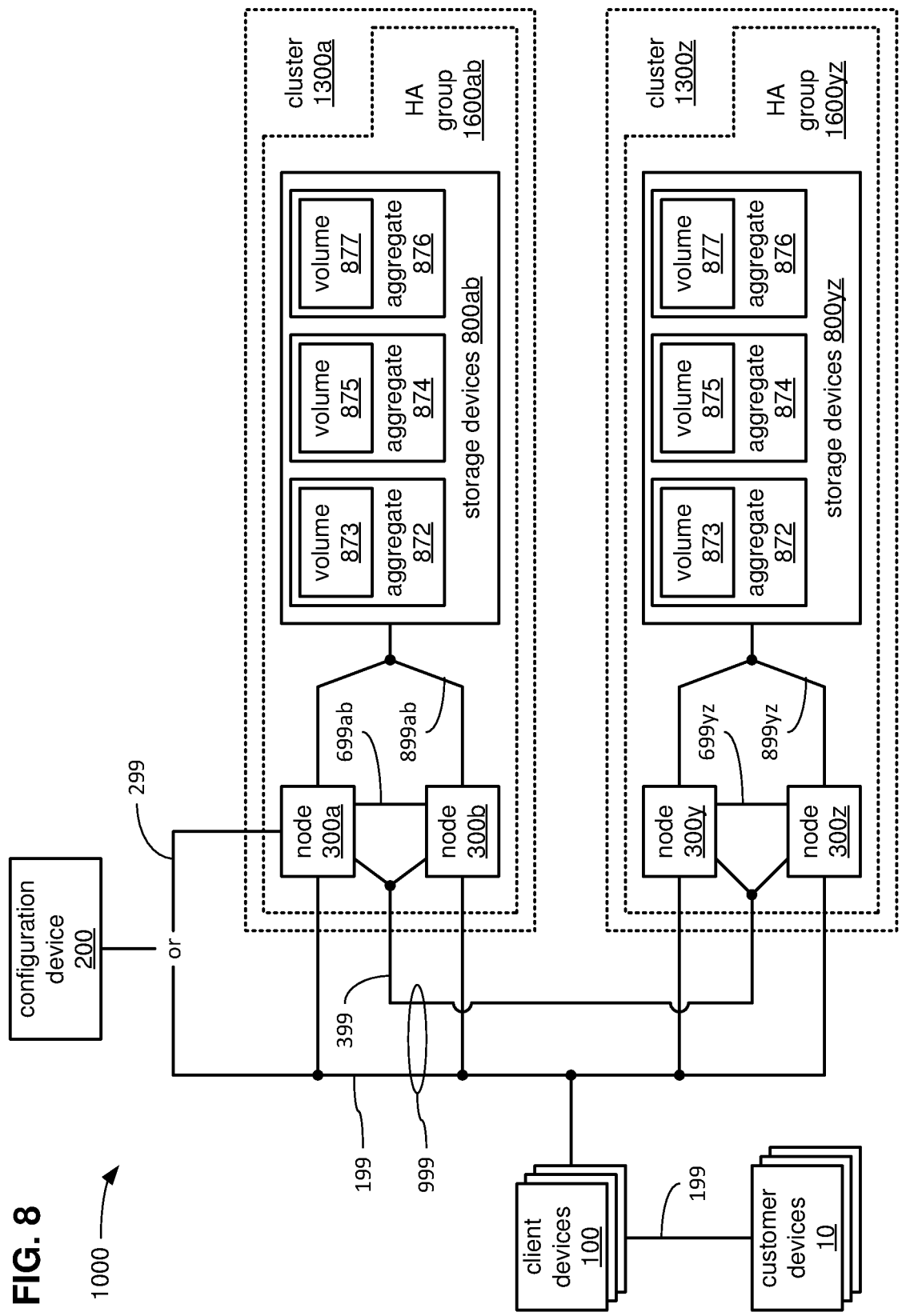
FIG. 8 illustrates another example embodiment of a storage cluster system.

FIG. 8 depicts an example of configuration and implementation of a quality of service (QoS) policy within an embodiment of the storage cluster system 1000 in greater detail. Again, and similar to what was depicted in FIG. 1, such an embodiment of the storage cluster system 1000 may incorporate one or more of the client devices 100, the configuration device 200, and/or one or more clusters, such as the depicted clusters 1300*a* and 1300*z*. Further, the cluster 1300*a* may incorporate the HA group 1600*ab*, which may incorporate the nodes 300*a-b* as partners and the set of storage devices 800*ab*. Correspondingly, the cluster 1300*z* may incorporate the HA group 1600*yz*, which may incorporate the nodes 300*y-z* as partners and the set of storage devices 800*yz*. Again, the client devices 100 and/or the configuration device 200 may be coupled to one or more of the nodes 300*a-b* and/or 300*y-z* via the client interconnect 199, and the nodes 300*a-b* may be coupled to the nodes 300*y-z* via the inter-cluster interconnect 399. Further, the within each of the HA groups, corresponding ones of the nodes 300*a-b* and 300*y-z* may be coupled via the HA interconnects 699*ab* and 699*yz*, and corresponding ones of the nodes 300*a-b* and 300*y-z* may be coupled to the sets of storage devices 800*ab* and 800*yz* via the storage interconnects 899*ab* and 899*yz*.

However, as depicted in FIG. 8, the configuration device 200 may alternately be coupled to one or more of the nodes 300*a-b* and/or 300*y-z* via the client interconnect 199 or a separate and distinct configuration interconnect 299. In some embodiments, the configuration interconnect 299 may be a network interconnect that may be physically separate and distinct from others of the interconnects 199, 399, 599*a*, 599*z*, 699*ab*, 699*cd*, 699*yz*, 899*ab*, 899*cd* and 899*yz*. In such embodiments, the configuration interconnect 299 may employ one or more wireless and/or wired technologies, not unlike one or more of these other interconnects. Alternatively, the configuration interconnect 299 may be implemented as a virtual private network or other form of secure communications channel formed through a network and/or the Internet through which one or both of the interconnects 199 and 399 may also be routed. In other embodiments, the configuration interconnect 299 may be implemented as any of a variety of type of direct (e.g., point-to-point) connection between the configuration device 200 and one of the nodes 300*a-b* or 300*y-z* (e.g., the node 300*a*, as depicted). Such a direct connection may be implemented using nay of a variety of serial and/or parallel interconnect specifications, including and not limited to, USB, RS-232C or RS-422.

As also depicted in FIG. 8, and differing from what was depicted in FIG. 1, one or more customer devices 10 may be coupled to the storage cluster system 1000 via coupling(s) to one or more of the client devices 100 via the client interconnect 199 and/or another interconnect (not shown). In some embodiments, an operator of the client device(s) 100 may be a provider of various services to operators of the customer devices 10. In providing those services, the operator of the client device(s) 100 may rely on the provision of various types of storage services by the storage cluster system 1000. It may be that at least the nodes 300*a-b* and 300*y-z*, and the sets of storage devices 800*ab* and 800*yz* are owned and operated by an individual, a government, a corporation or other entity that may provide storage services to the operator of the client device(s) 100 in accordance with terms of a service agreement therebetween to support the provision of services to operators of the customer devices 10 by the operator of the client device(s) 100. Alternatively, it may be that at least the nodes 300*a-b* and 300*y-z*, and the sets of storage devices 800*ab* and 800*yz* are sold to the operator of the client device(s) 100 to use in supporting the provision of services to operators of the customer devices 10.

Regardless of the exact manner in which the configuration device 200 is coupled to one of the nodes of the storage cluster system 1000, while so coupled, the configuration device 200 may be operated to generate configuration data specifying the operation of various aspects of the storage cluster system 1000 in accordance with the provision of storage services sought by the operator of the client device(s) 100. The configuration device 200 may then transmit such configuration data to at least one of the nodes 300*a-b* and/or 300*y-z* to which it is coupled to prepare at least that node for providing storage services to one or more of the client devices 100. It may be that among the aspects so specified are amounts of storage space for one or more volumes of storage space within one or more sets of storage devices to be allocated for use in storing client data 130 with maximum rates of throughput in accessing client data 130 also specified for each of those volumes of storage space, thereby specifying one or more types of storage service to be provided.

More specifically, and as depicted as an example in FIG. 8, such configuration data may specify the quantities of storage space and maximum rates of throughput for each of three volumes 873, 875 and 877. Where at least the maximum rates of throughput are sufficiently different among the volumes 873, 875 and 877, it may be necessary to employ different types of storage device(s) having different performance characteristics and to define three different aggregates 872, 874 and 876, respectively, based on those different types of storage device(s) to provide the storage space for each of these volumes. Such configuration data may further specify the manner in which one or more of the nodes of the storage cluster system 1000 may respond to instances of upper limits of storage space and/or a maximum rate of throughput being reached or exceeded for each of these volumes. In some embodiments, one or more of the nodes may provide an indication to one or more of the client devices 100 and/or to the configuration device 200 of such an upper limit of storage capacity and/or such a maximum rate of throughput having been reached or exceeded as feedback.

Upon being provided with configuration data, at least one node of the storage cluster system 1000 that is active to engage in communications with one or more of the client devices 100 may act to limit the rate of throughput at which each volume is accessed to the maximum rate(s) of throughput specified in the configuration data, thereby enforcing a QoS policy. In embodiments in which a rate of throughput of access to client data 130 is dynamically adjusted for one or more volumes based on an amount of the client data 130 stored therein, one or more of the active nodes may track the amount of client data 130 that is so stored. Further, in embodiments in which deduplication is employed to reduce the amount of storage space occupied in one or more volumes by the storage of the client data 130, one or more of the active nodes may track both the quantity of client data 130 stored and the quantity of storage space actually occupied by that stored client data 130.

Figure 9A:
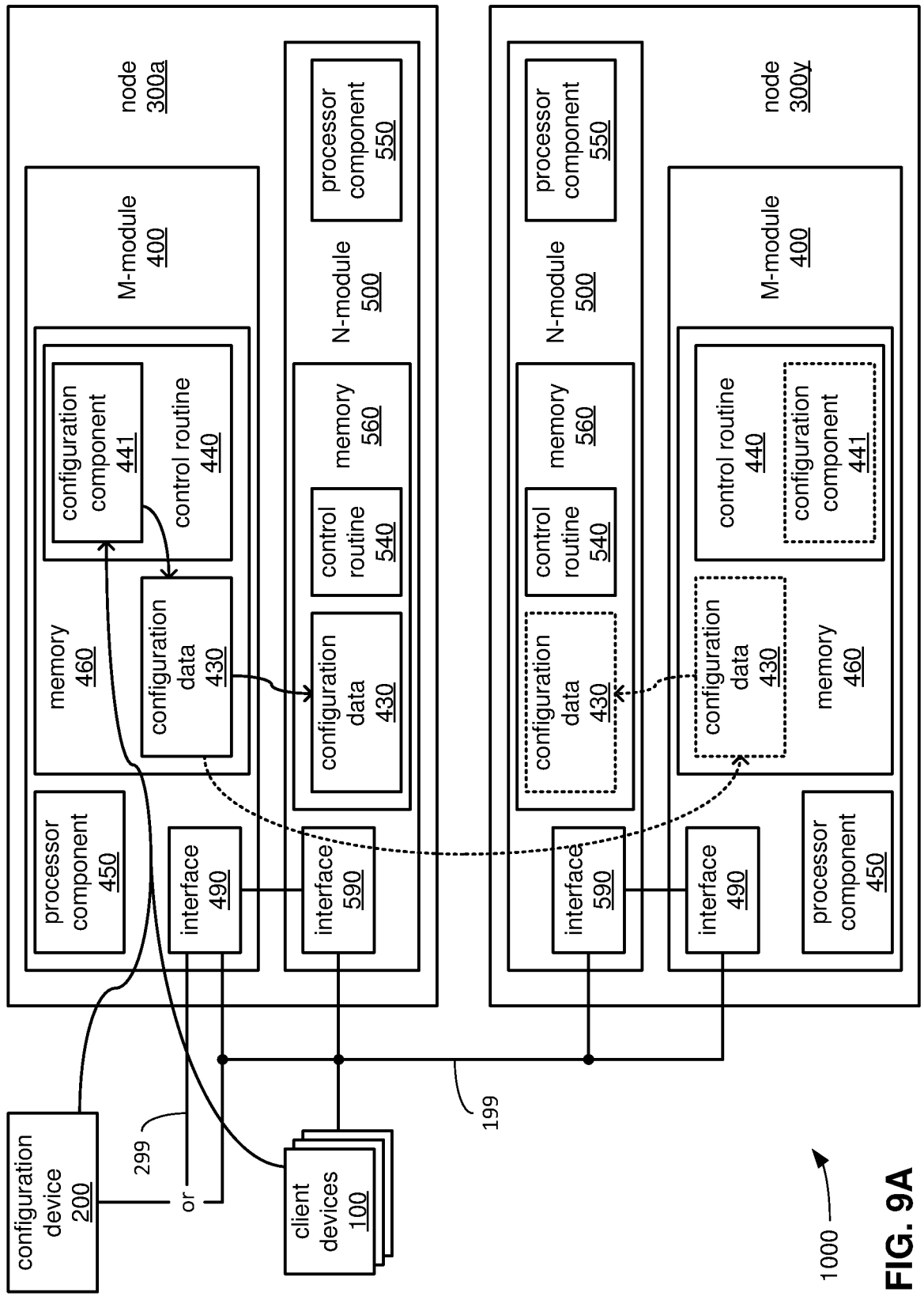
FIGS. 9A, 9B and 9C, together, illustrate an example embodiment of components of active and inactive nodes of different HA groups receiving and storing configuration information.
Figure 9B:
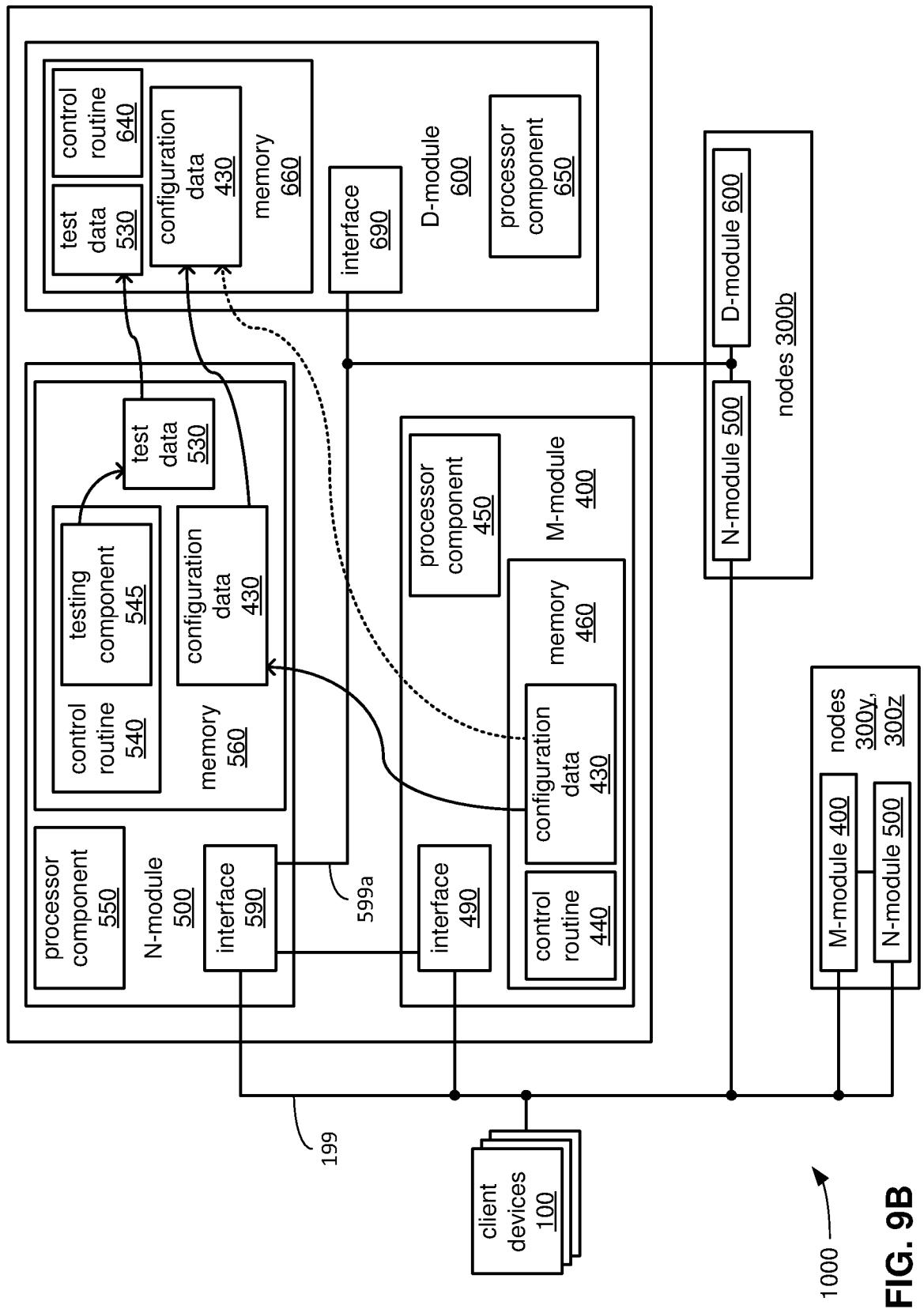
Figure 9C:
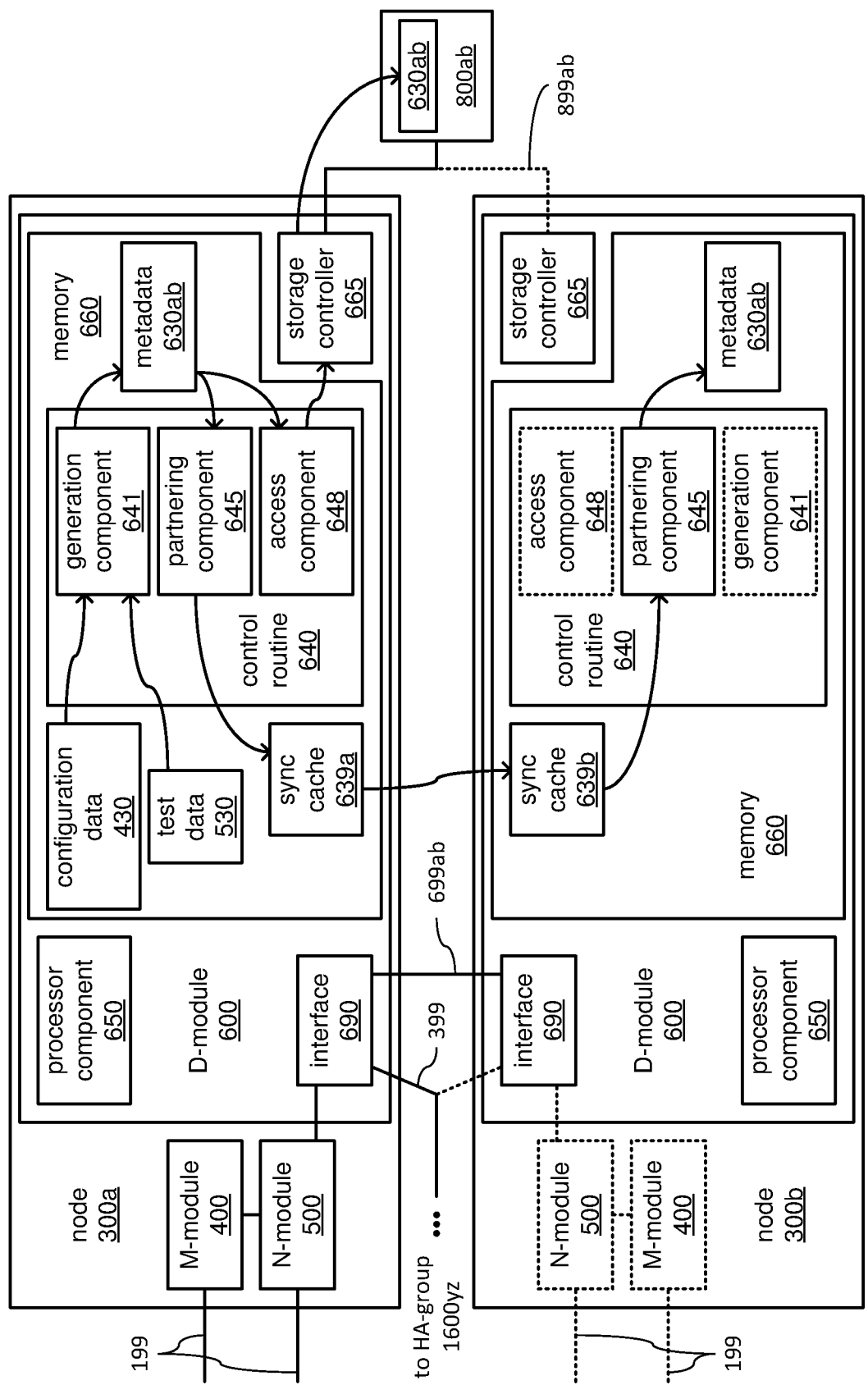

FIGS. 9A through 9C, together, illustrate an example embodiment of configuring the nodes 300a-b and 300y-z of the storage cluster system 1000 in greater detail. More specifically, FIG. 9A depicts components of Management modules 400 of the nodes 300a and 300y in greater detail, along with aspects of receiving or otherwise obtaining configuration data specifying aspects of operation of at least the node 300a within the storage cluster system 1000. FIG. 9B depicts components of a Network module 500 of the node 300a in greater detail, along with aspects of performing tests to determine various aspects of operation of at least the node 300a within the storage cluster system 1000. FIG. 9C depicts components of Disk modules 600 of the nodes 300a-b in greater detail, along with aspects of generating, storing and/or distributing metadata that incorporates at least a portion of the configuration data. As depicted, the node 300a may be active within the HA group 1600ab to communicate with the client devices 100 and/or the configuration device 200 via the client interconnect 199 and/or the configuration interconnect 299, as well as with the node 300y, which may be active within the HA group 1600yz to exchange replica data access commands with the node 300a via the inter-cluster interconnect 399. Again, the nodes 300b and 300z may be inactive as each awaits an indication of a need to take over for the nodes 300a or 300y, respectively.

Turning to FIG. 9A, as depicted, the control routine 440 within the Management module 400 of each of the nodes 300a and 300y may incorporate a configuration component 441. Also, and though not specifically shown, the Management modules 400 of the nodes 300b and 300z may also each incorporate a control routine 440 that incorporates the configuration component 441. As previously discussed, as a result of the node 300a being active to engage in communications with one or more of the client devices 100 and/or the configuration device 200, the processor component 450 of the Management module 400 of the node 300a may be active to execute at least a portion of the control routine 440 (as indicated with the Management module 400 of the node 300a being drawn with solid lines). In so executing the control routine 440, the processor component 450 of the Management module 400 of at least the node 300a may execute the configuration component 441 of the control routine 440. However, as a result of the node 300y not being active to engage in communications with any of the client devices 100 and/or with the configuration device 200, the processor component 450 may not be active to execute the configuration component 441 of the control routine 440 within the Management module 400 of the node 300y (as indicated with the Management module 400 of the node 300b being drawn with dotted lines).

Within the Management module 400 of at least the node 300a, the configuration component 441 may be executable by the processor component 450 to accept remotely supplied configuration information concerning aspects of operation of at least the node 300a within the storage cluster system 1000. More specifically, in some embodiments, the configuration component 441 may operate the interface 490 to receive configuration data 430 from the configuration device 200 specifying various aspects of the operation of at least the node 300a of the storage cluster system 1000 via either the client interconnect 199 or the configuration interconnect 299. Alternatively or additionally, the configuration component 441 may operate the interface 490 to receive the configuration data 430 indirectly from the configuration device 200 via a portable solid state memory device (e.g., a so-called "thumb drive") to which the configuration data 430 was earlier transferred from the configuration device 200.

In other embodiments, the configuration component 441 may operate the interface 490 to accept remotely supplied configuration information from one or more of the client devices 100 via the client interconnect 199, and may store such configuration information within the memory 460 as at least a portion of the configuration data 430. In so doing, the configuration component 441 may provide a web page interface, telnet access, instant messaging and/or other communications service(s) by which aspects of the operation of the node 300a, the HA group 1600ab, the cluster 1300a and/or other components of the storage cluster system 1000 may be remotely configured from one or more of the client devices 100.

As the processor component 450 receives either the configuration data 430 or at least a portion of the configuration information that makes up the configuration data 430, the processor component 450 may relay at least a portion of the configuration data 430 as a portion of metadata to Network module 500 and/or the Disk module 600 of the node 300a. As will shortly be explained in greater detail, the configuration data 430 (or portions thereof) may be employed as a portion of metadata to be combined with one or more other portions of metadata to generate the metadata 630ab.

As depicted, the processor component 450 may additionally operate the interface 490 to transmit at least a portion of the configuration data 430 to the Management module 400 of the node 300y. This may be deemed desirable as a mechanism to convey indications of aspects of operation of at least the node 300y that may also be included in the configuration information accepted by the Management module 400 of the node 300a and stored as part of the configuration data 430. This may obviate the need to separately provide the same or substantially similar configuration information to the Management module 400 of the node 300y as was provided to the Management module 400 of the node 300a. By way of example, it may be desired to apply details of the manner in which client data 130 is to be stored within the set of storage devices 800ab to the manner in which the same client data 130 is also stored within the set of storage devices 800yz as part of volume(s) storing client data 130 within the set of storage devices 800ab being mirrored within the set of storage device 800yz. In embodiments in which at least a portion of the configuration data 430 is transmitted to the Management module 400 of the node 300y, an indication of a network address or other mechanism to reach the Management module 400 of the node 300y may be included in the configuration information that is stored as part of the configuration data 430.

Among aspects of such operations that may be specified within the configuration data 430 may be one or more of security protocols by which each of the client devices 100 may be authenticated, protocols by which requests for storage services may be received from and/or by which client data 130 may be exchanged with one or more of the client devices 100, what file system may be employed in storing client data 130 within at least the set of storage devices 800ab, what other one(s) of the nodes 300b-d or 300y-z may be partnered with the node 300a to form the HA group 1600ab, what other node and/or HA group may cooperate with the node 300a and/or the HA group 1600ab to provide further fault tolerance, etc. By way of example, in embodiments in which one of the widely known and used versions or "levels" of RAID is employed in storing client data 130 within one or more of the sets of storage devices 800ab, 800cd or 800yz, the type or level of RAID may be specified in the configuration information stored as the configuration data 430, as well as one or features of typical RAID configurations, such as stripe size, block size and/or aspects of the redundancy calculations used.

Also among aspects of such operations that may be specified within the configuration data 430 may be individual network addresses that may be allocated to others of the nodes 300a-b and/or 300y-z, network address that may be allocated to components of one or more nodes, and/or ranges of network addresses that may be allocated to one or more of those nodes and/or to components of one or more of those nodes on various interconnects, etc. By way of example, in embodiments in which one or more of the interconnects 199, 299, 399, 599a, 599z, 699ab, 699yz, 899ab and 899yz employ IP addressing, individual IP addresses or ranges of IP addresses may be specified in the configuration information that is stored as the configuration data 430.

Still further among aspects of such operations that may be specified within the configuration data 430 may be quantities of storage space allocated to each of one or more volumes and/or maximum rates of throughput for accessing client data 130 stored within those one or more volumes. As will be explained in greater detail, where there are to be multiple volumes, a priority or other ordering may be specified in the configuration data 430 for those multiple volumes to determine which one(s) of those volumes are to continue to be accessible at up to their specified maximum rates of throughput and which may be limited to a rate of throughput that is less than their specified maximum rate of throughput in response to an upper limit of overall throughput of one or more of the nodes 300a-b and/or 300y-z having been reached.

Turning to FIG. 9B, as depicted, the control routine 540 within the Network module 500 of at least the node 300a may incorporate a testing component 545. Though not specifically shown, the Network modules 500 of the nodes 300b and/or 300y-z may each also incorporate a control routine 540 that incorporates the testing component 545. As previously discussed, as a result of the node 300a being active to engage in communications with one or more of the client devices 100 and/or the configuration device 200, the processor component 550 of the Network module 500 of the node 300a may be active to execute the control routine 540 (as indicated with the Network module 500 of the node 300a being drawn with solid lines). In executing the control routine 540, the processor component 550 of the Network module 500 of at least the node 300a may execute the testing component 545 of the control routine 540. However, if the node 300b takes over for the node 300a, then at least the testing routine 545 within the control routine 540 of the node 300b may begin to be executed, while the testing routine 545 within the control routine 540 of the node 300a may cease to be executed.

Within the Network module 500 of at least the node 300a, the testing component 545 may be executable by the processor component 550 to perform various tests to detect other devices on one or more interconnects with which to communicate, and/or may be executable to assign network addresses by which other devices may be contacted for communication on one or more interconnects. More specifically, the testing component 545 may operate the interface 590 to perform various tests on one or both of the interconnects 199 and 599a to which the Network module 500 of the node 300a is coupled through the interface 590.

As previously discussed, in preparation for performing one or more of such tests, the Management module 400 of the node 300a may provide the configuration data 430 as a portion of metadata specifying various aspects of operation of at least the node 300a to the Network module 500 of the node 300a. The testing component 545 may operate the interface 590 to receive the configuration data 430, which the testing component 545 may store within the memory 560. As previously discussed, the configuration data 430 may specify network addresses and/or ranges of network addresses (e.g., IP addresses) at which various ones of the nodes 300a-b and/or 300y-z may be made addressable on one or more interconnects including one or both of the interconnects 199 and 599a. Alternatively or additionally, the configuration data 430 may include one or more identifiers that identify one or more of the nodes 300b and/or 300y-z, and/or that identify one or more of the client devices 100 in a manner that is not based on network addressing (e.g., names assigned to operators of one or more of these devices and/or to the devices, themselves).

In some embodiments, the testing component 545 may employ such specified network addresses and/or ranges of network addresses to control the extent of the testing performed, such as limiting network addresses that are tested in a specific test to a range of network addresses specified in the configuration data 430. In such testing, the testing component 545 may retrieve identifiers from devices that may be found at specified network addresses, and may compare the retrieved identifiers to identifiers specified in the configuration data 430 to determine the network addresses at which one or more of the client devices 100, the configuration device 200, and/or one or more of the nodes 300b and/or 300y-z may be contacted.

Alternatively or additionally, the testing component 545 may broadcast, multicast or otherwise transmit requests for devices having specified identifiers to respond to the testing component 545 to enable discovery of those devices by the testing component 545 and/or to enable being assigned network addresses by the testing component 545. As previously discussed, in embodiments in which IP addressing is used on one or both of the interconnects 199 and 599a, the Network module 500 of at least the node 300a may serve as a DHCP server that assigns IP addresses to at least components of one or more of the nodes 300b and/or 300y-z. In so doing, the testing component 545 may determine which ones of the nodes 300b and/or 300y-z, and/or what components of one or more of the nodes 300b and/or 300y-z are able to be communicated with via the interconnects 199 and/or 599a.

During such testing and/or assignment of network addresses, the testing component 545 may query other devices on one or both of the interconnects 199 and 599a for information concerning their network addresses on other interconnects to which the Network module 500 is not coupled through the interface 590. By way of example, the testing component 545 may request that a Disk module 600 of another node (or of the node 300a) provide information concerning network addresses of devices on the inter-cluster interconnect 399, on one or both of the HA interconnects 699ab or 699yz, and/or on one or both of the storage interconnects 899ab or 899yz (including network addresses of the Disk modules 600, themselves). By way of another example, the testing component 545 may request that a Network module 500 of another node provide information concerning network addresses of devices on another intra-cluster interconnect to which the interface 590 of the Network module 500 of the node 300a is not coupled (e.g., the intra-cluster interconnect 599z). Further, the testing components 545 of the Network modules of two or more of the nodes 300a-b and/or 300y-z may exchange information that each has obtained concerning network addresses of devices on various interconnects to which one or more of those Network modules are not coupled.

As the testing component 545 performs such tests and/or assigns network addresses, the testing component 545 may store test data 530 made up of indications of the results of such tests within the memory 560. Further as the testing component 545 performs such tests and/or subsequent to performing such tests, the testing component 545 may operate the interface 590 to transmit at least a portion of the test data 530 to the Disk module 600 as a portion of metadata. As will shortly be explained in greater detail, the test data 530 (or a portion thereof) may be employed as a portion of metadata to be combined with one or more other portions of metadata (e.g., the configuration data 430) to generate the metadata 630ab.

Turning to FIG. 9C, as depicted, the control routine 640 within the Disk modules 600 of each of the nodes 300a-b and 300y-z may incorporate one or more of a generation component 641, a partnering component 645 and an access component 648. In executing the control routine 640, the processor component 650 of each of these Disk modules 600 may execute one or more of the components 641, 645 or 648 of the control routine 640. As previously discussed, as a result of the node 300a being active to engage in communications with one or more of the client devices 100 and/or the configuration device 200, and with the node 300b not being active to do so, the processor components 650 of the Disk modules 600 of the node 300a and 300b may be active to execute different portions of the control routine 640. More specifically, the processor component 650 of the Disk module 600 of the active node 300a may execute one or more of the components 641, 645 and 648 (drawn with solid lines), while the processor component 650 of the Disk module 600 of the inactive node 300b may refrain from executing one or both of the components 641 and 648 (drawn with dotted lines). However, if the node 300b takes over for the node 300a, then the components 641 and 648 of the control routine 640 within the node 300b may begin to be executed, while the components 641 and 648 of the control routine 640 within the node 300a may cease to be executed.

Within the Disk module 600 of at least the active node 300a, the generation component 641 may generate versions of the metadata 630ab from at least the configuration data 430 and/or the test data 530 received from the Management module 400 and/or the Network module 500 of the node 300a as has been described. Thus, at least a subset of the configuration information included within the configuration data 430 may be included within the metadata 630ab, including and not limited to, specifications of an amount of storage space for each of one or more volumes, and/or specifications of a maximum rate of throughput for accessing client data 130 stored within one or more volumes. As previously discussed, the configuration data 430 may also be relayed to other active nodes of other clusters, such as the node 300y of the cluster 1300z. Thus, in the Disk module 600 of the active node 300y, the generation component 641 may generate a counterpart to the metadata 630ab that may also include at least a subset of the configuration information included within the configuration data 430.

As has been described, the metadata 630ab may include both immutable metadata 631ab and mutable metadata 632ab. In some embodiments, there may be a relatively high degree of correlation between what information is included within the configuration data 430 and the test data 530, and what information is included within the immutable metadata 631ab and the mutable metadata 632ab, respectively. However, there may also be some degree of overlap and/or interaction therebetween in some embodiments. By way of example, an aspect of operation of the cluster storage system 1000 may be specified in the configuration data 430 and may be regarded as immutable data, but may also be subject to being overridden by a contradictory indication concerning that same aspect in the test data 530 and may be regarded as mutable data. By way of example, a network address or identifier for a node or a component of a node may be specified in the configuration data 430, but may be discovered to have changed by testing performed by the testing component 545 such that the test data 530 contains a contrary indication of a network address or identifier. Given that the results of such testing reflect a situation discovered to exist versus a specification in the configuration 430 of what is expected to be the situation, the indication in the test data 530 may be accepted in place of the specification in the configuration data 430 that the indication contradicts. Stated differently, a specification of an aspect of operation in the configuration data 430 may be treated as a default that can be subsequently overridden as a result of a test revealing a change from the default.

Within the Disk module 600 of at least the active node 300a, the access component 648 may operate the storage controller 665 to perform various data access operations on client data 130 stored within the set of storage devices 800*ab*. Within the active node 300*a*, the access component 648 may be active to execute data access commands translated by the Network module 500 of the node 300*a* from storage service requests received from the one or more client devices 100. In addition to performing data access commands, the access component 648 of the Disk module 600 of the node 300*a* may also store the metadata 630*ab* generated by the generation component 641 (as well as updates thereto) within the set of storage devices 800*ab*. As previously discussed, the metadata 630*ab* (and updates thereto) may be stored within the set of storage devices 800*ab* in a manner that shares a portion of a storage space within the set of storage devices 800*ab* within which at least a portion of client data 130 may also be stored. As has been previously explained, storage of the metadata 630*ab* at least within a set of storage devices within which at client data 130 is also stored and/or within a portion of a set of storage devices within which at least a portion of client data 130 is also stored enables a copy of the metadata 630*ab* to be kept together with client data 130 (rather than becoming separated therefrom) and thereby retrieved alongside client data 130. This enables the metadata 630*ab* to accompany the client data 130 as such a set of storage devices may be caused to be accessible to a node to which control of such a set of storage devices may be transferred as part of a takeover from another node that may have malfunctioned.

Thus, with the metadata 630*ab* stored within the set of storage devices 800*ab*, a Disk module 600 of whichever one of the nodes 300*a* or 300*b* that is given control over the set of storage devices 800*ab* is able to independently retrieve the metadata 630*ab* for use in commencing communications with other devices following being powered up and/or reset such that a copy of the metadata 630*ab* that may have previously stored within the memory 660 of that Disk module 600 may have been lost. More precisely, following a powering up and/or a reset of at least the Disk module of whichever one of the nodes 300*a* or 300*b* is active, the access component 648 within that active node may operate the storage controller 665 to retrieve the metadata 630*ab* from the set of storage devices 800*ab* and store a copy within the memory 660. As has been discussed, following a powering up and/or reset of the entirety of one of the nodes 300*a*-*d* and/or 300*y*-*z*, it may be that a Disk module 600 is able to boot more quickly than one or more both of the Management module 400 and the Network module 500 such that reliance on one or both of the Management module 400 and the Network module 500 to provide portions of metadata from which to regenerate the metadata 630*ab* may take more time than is deemed desirable. Further, the processes employed by each of the Management module 400 and the Network module 500 to obtain those portions of metadata (e.g., the various tests performed by the Network module 500) may add a further delay. Still further, it may be that one or both of the Management module 400 and the Network module 500 are unable to boot as a result of a failure or other condition such that reliance on one or both of the Management module 400 and the Network module 500 to provide portions of metadata from which to regenerate the metadata 630*ab* may result in an inability of the Disk module 600 to boot, at all. Thus, an independent ability to retrieve the metadata 630*ab* without reliance on either of the Management module 400 or the Network module 500 may enable the Disk module 600 to boot more quickly and/or to boot at all.

Within the Disk module 600 of at least the partnered nodes 300*a*-*b*, the partnering component 645 within the Disk module 600 of each may cooperate with its counterpart within the Disk module 600 of the other to monitor the status of the partner one of the nodes 300*a*-*b* to which the other belongs and to effect a takeover of at least an active partner in response to a failure. More specifically, while the active node 300*a* engages in communications with client devices 100, the configuration device 200 and/or the active node 300*y*, the partnering components 645 within the active node 300*a* and the inactive node 300*b* cooperate to enable at least the status of the node 300*a* to be recurringly monitored for an indication of failure within the node 300*a* that may trigger a takeover by the node 300*b*. Similarly, and though not specifically depicted, while the active node 300*y* engages in communications with the active node 300*a*, the partnering components 645 within the active node 300*y* and the inactive node 300*z* cooperate to enable at least the status of the node 300*y* to be recurringly monitored for an indication of failure within the node 300*y* that may trigger a takeover by the node 300*z*.

Such monitoring between the partnering components 645 of the Disk modules 600 of the nodes 300*a* and 300*b* may entail operating the interfaces 690 of each to exchange any of a variety of signals indicative of status of each of the nodes 300*a*-*b* to the other via the HA interconnect 699*ab*, as has been discussed. Again, the signals exchanged may be relatively simple so-called "heartbeat" signals that each of the partnering components 645 expects to receive from the other within on a recurring period of time such that the lack of receipt of such a signal by the partner component 645 of one of the nodes 300*a*-*b* within one of the instances of that recurring period of time may be taken as an indication of failure of the other of the nodes 300*a*-*b*. Alternatively or additionally, the signals exchanged may be messages that explicitly indicate the status of one or more of the components of whichever one of the nodes 300*a*-*b* transmits them, and a failure within one of the nodes 300*a*-*b* may be expressly indicated in such a message received by the other of the nodes 300*a*-*b*.

As yet another alternative, the signals exchanged may include at least a portion of metadata, such as indications of network addresses at which each of the Disk modules 600 of the nodes of a HA group are accessible on an intra-cluster interconnect (e.g., the intra-cluster interconnect 599*a* or 599*z*), on a HA interconnect (e.g., the HA interconnect 699*ab* or 699*yz*) and/or on the inter-cluster interconnect 399. The partnering component 645 within at least an active node of a HA group may convey such received indications and/or updates to the generation component 641 within that node for use in generating and/or updating the metadata 630*ab*. Such an exchange of indications of network addresses of at least Disk modules 600 may be in addition to or in lieu of the retrieval of network addresses as part of the tests performed by the testing component 545 within the Network module 500. Thus, such indications of such network addresses received by the partnering component 645 within the Disk module 600 of the node 300*a* may become an input that the generation component 641 may employ in generating and/or updating at least the mutable metadata 632*ab*.

Beyond monitoring the status of another node and/or exchanging some amount of network address information or other information from which metadata may be derived, the partnering components 645 within the Disk modules 600 of the nodes 300*a* and 300*b* may cooperate to distribute the metadata 630*ab* (or updates thereto) between the nodes 300*a* and 300*b*. More specifically, the partnering components 645 within the nodes 300*a* and 300*b* may cooperate to convey a copy of the metadata 630*ab* from the active node 300*a* to the inactive node 300*b* following generation by the generating component 641 within the Disk module 600 of the active node 300*a*. As previously discussed, such a distribution of the metadata 630*ab* may be performed through use of the sync caches 639*a* and 639*b* maintained by at least the partnering components 645 within the Disk modules 600 of the nodes 300*a* and 300*b*, respectively. As has also been previously discussed, such a direct distribution of the metadata 630*ab* from the active node 300*a* to the inactive node 300*b* may be performed to ensure that the inactive node 300*b* is more speedily provided with an up to date copy of the metadata 630*ab* that is maintained within the memory 660 within the node 300*b* for immediate use if the node 300*b* is caused to take over for the node 300*a* as a result of a failure occurring within the node 300*a*.

FIG. 10 depicts an example embodiment of specification by the configuration data 430 (and subsequently by the metadata 630*ab* and its counterpart generated within the node 300*y*) of amounts of storage capacity and/or maximum rates of throughput for accessing client data 130 within each of three volumes 873, 875 and 877 defined within each of aggregates 872, 874 and 876, respectively. As depicted, each of these aggregates may be made up of the storage space of one or more storage devices (individual LUs) of the set of storage devices 800*ab*. Specifically, the aggregate 872 may be made up of one or more of LUs 862*t*, 862*u* and 862*v*; the aggregate 874 may be made up of one or more of LUs 864*t*, 864*u* and 864*v*; and the aggregate 876 may be made up of one or more of LUs 866*t*, 866*u* and 866*v*. It should be note that, although not specifically depicted, corresponding storage devices (individual LUs) of the set of storage devices 800*yz* may be employed to provide redundant versions of the same three aggregates 872, 874 and 876 within which redundant versions of the same three volumes 873, 875 and 877, respectively, may be defined.

Such specifications of capacity and maximum rate of throughput may be associated with the quantities and/or types of components employed in assembling a combination of one or more of the nodes and/or sets of storage devices that make up the storage cluster system 1000. More specifically, one or more of the components of each of the nodes 300*a-b* and 300*y-z* may impose an upper limit on the overall maximum rate of throughput at which client data 130 stored within the set of storage devices 800*ab* or 800*yz* may be accessed through a corresponding one of these nodes. Also, a storage device of the set of storage devices 800*ab* and/or 800*yz* may impose an upper limit on the rate of throughput at which client data 130 client data within any volume stored within that storage device may be accessed and/or may impose an upper limit on the amount of storage space available for one or more volumes. In various embodiments, the upper limits of components of one or more of these nodes and/or the upper limits of one or more these storage devices may determine storage capacities and/or maximum rates of throughput specified in the configuration data 430. Alternatively, particular embodiments of one or more of the nodes 300*a-b* and/or 300*y-z*, and/or one or more embodiments of the sets of storage devices 800*ab* and/or 800*yz* may be selected to ensure that the storage capacities and/or maximum rates of throughput specified in the configuration data 430 are met.

More specifically, regarding the components of the nodes 300*a-b* and/or 300*y-z*, any of the interfaces 590 and 690, the processor components 550 and 650, and the memories 560 and 660 may impose a limitation on the rate of data, processing and/or storage throughput that defines an overall maximum rate of throughput for accessing client data 130 through one or more of these nodes. By way of example, such a limitation may be imposed by the maximum rate at which the Network module 500 is able to convert between the protocols of requests for storage services and responses thereto exchanged with the client device(s) 100 and the protocols of data access commands exchanged with the Disk module 600. Alternatively or additionally, such a limitation may be imposed by the maximum rate at which the Disk module 600 is able to operate the set of storage devices 800*ab* to perform the data access commands and/or is able to generate and exchange replica data access commands with the node 300*y*. Therefore, it may be deemed desirable to ensure that the sum of the maximum rates of throughput specified for each volume in the configuration data 430 (and subsequently in the metadata 630*ab* and/or its counterpart for the nodes 300*y-z*) does not exceed the maximum rate of throughput of any of the nodes 300*a-b* or 300*y-z*. Indeed, it may be deemed desirable to ensure that the maximum rate of throughput of each of the nodes 300*a-b* and 300*y-z* exceeds the sum of the specified maximum rates of throughput by a large enough margin to ensure that one or more of these nodes has the extra resources required to handle error conditions and/or other situations. Thus, either the maximum rates of throughput specified in the configuration data 430 may be selected to avoid exceeding upper limits of rates of throughput that can be achieved with the components of the node 300*a-b* and/or 300*y-z*, or those components may be selected to ensure that overall maximum rate of throughput able to be supported is greater than the sum of the maximum rates of throughput specified in the configuration data 430 for one or more volumes. For example, the configuration device may analyze choices of components and/or choices of level(s) of QoS to determine whether the components selected are each able to support a sufficiently high rate of throughput as to ensure that the sum of the specified rates of throughput at least does not result in the maximum rate of throughput of any component of the storage cluster system 1000 being exceeded.

Regarding the storage devices making up each of the sets of storage devices 800*ab* and 800*yz*, as familiar to those skilled in the art, each such storage device may have a finite storage capacity and an upper limit on rate of throughput to access (e.g., to store and/or to retrieve) data that is stored therein. In some embodiments, the storage capacity and upper limit on rate of throughput of only a single storage device may both be sufficiently high that the entirety of one of the aggregates 872, 874 and 876 may be formed from a single one of the LUs 862*t*, 864*t* or 866*t*, respectively, as depicted with solid lines. However, in other embodiments, the amount of storage capacity and/or the maximum rate of throughput specified in the configuration data 430 for one or more of the volumes 873, 875 or 877 may be sufficiently high that there is no single storage device that can be used to meet those specifications, or it may be that such a single storage device can only be obtained at a cost deemed to be excessive. As familiar to those skilled in the art, such higher specifications may be met by combining multiple storage devices into an array or other configuration of multiple storage devices to define an aggregate that increases one or both of storage capacity and rate of throughput. Further, as previously discussed, it may be deemed desirable to employ multiple storage devices with any of a variety of data redundancy algorithms in defining an aggregate to avoid the possibility of losing of one or more volumes as a result of a failure of a single storage device. In other words, one or more of the aggregates 872, 874 and 876 may be formed from multiple LUs, as depicted with dotted lines. It should be noted, however, that despite the depiction of up to three LUs as forming each of these aggregates, other quantities of multiple storage devices may be used (e.g., two LUs, or four or more LUs). Thus, either the amounts of storage capacity and maximum rates of throughput specified in the configuration data 430 for each volume may be selected to avoid exceeding amounts of storage capacity and/or rates of throughput that can be achieved with the storage device selected to define the aggregates 872, 874 and/or 876, or those storage devices may be selected to ensure that the amounts of storage capacity and maximum rates of throughput specified in the configuration data 430 are able to be supported. For example, the configuration device may analyze choices of storage devices against choices in capacities for each volume to determine whether the components selected are each able to support those choices in capacities.

In some embodiments, the configuration data 430 may specify each of the three volumes 873, 875 and 877 as having sufficiently different amounts of storage capacity allocated thereto and/or sufficiently different rates of throughput for accessing client data 130 stored therein that different types of storage device may be selected to implement the aggregates 872, 874 and 876, respectively, within these three volumes exist. Such differences in specification among the volumes 873, 875 and 877 may represent different types of storage service that are each created to accommodate different applications. By way of example, the specifications within the configuration data 430 for the volume 873 may require a relatively high amount of storage capacity, but may require only a relatively low rate of throughput to access client data 130 that may be stored therein. With such specifications, the volume 873 may be intended to serve as archival storage in which client data 130 that is stored therein is expected to be accessed relatively infrequently. In contrast, the specifications within the configuration data 430 for the volume 877 may require a relatively high rate of throughput to access client data 130 stored therein, but may require only a relatively low quantity of storage capacity. With such specifications, the volume 877 may be intended to serve as a cache for online transaction processing (OTP) or as a buffer for the transmission of high definition streaming video. Further, the specifications within the configuration data 430 for the volume 875 may require a storage capacity and a rate of throughput to access client data 130 stored therein that are both substantially that are between the storage capacities and rates of throughput, respectively, of the volumes 873 and 877. With such specifications, the volume 875 may be intended to serve as storage for email data, file transfer data, etc. associated with the operation of a server in support communications between individuals. In such an example, storage devices based on different storage technologies, such as hard disk drives and solid state disk drives, may be selected for each of the aggregates 872, 874 and 876. Alternatively or additionally, storage devices employing different interfaces and/or incorporating throughput-enhancing features to differing degrees (e.g., on-drive caches, etc.) may be selected for each of these aggregates.

Figure 11A:
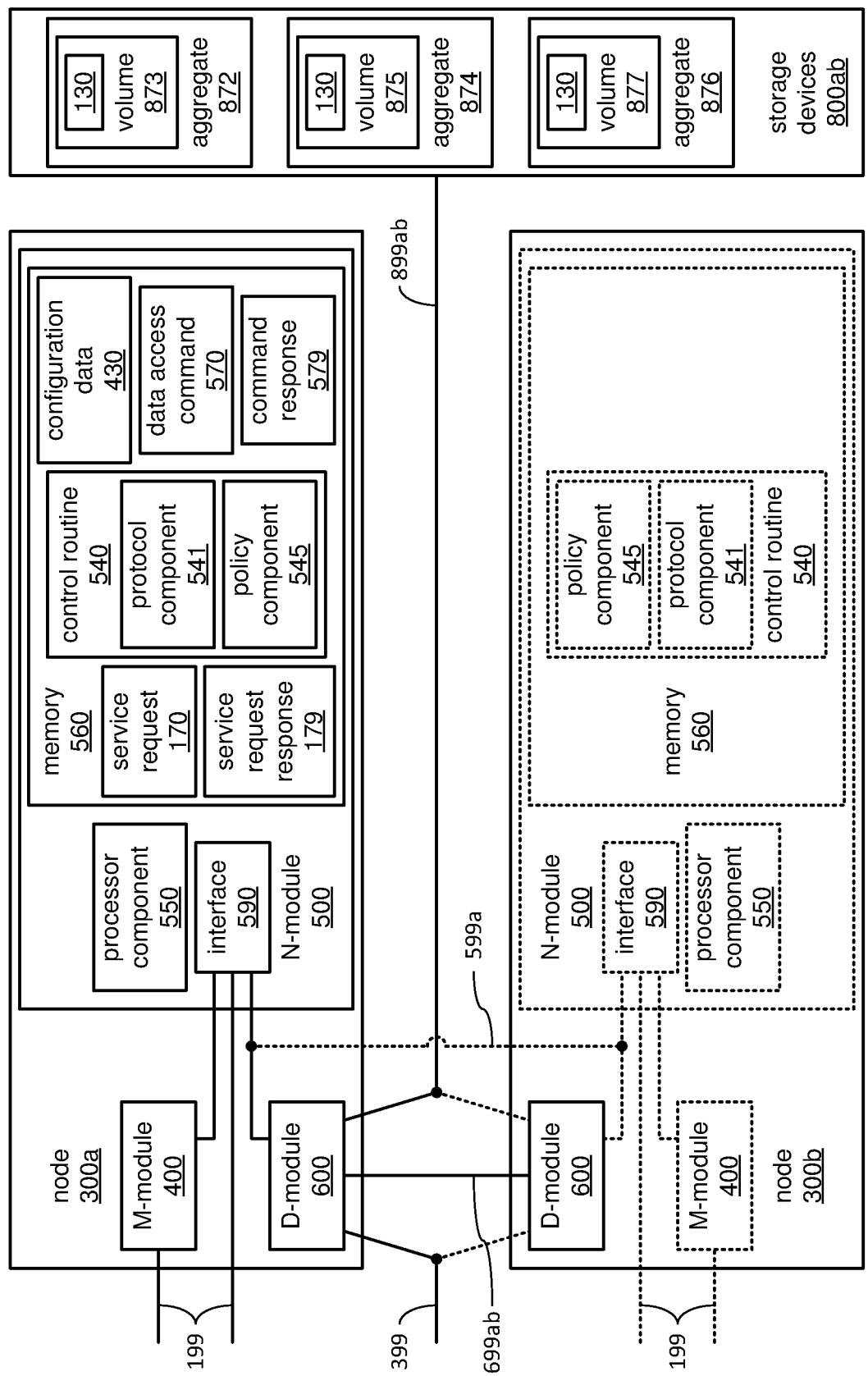
FIGS. 11A, 11B and 11C, together, illustrate an example embodiment of effecting a QoS policy for accessing client data.
Figure 11B:
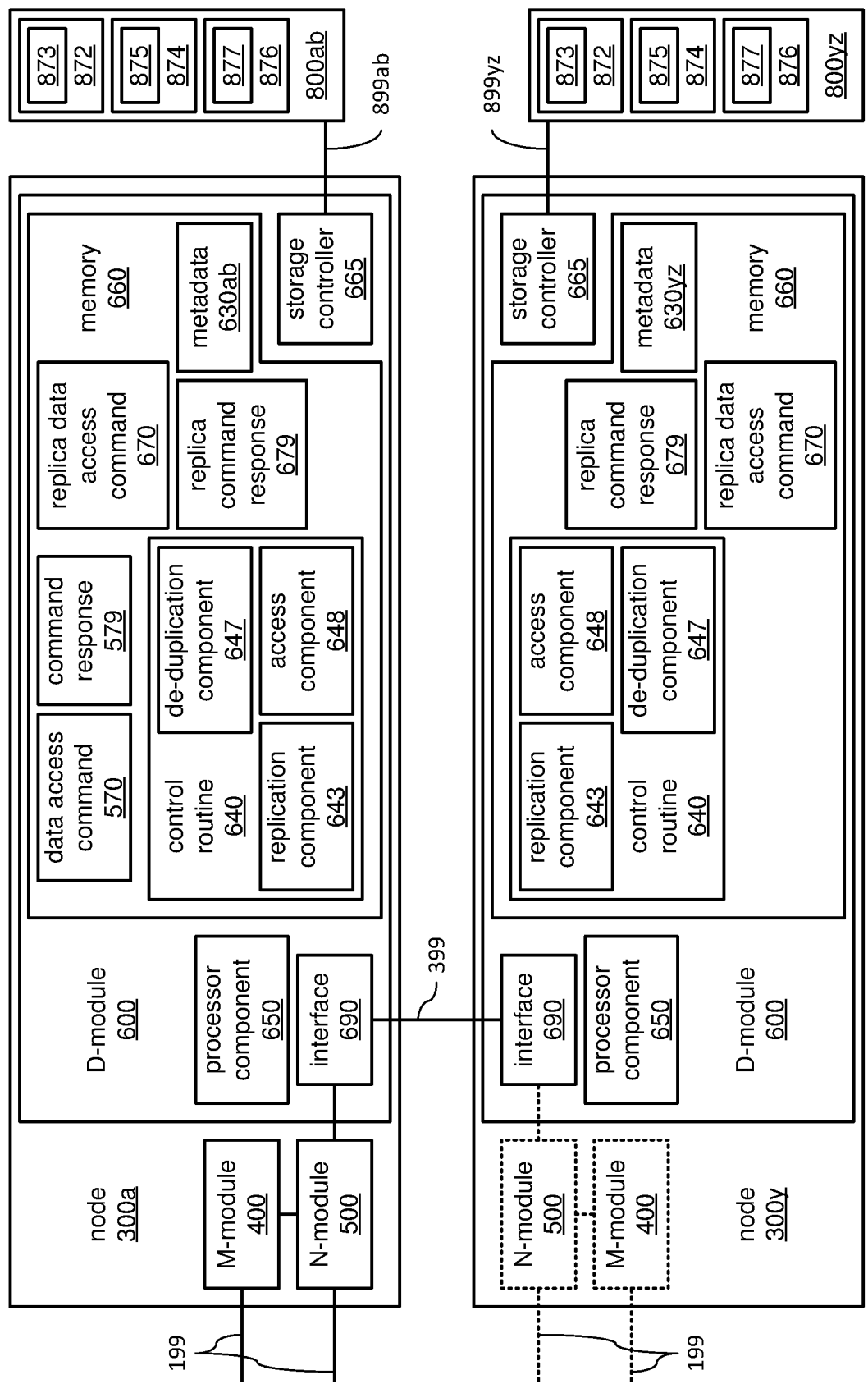
Figure 11C:
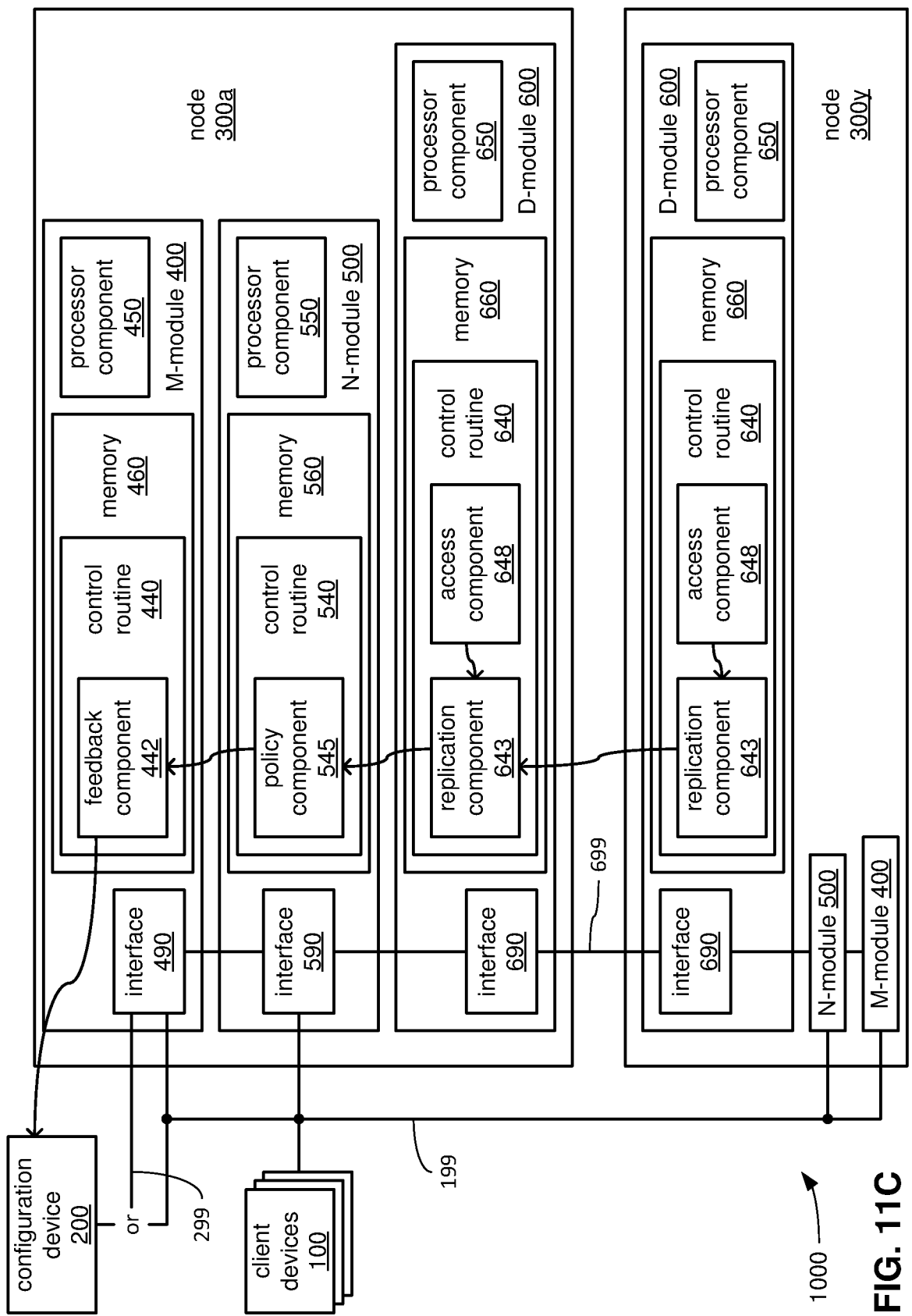

FIGS. 11A, 11B and 11C, together, illustrate an example embodiment of the nodes 300a and/or 300y of the storage cluster system 1000 effecting a QoS policy in greater detail. More specifically, FIG. 11A depicts components of Network modules 500 of the nodes 300a-b in greater detail, along with aspects of controlling the rate of throughput for accesses made from the client device(s) 100 to client data 130 stored within each of the volumes 873, 875 and 877 through the node 300a. FIG. 11B depicts components of Disk modules 600 of the nodes 300a and 300y in greater detail, along with aspects of performing data access commands 570 and replica data access command 670, including the use of deduplication. More specifically, FIG. 11C depicts components of Management modules 400 of the nodes 300a and 300y in greater detail, along with aspects of receiving and relaying feedback concerning rates of throughput and/or amounts of data stored during operation of at least the nodes 300a and 300y. As depicted, the node 300a may be active within the HA group 1600ab to communicate with the client devices 100 and/or the configuration device 200 via the client interconnect 199, as well as with node 300y, which may be active within the HA group 1600yz to communicate with the node 300a via the inter-cluster interconnect 399. The nodes 300b and 300z may be inactive as each awaits an indication of a need to take over for the nodes 300a or 300y, respectively.

Turning to FIG. 11A, as depicted, the control routine 540 within the Network module 500 of at least the node 300a may incorporate a protocol component 541 and a policy component 545. As depicted, the control routine 540 of the Network module 500 of the node 300b may also incorporate the protocol component 541 and the policy component 545, and though not specifically shown, the Network modules 500 of the nodes 300y-z may also each incorporate a control routine 540 that incorporates the protocol component 541 and the policy component 545. As previously discussed, as a result of the node 300a being active to engage in communications with one or more of the client devices 100, the processor component 550 of the Network module 500 of the node 300a may be active to execute the control routine 540 (as indicated with the Network module 500 of the node 300a being drawn with solid lines). In executing the control routine 540, the processor component 550 of the Network module 500 of at least the node 300a may execute the protocol component 541 and the policy component 545 of the control routine 540. However, as a result of the node 300b being inactive, the processor component 550 may not be active to execute the control routine 540 within the Network module of the node 300b (as indicated with the Network module 500 of the node 300b being drawn with dotted lines). However, if the node 300b takes over for the node 300a, then the control routine 540 within the node 300b may begin to be executed, while the control routine 540 within the node 300a may cease to be executed.

Within the Network module 500 of at least the node 300a, the protocol component 541 may be executable by the processor component 550 to convert protocols between the client interconnect 199 and the intra-cluster interconnect 599a. As has been discussed, various storage service requests 170 that may be received from one or more of the client devices 100 via the client interconnect 199 may include requests to store client data 130 and/or to retrieve client data 130. As also previously discussed, the protocols employed in communications with the client devices 100 may include file-based access protocols, including and not limited to, Common Internet File System (CIFS) protocol or Network File System (NFS) protocol, over TCP/IP. Alternatively or additionally, the protocols employed in communications with the client devices 100 may include block-based access protocols, including and not limited to, Small Computer Systems Interface (SCSI) protocol encapsulated over TCP (iSCSI) and/or SCSI encapsulated over Fibre Channel (FCP). Again, the use of one or more of these protocols may reflect the use of a client/server model for the handling of client data 130 between the client devices 100 and the nodes 300a-b and/or 300y-z.

More specifically, the protocol component 541 may translate storage service requests 170 received from the client devices 100 via the client interconnect 199 into data access commands 570 to provide the requested storage services, before operating the interface 590 to relay those data access commands 570 to a Disk module 600 via the interconnect 599a. The protocol component 541 may also convert command responses 579 received from a Disk module 600 into an appropriate protocol for responding to a request for storage services, before operating the interface 590 to relay those storage services request responses 179 to one or more of the client devices 100 via the client interconnect 199. The protocol component 541 may further convert the protocols employed in conveying pieces of the client data 130 as the protocol component 541 relays the pieces of the client data 130 between the client interconnect 199 and the intra-cluster interconnect 599a.

Within the Network module 500 of at least the node 300a, the policy component 545 may be executable by the processor component 550 to control the rates of throughput for accesses made to client data 130 stored within each of the volumes 873, 875 and 877 in accordance with the maximum rates of throughput specified in the configuration data 430 for each of these volumes. Stated differently, the policy component 545 may subject the storage service requests 170 received from the client device(s) 100 to a QoS policy that may include one or more maximum rates of throughput specified in the configuration data 430 for accesses made to the client data 130 stored within each of the volumes 873, 875 and 877. In so doing, at times when the rate of throughput required to satisfy received storage service requests 170 directed to one of these volumes would exceed a maximum rate of throughput specified in the configuration data 430 for that volume if performed without delay, the policy component 545 may cooperate with the translation component 541 to delay translation, and/or may act to delay performance of those storage service requests 170 by transmitting service request response(s) 179 to the client device(s) 100 that include an indication that performance of at least a subset of those storage service requests 170 will be delayed. In effecting such delays, the policy component 545 may maintain the order in which the storage service requests 170 were received, and may do so by buffering the storage service requests 170 within the memory 560 with a first-in-first-out (FIFO) ordering.

In some embodiments, the maximum rates of throughput for each of the volumes 873, 875 and 877 may be specified in the configuration data 430 with values that indicate constant maximum rates of throughput such that the maximum rates of throughput for each of these volumes are not expected to change during operation of at least the node 300a. Thus, in such embodiments, the policy component 545 may limit the rate of throughput to access each of one or more volumes to the maximum rate of throughput specified in the configuration data 430 for each of those volumes regardless of the amount of client data 130 stored within each of those volumes.

Figure 12A:
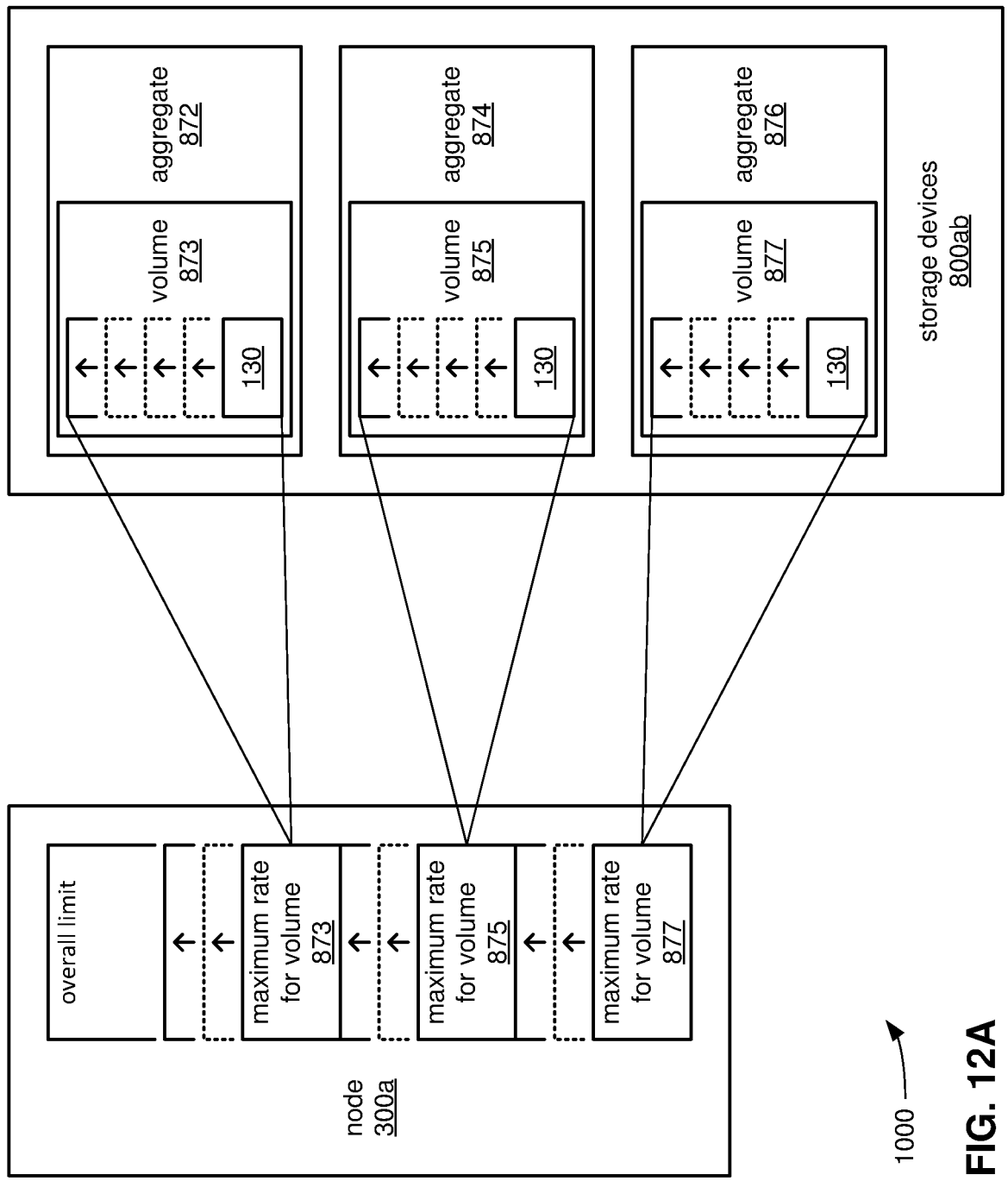
FIG. 12A illustrates an example of interaction between storage space and rate of throughput for three volumes.

However, in other embodiments, the maximum rates of throughput for each of the volumes 873, 875 and 877 may be specified as a ratio between a rate of throughput and an amount of client data 130 stored within each of these volumes. As a result and as depicted in FIG. 12A, the maximum rate of throughput for each of these volumes may depend on the amount of client data 130 stored within each of these volumes such that the maximum rate of throughput for each of these volumes may increase or decrease as the amount of client data 130 stored within each of these volumes increases or decreases. More precisely, the policy component 545 may recurringly recalculate the maximum rate of throughput for accesses made to client data 130 stored within one of the volumes 873, 875 or 877 using the amount of client data 130 stored within that volume in a manner akin to a multiplier to increase or decrease the maximum rate of throughput for that volume in a manner proportionate to an increase or decrease, respectively, in the amount of client data 130 stored within that volume. To enable such recurring performances of such a calculation for each of these volumes, the Network module 500 may recurringly receive indications from the Disk module 600 of the amounts of client data 130 stored within each of these volumes.

Returning to FIG. 11A, in embodiments in which the configuration data 430 specifies maximum rate(s) of throughput in a manner that is related to amount(s) of the client data 130 stored (e.g., specifying a ratio therebetween), the configuration data 430 may do so using any of a variety of units of measure. By way of example, the maximum rate of throughput for accesses to client data 130 stored within a particular volume may be specified as a ratio expressed as input/output operations per second per terabyte (IOPS/TB). In such an example, each input/output operation (IOP) in such a measure may be a storage service request 170 received from a client device 100 or may be a data access command 570 derived from a storage service request 170. As has been discussed, a single storage service request 170 may translate into more than one data access command 570 such that there may not be a one-to-one correspondence therebetween and different values may need to be used where an IOP refers to a storage service request 170 versus where an IOP refers to a data access command 570.

Turning to FIG. 11B, as depicted, the control routine 640 within the Disk module 600 of at least the node 300a may incorporate a replication component 643, a deduplication component 647 and the access component 648. As depicted, the control routine 640 of the Disk module 600 of the node 300y may also incorporate the same components 643, 647 and 648, and though not specifically shown, the Disk modules 600 of the nodes 300b and 300z may also each incorporate a control routine 640 that incorporates these same components. As previously discussed, as a result of the node 300a being active to engage in communications with one or more of the client devices 100 and to perform data access commands, the node 300y being active to perform replicas of those data access commands at least partially in parallel, and the nodes 300b and 300z not being active to either engage in such communications or to perform data access commands, the processor components 650 of the Disk modules 600 of the nodes 300a and 300y may be active to execute portions of the control routine 640 that differ from those that may be executed by the processor components 650 of the Disk modules 600 of the nodes 300b and 300z. More specifically, the processor components 650 within the nodes 300b and 300z may be limited to executing portions of the control routine 640 associated with monitoring the status of and preparing to take over for the nodes 300a and 300y, respectively.

Within the Disk module 600 of the node 300a, the replication component 643 may be executable by the processor component 650 to control the performance of and to replicate the data access commands 570 received from a Network module 500, and to transmit the resulting replica data access commands 670 to the Disk module 600 of the node 300y. Within the Disk module 600 of the node 300y, the replication component 643 may be executable by the processor component 650 to receive and control performance of the replica data access commands 670 to cause such performance to occur at least partly in parallel with the performance of the data access commands 570. More specifically, the replication component 643 of the Disk module 600 of the node 300*a* replicates data access commands 570 received from the Network module 500 of the node 300*a* and transmits the resulting replica data access commands 670 to the Disk module 600 of the node 300*y* via the inter-cluster interconnect 399, while also relaying the data access commands 570 to the access component 648 within the Disk module 600 of the node 300*a* to be performed. In contrast, the replication component 643 of the Disk module 600 of the node 300*y* does not perform replication, and instead, relays the replica data access commands 670 received from the Disk module 600 of the node 300*a* to the access component 648 within the Disk module 600 of the node 300*y* to be performed at least partly in parallel with the performance of the data access commands 570 by the access component 648 within the node 300*a*. Thus, the replication components 643 of the Disk modules 600 of the nodes 300*a* and 300*y* cooperate via the inter-cluster interconnect 399 to exchange the replica data access commands 670 and to coordinate the at least partially parallel performance of data access commands 570 and the replica data access commands 670 therebetween.

Within the Disk modules 600 of the active nodes 300*a* and 300*y*, the access component 648 may operate the storage controller 665 to perform various data access operations on client data 130 stored within the sets of storage devices 800*ab* and 800*yz*, respectively. The replica data access commands 670 instruct the access component 648 within the node 300*y* to perform substantially the same operations as the access component 648 within the node 300*a* is instructed to perform by the data access commands 570 from which the replica data access commands 670 are generated. As a result, the access components 648 within the nodes 300*a* and 300*y* are caused to perform the same data storage, modification and retrieval operations such that the state of the client data 130 as stored within the set of storage devices 800*yz* is caused to mirror the state of the client data 130 as stored within the set of storage devices 800*ab*. In this way, redundancy between the two sets of storage devices 800*ab* and 800*yz* is maintained such that access to the client data 130 may continue to be provided through the use of either of these sets of storage devices in the event of a failure involving the other.

In performing such operations, at least the access component 648 of the Disk module 600 within the node 300*a* may monitor the amount of client data 130 stored within the set of storage devices 800*ab*. The access component 648 within the node 300*a* may recurringly provide an indication of the amount of client data 130 so stored to the Network module 500 of the node 300*a* to enable that amount to become an input to a recurring calculation of the maximum rate of throughput for accessing that client data 130. Thus, and referring again to the example three volumes 873, 875 and 877 of FIG. 12A, the access component 648 within the node 300*a* may monitor the amount of client data 130 stored within each of those three volumes and may recurringly provide indications of those amounts to the Network module 500 of the node 300*a* to enable the recurring performance of calculations of the maximum rates of throughput for each of those volumes.

Returning to FIG. 11B, in some embodiments, the access component 648 of the Disk module 600 within the node 300*y* may similarly monitor one or more amounts of client data 130 stored within the set of storage devices 800*yz*. The access component 648 within the node 300*y* may recurringly provide indication(s) of the amount(s) of client data 130 so stored to the replication component 643 of the Disk module 600 of the node 300*y* to relay to the replication component 643 of the Disk module 600 of the node 300*a*. Further, within the Disk module 600 of the node 300*a*, the access component 648 may provide its indication(s) of amount(s) of client data 130 stored within the set of storage devices 800*ab* to the Network module 500 of the node 300*a* through the replication component 643 such that the replication component 643 within the node 300*a* receives indications of amounts of client data 130 stored within both of the sets of storage devices 800*ab* and 800*yz*. In such embodiments, the replication component 643 within the node 300*a* may recurringly compare such indications of amounts associated with the set of storage devices 800*ab* to such indications of amounts associated with the set of storage devices 800*yz* as a check for an error condition in which the state of the client data 130 as stored within a volume of one of these sets of storage devices has ceased to mirror its counterpart volume within the other of these sets of storage devices.

As recognizable to those skilled in the art, a situation may arise in which the amount of client data 130 that is attempted to be stored within a volume (e.g., one of the volumes 873, 875 or 877) may exceed the amount of maximum storage capacity specified in the configuration data 430 for that volume. In some embodiments, the access component 648 within the node 300*a* may monitor the data access commands 570 received from the Network module 500 for a situation in which performing the next data access command 570 would result in an attempt to store more client data 130 within a volume than the storage capacity indicated in the configuration data 430 for that volume will allow. In support of such monitoring, the access component 648 may retrieve indications of the maximum storage capacity specified of each volume from metadata generated at least partially from the configuration data 430 (e.g., the metadata 630*ab* within the node 300*a* and/or its counterpart metadata 630*yz* within the node 300*y*). In some embodiments, the access component 648 may respond to such a situation in which a specified storage capacity would be exceeded by signaling the replication component 643 of the node 300*a* with an error indication that the replication component 643 would relay to the Network module 500 of the node 300*a* in a command response 579 to be translated by the Network module 500 into a service request response 179 by which the error indication would then be provided to a client device 100.

However, in other embodiments, the configuration data 430 may also specify an amount of extra storage space to be maintained within an aggregate to enable at least temporary expansion of a volume defined within that aggregate to accommodate a situation in which an amount of client data 130 is stored within that volume that exceeds the storage capacity specified for that volume. The access component 648 within each of the nodes 300*a* and 300*y* may retrieve an indication of this amount of extra storage space from metadata (e.g., the metadata 630*ab* within the node 300*a* and/or its counterpart metadata 630*yz* within the node 300*y*). Thus, in such other embodiments, the access component 648 within the node 300*a* may proceed with performing a data access command 570 that results in the storage of an amount of client data 130 that exceeds the specified storage capacity of a volume by at least temporarily expanding that volume into the specified amount of extra storage space. Further, instead of generating an indication of an error, the indications of quantity of client data 130 stored within that volume that are recurringly provided by the access component 648 may be relied upon to convey the fact of the storage capacity specified for that volume having been exceeded to the Network module 500. However, the access component 648 may still generate an indication of error if the specified amount of extra storage space would be exceeded by the performance of a data access command 570 and/or a replica data access command 670.

Figure 12B:
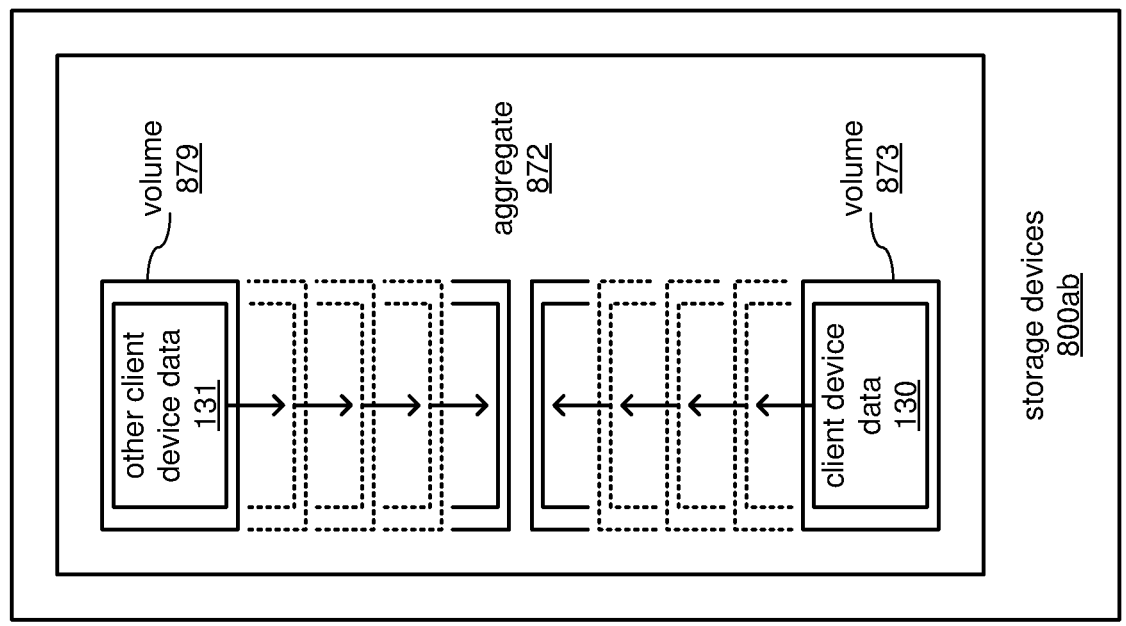
FIG. 12B illustrates an example of interaction between two volumes.

It should be noted that despite the depiction and discussion of examples of multiple aggregates that each contain a single volume, embodiments are possible in which one or more of multiple aggregates making up a set of storage devices (e.g., the multiple aggregates 872, 874 and 876 making up the set of storage devices 800ab and/or 800yz) may contain multiple volumes. As has been discussed, where multiple volumes are defined within a single aggregate, one or more may contain portions of related data (e.g., portions of the client data 130 within each) or portions of entirely unrelated data, such as the example of multiple volumes 873 and 879 depicted in FIG. 12B as defined within the aggregate 872 to store client data 130 and other client data 131, respectively. Also, one or more of such multiple volumes may contain a copy of metadata (e.g., the metadata 630ab or 630yz), as previously discussed. Further, the access component 648 of either of the nodes 300a or 300y may monitor the amount of data stored in each of such volumes, whether they are defined within the same aggregate and/or within different aggregates, and may provide indications of the amounts of data stored within each of those volumes to a Network module 500.

Again, a situation may arise in which one of the amount of data stored within one of the multiple volumes within an aggregate may exceed the maximum storage capacity specified for that volume within the configuration data 430. In some embodiments, the configuration data 430 (and accordingly, metadata such as the metadata 630ab and/or 630yz) may specify a priority order in which each of multiple volumes is to be allowed to make use of a specified amount of extra storage space. Thus, where the amount of client data 130 and/or of the other client data 131 have exceeded the maximum specified amount of storage space for each of the volumes 873 and 879, respectively, the specified priority order may result in the extra storage space being allocated to one or the other as per the priority order in instances where there isn't enough extra storage space to accommodate both.

Returning to FIG. 11B, within the Disk module 600 of the active nodes 300a and 300y, the deduplication component 647 may be executable by the processor component 650 to employ any of a variety of techniques of deduplication for identifying instances of there being multiple identical blocks of data within the client data 130, and making use of those instances to reduce the amount of storage space within the sets of storage devices 800ab and/or 800yz taken up by the client data 130 within one or more volumes. As recognizable to those skilled in the art, it is not uncommon for multiple versions of the same text, images, spreadsheets or other pieces of data to be stored in which at least some of those multiple versions differ from each other to a relatively small degree. Thus, there may be large portions of at least some of those multiple versions that may be identical such that a considerable amount of storage space within a volume may be conserved by storing only one copy of each of such portions. As a result, an amount of client data 130 that is larger than the storage capacity of a volume may be stored within that volume.

Figure 12C:
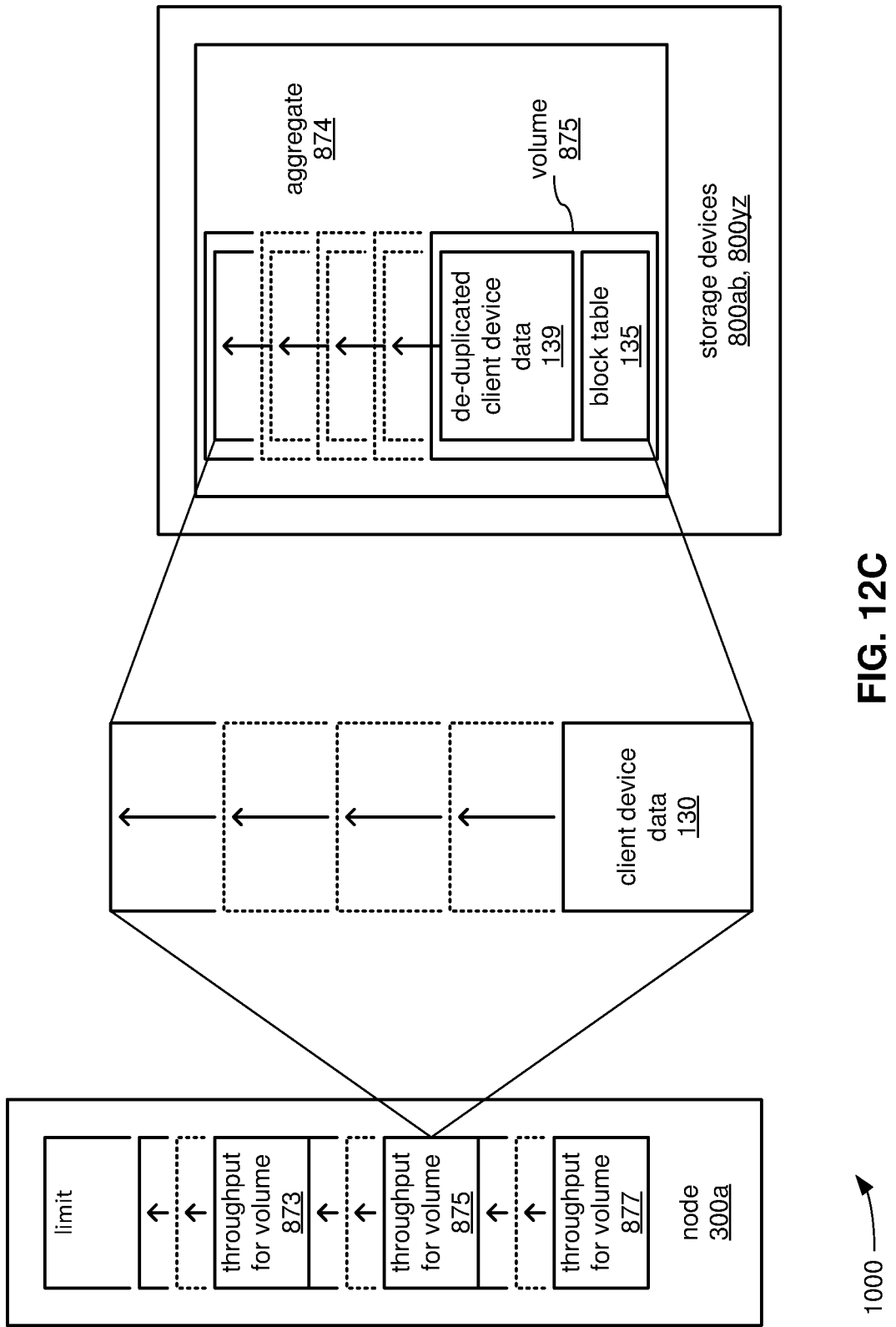
FIG. 12C illustrates an example of interaction between deduplication and rate of throughput.

As depicted in the example of FIG. 12C, the deduplication component 647 may analyze the client data 130 as blocks of it are stored within the depicted example volume 875 to identify identical blocks, and may then store only one copy of each of such blocks in the volume 875 as part of a de-duplicated client data 139. Such deduplication may be performed at least partially in parallel between the nodes 300a and 300y by the deduplication components 647 within both nodes along with the at least partially parallel performances of data access commands 570 and replica data access commands 670. With such deduplication performed within both of the nodes 300a and 300y, more client data 130 is able to be stored within the volume 875 defined within the aggregate 874 within each of the sets of storage devices 800ab and 800yz. In support of such deduplication, the deduplication component 647 within each of the nodes 300a and 300y may cooperate with the access component 648 within each of these nodes to also store within the volume 875 in each of the sets of storage devices 800ab and 800yz a block table 135 made up of indications of what blocks of the client data 130 were identified as being identical. As recognizable to those skilled in the art, the block table 135 may provide an indication of where a single copy corresponding to multiple identical blocks is stored within the volume 875 within each of the sets of storage devices 800ab and 800yz. This may be done to enable retrieval of one the multiple identical blocks whenever the one of the multiple identical blocks is requested to be retrieved from the volume 875.

As previously discussed, the access component 648 within each of the nodes 300a and 300y may recurringly provide indications to the Network module 500 of the node 300a (directly or through one or both of the replication components 643 of the nodes 300a and 300y) of amounts of client data 130 stored within one or more volumes within one or both of the sets of storage devices 800ab and 800yz, including the volume 875 depicted in FIG. 12C for which deduplication is performed. In some embodiments, such an indication provided by the access component 648 within one or both of the nodes 300a and 300y for the volume 875 where deduplication is performed may be an indication of the amount of de-duplicated client data 139 that is so stored. However, in other embodiments, such an indication may be an indication of the amount of client data 130 that is stored, even though that amount may become larger than the storage capacity specified in the configuration data for the volume 875 (as well as being larger than the actual storage capacity of the volume 875).

As previously discussed, the basing of the maximum rate of throughput at which client data 130 may be accessed within a volume on the amount of client data 130 stored within that volume may be deemed desirable based on an assumption that a greater quantity of stored data is more likely to be accessed more frequently such that a greater rate of throughput for accessing that data should be allocated. Thus, where the amount of client data 130 that is stored within a volume exceeds the amount of storage space specified for that volume (either due to deduplication or temporarily expanding that volume) or the actual amount of storage space within that volume (due to deduplication), it may still be deemed desirable to specify the amount of client data 130 that is stored within that volume regardless of how much client data 130 that volume would be limited to storing without the use of such expansion or deduplication.

However, the fact of being able to store an increased amount of client data 130 within a volume and providing indications to the Network module 500 of that increased amount of client data 130 as having been so stored may have the unintended consequence of significantly increasing the maximum rate of throughput for that volume that is derived based on that indication of that increased amount. Such an increased maximum rate of throughput may not be supportable by one or more of the nodes 300a-b and/or 300y-z, and/or by one or both of the sets of storage devices 800ab and/or 800yz. To address this, again, the configuration data 430 may specify aspects of an approach to handling instances in which a recurringly calculated maximum rate of throughput for a volume becomes too high. Again, the configuration data 430 may simply specify an upper limit for the maximum rate of throughput for one or more volumes, or for all of the volumes (e.g., an overall maximum rate of throughput), that cannot be exceeded regardless of what value for the maximum rate of throughput is derived through such recurring calculations. Alternatively, the configuration data 430 may specify an order of priority of which one(s) of the volumes are to be the first one(s) to have their maximum rate of throughput reduced and/or to what degree(s) in response to the sum of all of the maximum rates of throughput for multiple volumes exceeding the overall maximum rate of throughput that can be supported.

Turning to FIG. 11C, as depicted, the control routine 440 within the Management module 400 of each of the nodes 300a and 300y may incorporate a feedback component 442. Also, and though not specifically shown, the Management modules 400 of the nodes 300b and 300z may also each incorporate a control routine 440 that incorporates the feedback component 442. Again, as a result of each of the node 300a being active to engage in communications with one or more of the client devices 100 and/or the configuration device 200, but not the node 300y, the processor component 450 of the Management module 400 of the node 300a may be active to execute at least a portion of the control routine 440. In so executing the control routine 440, the processor component 450 of the Management module 400 of at least the node 300a may execute the feedback component 442 of the control routine 440.

Within the Management module 400 of at least the node 300a, the feedback component 442 may be executable by the processor component 450 to accept indications from one or more components of the nodes 300a and/or 300y of various events having occurred during the operation of the storage cluster system 1000 using the specifications of various aspects of such operation that were originally provided in the configuration data 430. Such indications may be of instances in which a storage capacity of a volume required expansion, a highest amount of client data 130 able to be stored within a volume where deduplication was applied, an instance in which priority had to be given to expanding one volume over another, an instance in which the sum of the maximum rates of throughput derived by recurring calculations exceeded the overall maximum rate of throughput that was able to be supported by one or more nodes, etc. More generally, the feedback component 442 may accept indications of a storage capacity or a maximum rate of throughput specified for a volume in the configuration data 430 was exceeded or otherwise proved insufficient during operation of the storage cluster system 1000.

As has been described, such indications may be exchanged and/or collected among various components of the nodes of the storage cluster system 1000. Specifically, the feedback component 442 of the Management module 400 of the node 300a may receive such indications from the policy component 545 of the Network module 500 of the node 300a, which may in turn receive at least some of such indications from the replication component 643 of the Disk module 600 of the node 300a. As has been discussed, the replication component 643 of the Disk module 600 of the node 300a may receive indications associated at least with the sets of storage devices 800ab and/or 800yz direct from the access component 648 within the node 300a and indirectly from the access component 648 within the node 300y via the replication component 643 of the node 300y.

Figure 13A:
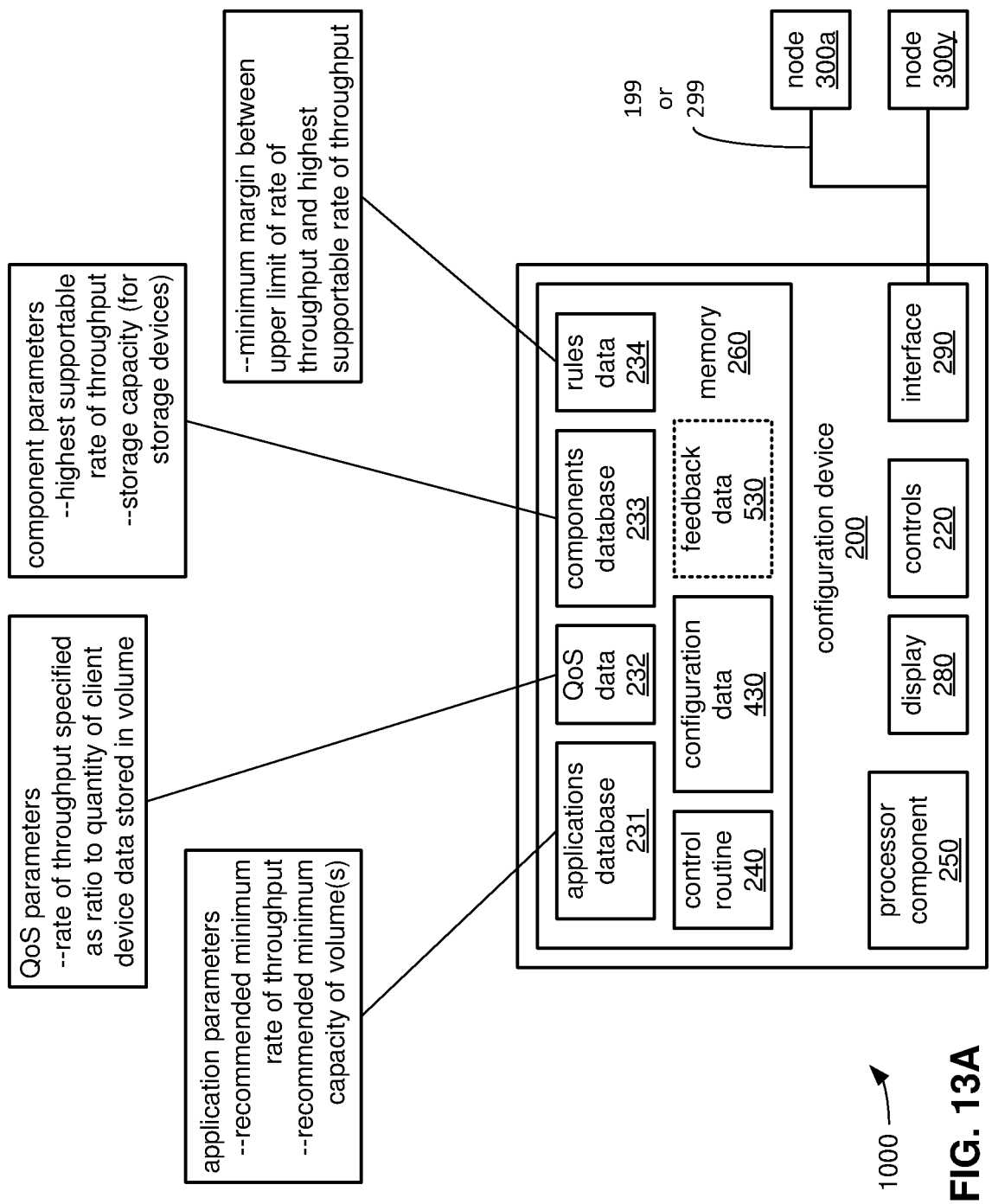
FIGS. 13A and 13B, together, illustrate an example embodiment of a configuration device.
Figure 13B:
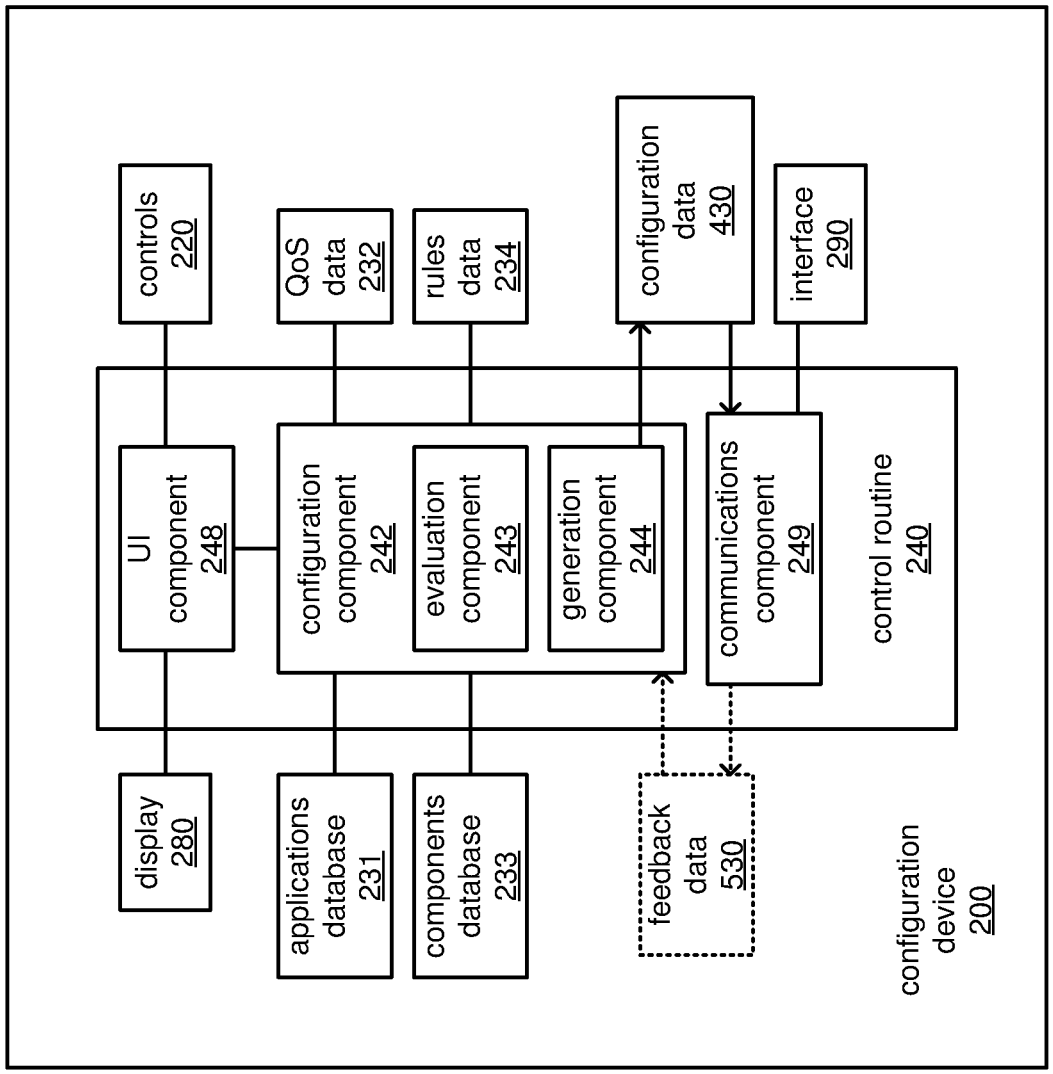

FIGS. 13A and 13B, together, illustrate an example embodiment of the configuration device 200 in greater detail. More specifically, FIG. 13A depicts components of the configuration device 200 in greater detail, along with aspects of data employed in deriving the configuration data 430. FIG. 13B depicts components of the configuration device in greater detail, along with aspects of employing those components in generating the configuration data 430.

Turning to FIG. 13A, in various embodiments, the configuration device 200 incorporates one or more of a processor component 250, a memory 260, controls 220, a display 280 and an interface 290 to couple the configuration device 200 to one or more active nodes of the storage cluster system 1000 (e.g., one or both of the depicted nodes 300a and 300y) via the client interconnect 199 and/or the configuration interconnect 299. The memory 260 may store an applications database 231, QoS data 232, a components database 233, rules data 234 and a control routine 240.

As depicted, the applications database 231 may include indications of various parameters of one or more computer-based applications that may be supported with the storage of client data 130 by the storage cluster system 1000. Such applications may include, and are not limited to, databases, data archival, caching of data employed in data analytics, streaming of audio/visual data, email and attachment storage, etc. For each application, the applications database 231 may include an indication of a recommended minimum rate of throughput and/or a recommended minimum data storage capacity for each of one or more volume(s) that may be needed to support performance of that application. Such minimum amounts may be derived by testing and observation of data flows and/or data storage associated with each application under various chosen circumstances.

As depicted, the QoS data 232 may include indications of various parameters of one or more levels of QoS that may be defined to satisfy a set of storage requirements typically associated with one or more applications. Indeed, in some embodiments, the applications database may include an indication of a recommended QoS for each application in addition to or in lieu of specifying recommended minimum rates of throughput and/or recommended minimum per volume storage capacities. For each level of QoS, QoS data 232 may include an indication of a maximum rate of throughput to be supported for accessing and/or performing other operations associated with a volume. As has been discussed, the maximum rate of throughput for a volume (e.g., one of the volumes 873, 875 and 877) may be specified may be specified as a ratio between a rate of throughput and an amount of client data 130 stored within that volume such that the maximum rate of throughput for that volume depends on the amount of client data 130 stored within that volume. More specifically, the maximum rate of throughput for that volume may increase or decrease as the amount of client data 130 stored within that volume increases or decreases. More precisely, the amount of client data 130 stored within that volume may be used in a manner akin to a multiplier to increase or decrease the maximum rate of throughput for that volume in a manner proportionate to an increase or decrease, respectively, in the amount of client data 130 stored within that volume.

Again, in embodiments in which a maximum rate of throughput for a volume is specified in a manner that is related to the amount of the client data 130 stored therein, any of a variety of units of measure may be used. Again by way of example, the maximum rate of throughput for accesses to client data 130 stored within a particular volume may be specified as a ratio expressed as input/output operations per second per terabyte (IOPS/TB). In such an example, each input/output operation (IOP) in such a measure may be a storage service request 170 received from a client device 100 or may be a data access command 570 derived from a storage service request 170. Again, a single storage service request 170 may translate into more than one data access command 570 such that there may not be a one-to-one correspondence therebetween and different values may need to be used where an IOP refers to a storage service request 170 versus where an IOP refers to a data access command 570.

As depicted, the components database 233 may include indications of various parameters of one or more components that may be selected to assemble one or more nodes of the storage cluster system 1000. Such components may include one or more storage device controllers that serve as and/or implement one or more of the Management module 400, the Network module 500 and the Disk module 600. Such components may also include one or more storage devices to be used individually and/or in sets to store one or more volumes and/or aggregates of client data 130, including and not limited to, ferromagnetic disk drives (e.g., so-called "hard" disc drives), solid state drives, etc. For each component, the components database 233 may include an indication of a highest rate of throughput able to be supported by that component. Such highest rates of throughput may be derived by testing and observation of throughput for commands and/or data with each component under various chosen circumstances. Additionally, for storage devices, the components database 233 may include an indication of the storage capacity of that component.

As depicted, the rules data 234 may include indications of various rules employed in evaluating various aspects of and/or setting parameters for selected configurations of the storage cluster system 1000. Such rules may include, and are not limited to, a minimum degree of margin of extra throughput that is to be provided in various components for a configuration of the storage cluster system 1000.

The control routine 240 may incorporate a sequence of instructions operative on the processor component 250 in its role as a main processor component of the configuration device 200 to implement logic to perform various functions. Among those functions may to operate the display 280 and/or the controls 220 to enable an operator of the configuration device 200 to select one or more levels of QoS, specify storage capacity for one or more volumes and/or select one or more components from which to assemble one or more nodes of the cluster storage system 1000 to provide the one or more volumes with the one or more selected levels of QoS.

Turning to FIG. 13B, the control routine 240 may incorporate one or more components, and execution of the control routine 240 by processor component 250 may entail execution of one or more those components. More specifically, as depicted, the control routine 240 may incorporate one or more of configuration component 242, a user interface (UI) component 248 and a communications component 249. In turn, the configuration component 242 may incorporate one or both of an evaluation component 243 and a generation component 244.

The configuration component 442 and the UI component 248 may be executable by the processor component 250 to present assortments of applications, levels of QoS and/or components on a display, such as the display 280 of the configuration device 200. Such a presentation may be made to enable the generation of the parameters for the configuration data 430 through selecting one or more applications to be supported by a configuration of the storage cluster system 1000, one or more levels of QoS to be provided for one or more volumes to be maintained by the storage cluster system 1000 in support of the one or more applications, and/or one or more components from which to assemble at least one of the nodes of the storage cluster system 1000 to provide the one or more volumes.

In some embodiments, such a presentation may include a presented assortment of applications as a first step to determining what level(s) of QoS and/or volume storage capacity or capacities are needed. Thus, an operator may be able to perform much of the work of deriving a configuration of the storage cluster system 1000 by operating the manually-operable controls 220 to indirectly specify one or more levels of QoS and/or one or more volume storage capacities by simply selecting what application(s) are to be supported by the storage cluster system 1000. By way of example, in response to receiving from the UI component 248 an indication of a selection of a particular application, the configuration component 242 may retrieve indications from the applications database of what rate of throughput and/or volume storage capacities are the recommended minimums for supporting that application. The selection component 242 may also retrieve indications from the components database 233 of what components are able to support those minimums, and/or may retrieve from the QoS data 232 indications of what levels of QoS provides a rate of throughput that provides the minimum. The configuration component 242 may then cooperate with the UI component to highlight or otherwise present selections of one or more levels of QoS and/or one or more components as default selections to support the selected application(s).

In response to such a presentation of indications of such default selections, an operator of the configuration device 200 may select one or more different or additional levels of QoS, may select one or more different or additional components, and/or may specify one or more different or additional volume storage capacities in an effort to augment or modify the default selections. Alternatively, it may be that the operator of the configuration device 200 did not begin by selecting one or more applications to be supported, and instead, began by selecting one or more levels of QoS, specifying storage capacities for one or more volumes and/or selecting one or more components without the benefit of indications of default selections associated with one or more applications. In response to receiving from the UI component 248 indications of such selections, the evaluation component 243, with each such selection, may retrieve indications of rates of throughput and/or storage capacities associated with different levels of QoS and/or with different components from the QoS data 232 and/or the components database 233, respectively. The evaluation component 243 may employ such retrieve indications to determine whether the currently selected level of QoS and currently selected storage capacity for each specified volume can be supported by the currently selected components.

Again, as has been discussed, the maximum rates of throughput associated with each level of QoS may be specified as a unit of rate of throughput per unit of client data 130 stored within a volume such that the maximum rate of throughput for that volume may be calculated as that rate of throughput multiplied by the amount of client data 130 stored within that volume at any given time. Thus, to determine whether the currently selected level of QoS and currently selected storage capacity for each specified volume can be supported by the currently selected components, the evaluation component 243 may calculate what maximum rate of throughput may arise for each specified volume in the circumstance in which the entire storage capacity of that volume is filled with client data 130. With that maximum rate of throughput known for that circumstance for each specified volume, the evaluation component 243 may compare those calculated maximum rates of throughput to the highest rates of throughput able to be supported by each of the selected components to determine whether those selected components are able to support those calculated maximum rates.

In performing those comparisons, it should be noted that some of the selected components may be selected to support more than one volume such that the highest rate of throughput able to be supported by such a component may be compared to the sum of all of the calculated maximum rates of throughput that may arise from all of the volumes that are to be supported by that component. Further, in performing those comparisons, the evaluation component 243 may retrieve an indication from the rules data 234 of a rule specifying a degree of margin that must be provided between a calculated maximum rate of throughput for a volume (or a sum of calculated maximum rates of throughput for multiple volumes) and the highest rate of throughput able to be supported by a component.

If the result of those comparisons indications that all of the currently selected components have highest rates of throughput that are high enough to support the calculated maximum rates of throughput that may arise for the volumes associated with each of those components, then the evaluation component may make no change to the presentation provided by the UI component 248 on the display 280. However, if the result of those comparisons reveals that one or more of the currently selected components have highest rates of throughput that are not high enough to support the calculated maximum rates of throughput that may arise for the volumes associated with those one or more components, then the evaluation component 243 may cooperate with the UI component 248 to highlight or otherwise indicate such an inability on the part of the one or more components to support the calculated maximum rates of throughput that may arise as a mechanism to encourage the operator of the configuration device 200 to change the current selection of components.

Upon completion of a selection of levels of QoS, storage capacities for one or more volumes and components from which to assemble one or more of the nodes of the storage cluster system 1000, and upon a determination by the evaluation component 243 that all of the components have highest rates of throughput that are high enough, the generation component 244 may generate the configuration data 430 to be provided to one or more active nodes of the storage cluster system 1000. As has been discussed, the configuration data 430 may include indications of what volumes are to be maintained within one or more sets of storage devices and/or indications of what maximum rate of throughput are to be provided for each of those volumes.

Again, each maximum rate of throughput may be specified for a volume as a rate of throughput tied to the amount of client data 130 stored within that volume. However, the configuration data 430 may also be generated to include an indication of an upper limit for the maximum rate of throughput for each volume. For each volume, that upper limit rate of throughput may be derived from a calculation of the maximum rate of throughput that may arise if the entire storage capacity of that volume was occupied by client data 130. To resolve instances in which the maximum rate of throughput associated with more than one of the volumes exceeds their respective upper limits, the configuration data 430 may also indicate an order of priority among the volumes to indicate which volumes have priority over which others in being granted a maximum rate of throughput that exceeds its associated upper limit. Such an order of priority may also or alternatively be provided to resolve instances in which the amount of client data 130 stored in more than one volume exceeds their specified storage capacities such that a limited amount of extra storage space must be provided for the expansion of one volume over another.

Figure 14:
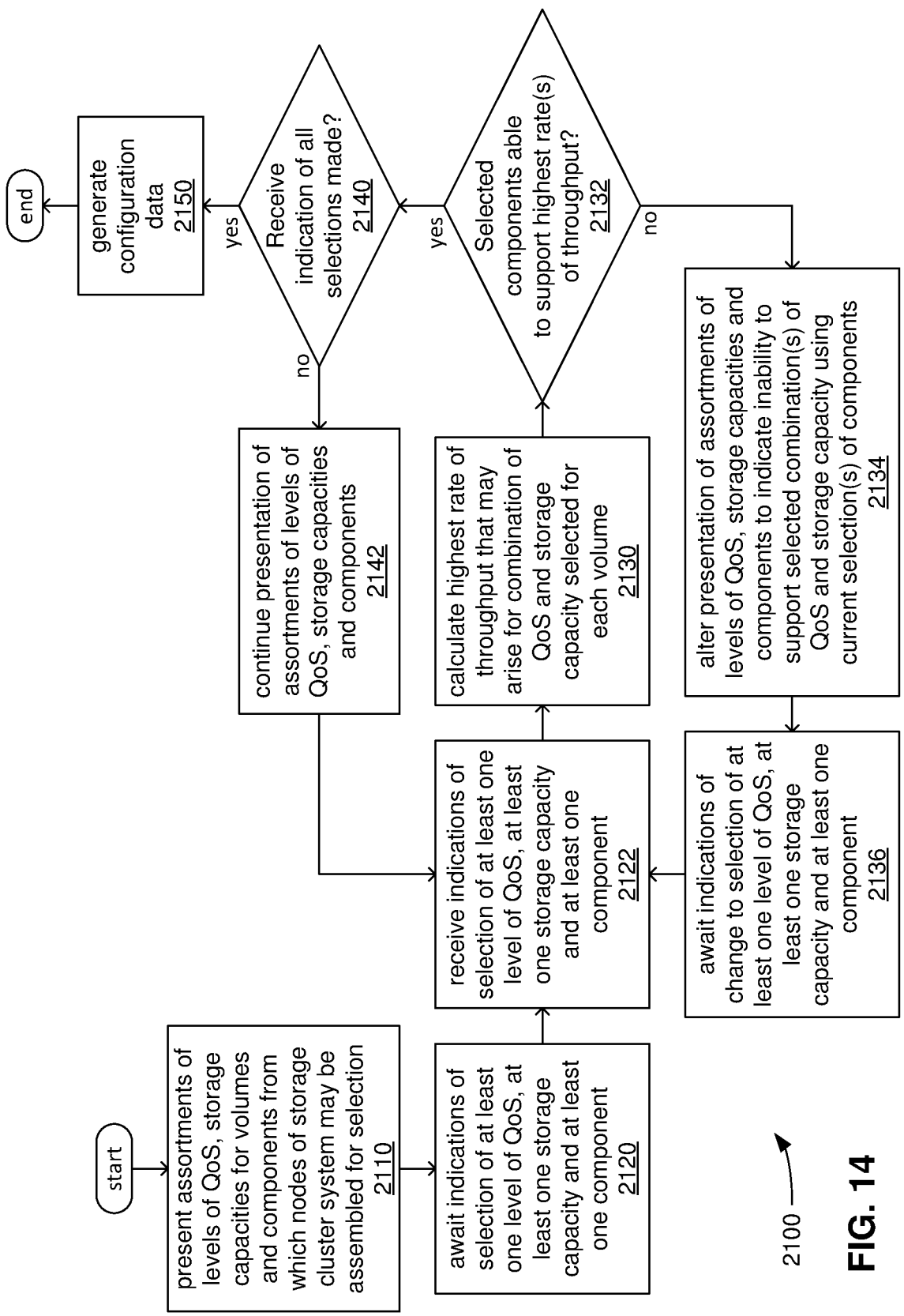
FIG. 14 illustrates a logic flow of generation of configuration data according to an embodiment.

FIG. 14 illustrates one embodiment of a logic flow 2100. The logic flow 2100 may be representative of some or all of the operations executed by one or more embodiments described herein. More specifically, the logic flow 2100 may illustrate operations performed by the processor component 250 in executing at least the control routine 240, and/or performed by other component(s) of the configuration device 200.

At 2110, a processor component of a configuration device (e.g., the processor component 250 of the configuration device 200) may present an assortment of levels of quality of service (QoS) for which nodes of a storage cluster system (e.g., nodes 300a-d and/or 300y-z of the storage cluster system 1000) may be configured on a display (e.g., the display 280) for selection. As has been discussed, the different levels of QoS may be differentiated by different rates of throughput. The processor component may also present an assortment of storage capacities for volumes on the display for selection. The processor component may further present an assortment of components from which each of the nodes may be assembled to provide storage services on the display for selection. As has been discussed, each of such components may be capable of supporting different rates of throughput and/or different storage capacities for storing client data (e.g., the client data 130). As has also been discussed, such a presentation of such assortments may be further accompanied by a presentation of guidance towards one or more combinations of level of QoS and storage capacity as recommended for supporting particular functions such as archival storage, email storage, multimedia streaming storage, caching for data analytics storage, etc.

At 2120, the processor component may await the receipt of indications of the selection of at least one level of QoS, at least one storage capacity for a volume and at least one component to support that volume at that level of QoS. As has been discussed, such indications may be provided to the configuration device by an operator of the configuration device through manually-operable controls (e.g., the controls 220), such as a mouse, touchpad, joystick and/or keyboard. At 2122, the processor component may receive such indications.

At 2130, the processor component may calculate the highest rate of throughput that may arise from each of the one or more volumes for which a level of QoS and a storage capacity has been selected. As has been discussed, the rates of throughput associated with each QoS may be specified as a ratio of rate of throughput and amount of client data stored in a volume such that, for a given volume, the rate of throughput to be provided at selected level of QoS increases as the amount of client data stored within that volume increases. Thus, if a lesser storage capacity is specified for a particular volume, then the highest rate of throughput that may need to be provided for that volume at a selected level of QoS may be less. In contrast, if a greater storage capacity is specified for a particular volume, then the highest rate of throughput that may need to be provided for that volume at that same selected level of QoS may be greater due to the potential for that greater storage capacity to store a greater quantity of client data.

With the highest rate of throughput that may arise for each volume calculated at 2130, a check may be made at 2132 as to whether the selected component(s) are able to support the calculated highest rate(s) of throughput. As has been discussed, this check may entail determining whether each selected component is able to support the sum of all of the highest rate(s) of throughput that may arise for all of the volumes to be supported by that component. As has also been discussed, such a sum for each component may also include a specified amount of extra capacity for rate of throughput.

If, at 2132, one of the selected components is found to not be able to support the sum of all of the highest rates of throughput that may arise for all of the volumes to be supported by that component, then the presentation of assortments of QoS, storage capacities and components may be altered to indicate the inability of one or more of the selected components to support one or more selected combination(s) of QoS and storage capacity selected for one or more volumes at 2134. Then, at 2136, the processor component may await receipt of one or more indications of change(s) to selections of at least one level of QoS, storage capacity and/or component, and the processor component may receive such indication(s) at 2122.

However, if at 2132, all of the selected components are found to be able to support their respective sums of all of the highest rates of throughput that may arise for all of the volumes to be supported by each, then a check may be made at 2140 as to whether an indication has been received of all selections having been made. If, at 2140, such an indication of all selections having been made has been received, then the processor component may generate configuration data to be provided to at least one of the active nodes for which selections have just been made (e.g., the configuration data 430 for one of the nodes 300*a-d* and/or 300*y-z*). As has been discussed, such configuration data may be transmitted by the processor component to the at least one active node, or such configuration data may be conveyed thereto via a physically transportable form of media (e.g., magnetic diskette, optical disc, a so-called thumb drive, etc. However, if at 2140, no such indication of all selections having been made has been received, then the presentation of assortments of levels of QoS, storage capacities and components is continued, and indications of further selections may be received by the processor component at 2122.

Figure 15:
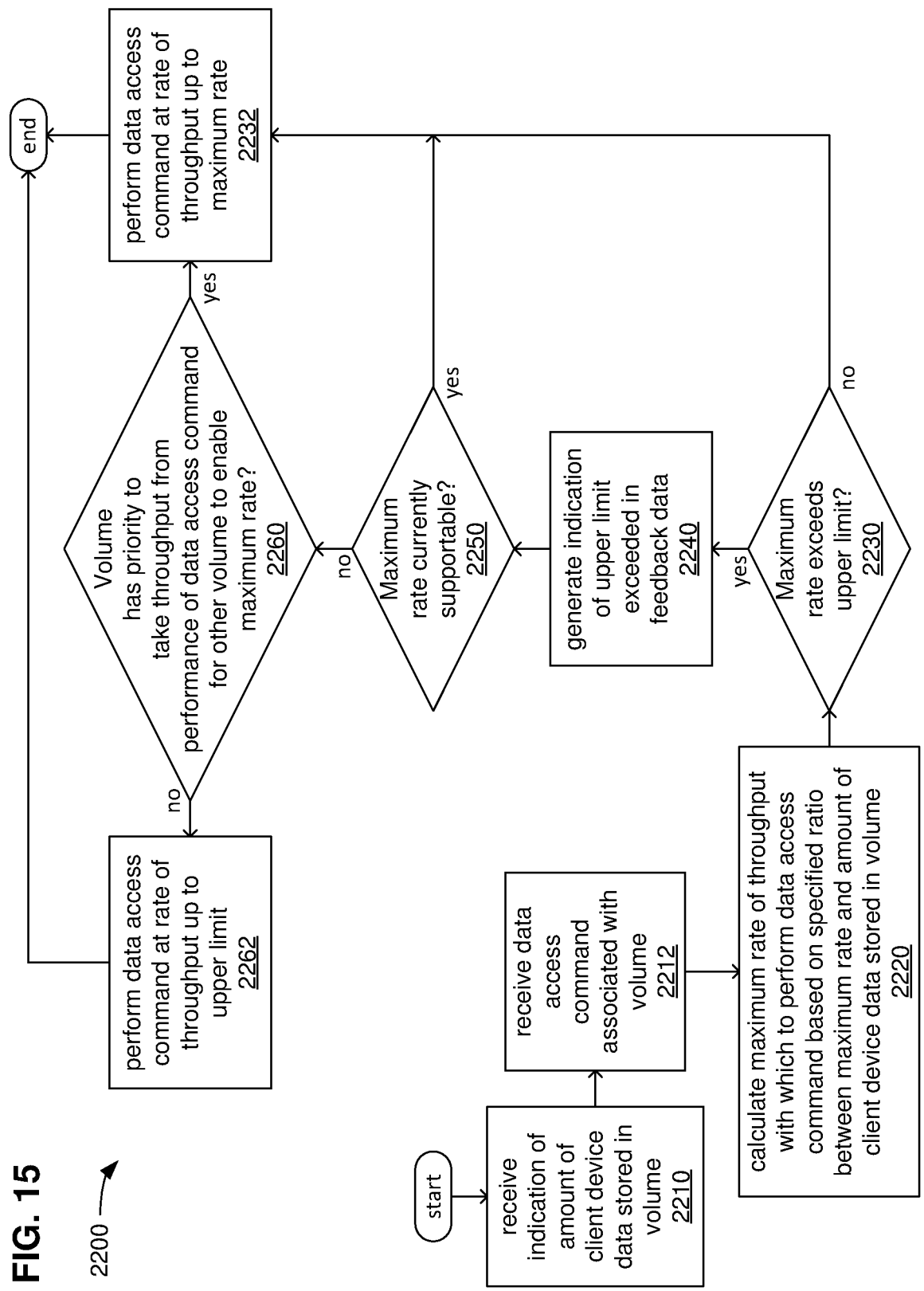
FIG. 15 illustrates a logic flow of controlling a rate of throughput.

FIG. 15 illustrates one embodiment of a logic flow 2200. The logic flow 2200 may be representative of some or all of the operations executed by one or more embodiments described herein. More specifically, the logic flow 2200 may illustrate operations performed by the processor component 550 in executing at least the control routine 540, and/or performed by other component(s) of a network protocol module (Network module) 500.

At 2210, a processor component of a Network module of an active node of one HA group of one cluster of a storage cluster system (e.g., the processor component 550 of a Network module 500 of one of the HA groups 1600*ab*, 1600*cd* or 1600*yz* of one of the clusters 1300*a-b* of the storage cluster system 1000) may receive an indication of an amount of client data stored in a volume of a set of storage devices coupled to the active node (e.g., an amount of the client data 130 stored within one of the volumes 873, 875 or 877 maintained within one of the sets of storage devices 800*ab* or 800*yz*). As has been discussed, a Disk module of the active node (e.g., a Disk module 600) may recurringly provide indications to the Network module of the amount of client data stored within one or more volumes maintained within a set of storage devices coupled to the active node through that Disk module.

At 2212, the processor component may receive a data access command to access client data maintained within that volume. As has been discussed, the Network module may receive requests for storage services from one or more client devices, and may translate such requests into one or more data access commands Thus, the requests for storage services and the data access commands may differ in format and/or in protocol, and there may not be a one-to-one correspondence in quantities between requests for storage and data access commands.

At 2220, the processor component may calculate a maximum rate of throughput at which commands and/or data may be exchanged as part of performing the received data access command based at least on the amount of client data stored within the volume and a rate of throughput specified for the volume. As previously discussed, the maximum rate of throughput for the volume may be specified as a ratio between the amount of client data and a rate of throughput such that the maximum rate of throughput may change as the amount of client data stored within the volume changes (e.g., the maximum rate of throughput may increase as the amount of client data stored within the volume increases).

As also previously discussed, in some embodiments, such a maximum rate of throughput may be applicable to the rate of throughput for the exchange of requests for storage services and responses thereto exchanged with one or more client devices, in which data access commands and associated data are effectively exchanged in different protocol and/or format into which and out of which they may be translated. However, in other embodiments, such a maximum rate of throughput may be applicable to the rate of throughput for the exchange of the data access commands and associated data between the Network module and another component of the storage cluster system, such as a Disk module and/or a set of storage devices.

At 2230, a check is made as to whether the maximum rate of throughput just calculated exceeds an upper limit specified for the volume. As has been discussed, in some embodiments, accommodation may be made for an instance of storing more client data than can be accommodated at a specified storage capacity of the volume by allowing the storage capacity of the volume to be increased using extra storage space in the set of storage devices. Or, as has also been discussed, the amount of client data that the volume can store may be increased through the use of deduplication. Either way, the result may be that the amount of client data stored within the volume may increase to a point that the maximum rate of throughput recurringly calculated based on that amount of client data so stored may exceed an upper limit. The upper limit may be indicative of the highest rate of throughput able to be supported by one or more components of the node at any given time in light of other activities engaged in by those components and/or based on providing some degree of margin of extra capacity of throughput. If, at 2230, the just calculated maximum rate of throughput does not exceed the upper limit (e.g., the amount of client data stored within the volume is not so great that the calculation begets a maximum rate of throughput that exceeds the upper limit), then the processor component may cooperate with a Disk module and/or the set of storage devices to perform the data access command with a rate of throughput limited to not exceed the just calculated maximum rate of throughput at 2232.

However, if the just calculated maximum rate of throughput does exceed the upper limit at 2230, then an indication of the upper limit having been exceeded may be generated at 2240 as part of feedback data that may be transmitted (or otherwise provided) to a client device and/or a configuration device, as has been discussed. Also, a check may be made at 2250 as to whether the just calculated maximum rate of throughput is currently able to be supported in view of other operations (including participation in the performance of other data access commands) that the Network module and/or other components of the node are engaged in. If the just calculated maximum rate of throughput is able to be supported in spite of exceeding the upper limit at 2250, then the data access command is performed at 2232 with a rate of throughput up to that just calculated maximum rate of throughput.

However, if the just calculated maximum rate of throughput cannot currently be supported at 2250, then a check is made at 2260 as to whether the volume has been specified as having a sufficiently high priority relative to one or more other volumes such that the rate(s) of throughput associated with the one or more other volumes may be reduced to enable the just calculated maximum rate of throughput to be supported. If the relative priorities are such that the rate(s) associated with the one or more other volumes are able to be reduced, then the data access command is performed at 2232 with a rate of throughput up to that just calculated maximum rate of throughput. However, if the priority specified for the volume is not such at 2260 that such a reduction in rate of throughput for the one or more other volumes can be made, then the data access command is performed at 2262 with a rate of throughput up to the upper limit.

Figure 16:
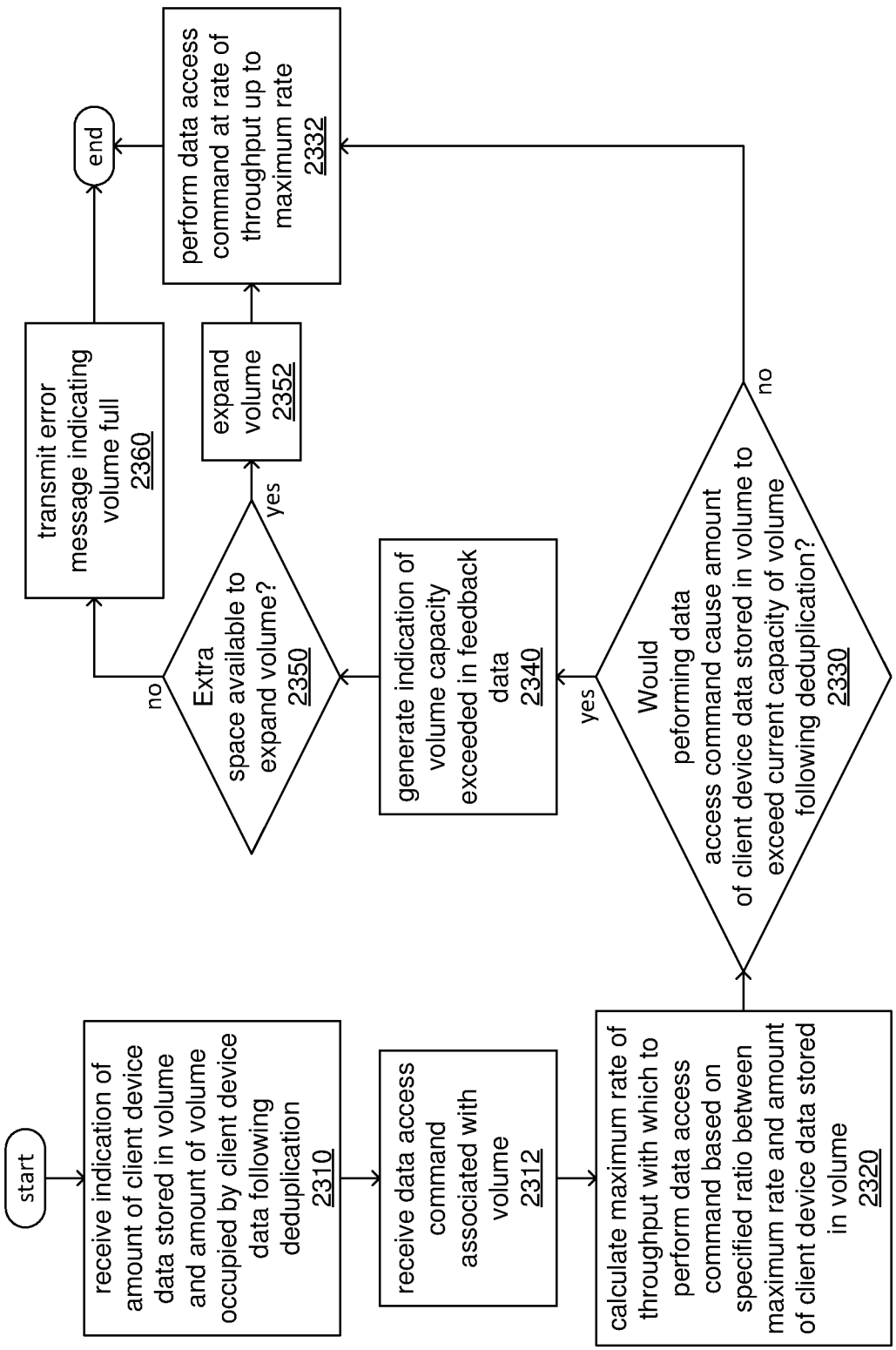
FIG. 16 illustrates another logic flow of controlling a rate of throughput.

FIG. 16 illustrates one embodiment of a logic flow 2300. The logic flow 2300 may be representative of some or all of the operations executed by one or more embodiments described herein. More specifically, the logic flow 2300 may illustrate operations performed by the processor component 550 in executing at least the control routine 540, and/or performed by other component(s) of a network protocol module (Network module) 500.

At 2310, a processor component of a Network module of an active node of one HA group of one cluster of a storage cluster system (e.g., the processor component 550 of a Network module 500 of one of the HA groups 1600ab, 1600cd or 1600yz of one of the clusters 1300a-b of the storage cluster system 1000) may receive an indication of an amount of client data stored in a volume of a set of storage devices coupled to the active node (e.g., an amount of the client data 130 stored within one of the volumes 873, 875 or 877 maintained within one of the sets of storage devices 800ab or 800yz), and may receive an indication of the amount of space within the volume that is actually occupied by the client data following the use of one or more deduplication techniques. As has been discussed, a Disk module of the active node (e.g., a Disk module 600) may recurringly provide indications to the Network module of the amount of client data stored and/or space occupied by that client data within one or more volumes maintained within a set of storage devices coupled to the active node through that Disk module.

At 2312, the processor component may receive a data access command to access client data maintained within that volume. Again, the Network module may receive requests for storage services from one or more client devices, and may translate such requests into one or more data access commands as a result of the requests for storage services and the data access commands may differing in format and/or in protocol.

At 2320, the processor component may calculate a maximum rate of throughput at which commands and/or data may be exchanged as part of performing the received data access command based at least on the amount of client data stored within the volume and a rate of throughput specified for the volume. As previously discussed, the indication of the amount of space occupied within the volume by the client data may not be used in calculating the maximum rate of throughput as a result of a presumption that the amount of client data that is stored is likely to be reflective of the level of activity in accessing it that is to be expected, whereas the amount of space in the volume that is actually occupied is more reflective of the ability of a deduplication algorithm to reduce its space requirements.

At 2330, a check is made as to whether performing the data access command would result in an attempt to store more client data in the volume than the current storage capacity of the volume would allow. If the current storage capacity of the volume would not be exceeded, then the processor component may cooperate with a Disk module and/or the set of storage devices to perform the data access command with a rate of throughput limited to not exceed the just calculated maximum rate of throughput at 2332.

However, if at 2330, the current storage capacity of the volume would be exceeded, then an indication of a data access command that results in the current storage capacity of the volume being exceeded may be generated at 2340 as part of feedback data that may be transmitted (or otherwise provided) to a client device and/or a configuration device, as has been discussed. Also, a check may be made at 2350 as to whether there is extra space available to at least temporarily expand the storage capacity of the volume. If the storage capacity of the volume can be expanded, then such an expansion of the volume may be effected at 2352, and then the data access command is performed at 2232 with a rate of throughput up to that just calculated maximum rate of throughput.

However, if at 2350, the volume cannot be expanded to increase its storage capacity, then the processor component may transmit an error message indicating that the volume is full back to the client device that originally transmitted the storage services request from which the data access command was translated. Alternatively or additionally, such an error message may be transmitted back to a configuration device as a more immediate form of feedback.

Figure 17:
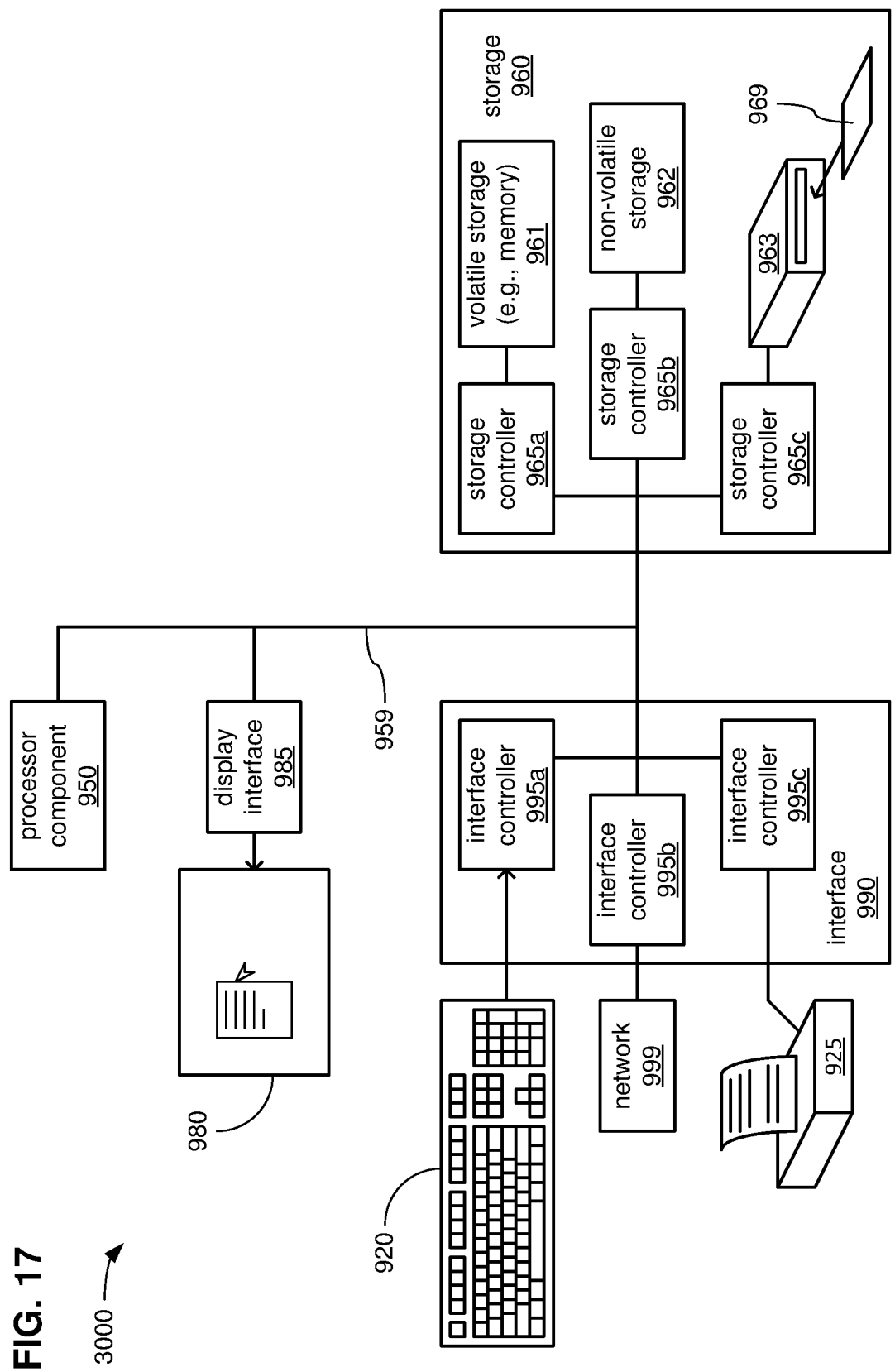
FIG. 17 illustrates a processing architecture according to an embodiment.

FIG. 17 illustrates an embodiment of an exemplary processing architecture 3000 suitable for implementing various embodiments as previously described. More specifically, the processing architecture 3000 (or variants thereof) may be implemented as part of one or more of the client devices 100, the Management modules 400, the Network modules 500, the Disk modules 600 or the sets of storage devices 800ab, 800cd or 800yz. It should be noted that components of the processing architecture 3000 are given reference numbers in which the last two digits correspond to the last two digits of reference numbers of at least some of the components earlier depicted and described as part of the modules 400, 500 and 600. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, a software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device includes at least a processor component 950, an internal storage 960, an interface 990 to other devices, and a coupling 959. As will be explained, depending on various aspects of a computing device implementing the processing architecture 3000, including its intended use and/or conditions of use, such a computing device may further include additional components, such as without limitation, a display interface 985.

The coupling 959 includes one or more buses, point-to-point interconnects, transceivers, buffers, crosspoint switches, and/or other conductors and/or logic that communicatively couples at least the processor component 950 to the internal storage 960. Coupling 959 may further couple the processor component 950 to one or more of the interface 990 and the display interface 985 (depending on which of these and/or other components are also present). With the processor component 950 being so coupled by couplings 959, the processor component 950 is able to perform the various ones of the tasks described at length, above, for whichever one(s) of the aforedescribed computing devices implement the processing architecture 3000. Coupling 959 may be implemented with any of a variety of technologies or combinations of technologies by which signals are optically and/or electrically conveyed. Further, at least portions of couplings 959 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to the processor components 450, 550 and 650) may include any of a wide variety of commercially available processors, employing any of a wide variety of technologies and implemented with one or more cores physically combined in any of a number of ways.

As previously discussed, the internal storage 960 (corresponding to the memories 460, 560 and 660) may be made up of one or more distinct storage devices based on any of a wide variety of technologies or combinations of technologies. More specifically, as depicted, the internal storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the internal storage 960 as possibly including multiple distinct types of storage is in recognition of the commonplace use of more than one type of storage device in computing devices in which one type provides relatively rapid reading and writing capabilities enabling more rapid manipulation of data by the processor component 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 959 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 959 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 959 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data.

Thus, a routine including a sequence of instructions to be executed by the processor component 950 may initially be stored on the machine-readable storage medium 969, and the removable media storage 963 may be subsequently employed in copying that routine to the non-volatile storage 962 for long-term storage not requiring the continuing presence of the machine-readable storage medium 969 and/or the volatile storage 961 to enable more rapid access by the processor component 950 as that routine is executed.

As previously discussed, the interface 990 (possibly corresponding to the interfaces 490 or 590) may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network made up of one or more links, smaller networks, or perhaps the Internet). The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, a microphone to monitor sounds of persons to accept commands and/or data signaled by those persons via voice or other sounds they may make, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 980), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

The invention claimed is:

1. A computing device comprising:
a memory comprising instructions for performing a method; and
a processor coupled to the memory, the processor configured to execute the instructions to cause the processor to:
translate a request for storage services received from a client device into a data access command associated client data by translating between
a first protocol used to exchange the client data between a first node and the client device and a second protocol used to exchange the client data between the first node and a first volume of a first storage device; and
adjust a rate of throughput of exchanging the client data between the first node and the client device proportional to an amount of data stored within the first volume.

2. The computing device of claim 1, wherein the instructions cause the processor to:
adjust the rate of throughput to decrease a rate of the client device sending the client data to the first node based upon the first volume becoming a threshold amount full.

3. The computing device of claim 1, wherein the instructions cause the processor to:
calculate a first maximum rate of throughput based on a first amount of client data stored within the first volume of the first storage device coupled to the first node of a storage cluster system.

4. The computing device of claim 3, wherein the instructions cause the processor to:
limit the rate of throughput based upon the first maximum rate of throughput.

5. The computing device of claim 1, wherein the instructions cause the processor to:
transmit a replica of the data access command to a second node to enable performance of the replica by the second node to alter client data stored within a second volume within a second storage device coupled to the second node at least partially in parallel with the performance of the data access command, the performances of the data access command and the replica to cause the client data stored within the second volume to mirror the client data stored within the first volume.

6. The computing device of claim 1, wherein the instructions cause the processor to:
reduce duplicate portions of the client data stored within the first volume to enable an increase in a first amount of client data stored within the first volume beyond a limit imposed by a storage capacity specified for the first volume.

7. The computing device of claim 6, wherein the instructions cause the processor to:
determine whether to reduce a first maximum rate of throughput to an upper limit rate of throughput specified for the first volume based on whether the first maximum rate of throughput combined with a second maximum rate of throughput exceeds an overall limit on rate of throughput imposed by the first node, the second maximum rate of throughput based on a second amount of client data stored within a second volume defined within the first storage device.

8. The computing device of claim 3, wherein the instructions cause the processor to:
limit a second rate of throughput of exchanging the client data between the first node and the first volume based upon the first maximum rate of throughput.

9. A computer-implemented method comprising:
translating a request for storage services received from a client device into a data access command associated client data by translating between
a first protocol used to exchange the client data between a first node and the client device and a second protocol used to exchange the client data between the first node and a first volume of a first storage device; and
adjusting a rate of throughput of exchanging the client data between the first node and the client device proportional to an amount of data stored within the first volume.

10. The computer-implemented method of claim 9, comprising:
limiting a second rate of throughput of exchanging the client data between the first node and the first volume.

11. The computer-implemented method of claim 9, comprising:
calculating a first maximum rate of throughput based on a first amount of client data stored within the first volume of the first storage device coupled to the first node of a storage cluster system.

12. The computer-implemented method of claim 11, comprising:
limiting the rate of throughput based upon the first maximum rate of throughput.

13. The computer-implemented method of claim 11, comprising:
recurringly calculating the first maximum rate of throughput in response to passage of a recurring interval of time.

14. The computer-implemented method of claim 12, comprising:
transmitting a replica of the data access command to a second node to enable performance of the replica by the second node to alter client data stored within a second volume within a second storage device coupled to the second node at least partially in parallel with the performance of the data access command, the performances of the data access command and the replica to cause the client data stored within the second volume to mirror the client data stored within the first volume.

15. The computer-implemented method of claim 9, comprising:
reducing duplicate portions of the client data stored within the first volume to enable an increase in a first amount of client data stored within the first volume beyond a limit imposed by a storage capacity specified for the first volume.

16. A non-transitory machine-readable storage medium comprising instructions that when executed by a machine, cause the machine to:
translate a request for storage services received from a client device into a data access command associated client data by translating between
a first protocol used to exchange the client data between a first node and the client device and a second protocol used to exchange the client data between the first node and a first volume of a first storage device; and
adjust a rate of throughput of exchanging the client data between the first node and the client device proportional to an amount of data stored within the first volume.

17. The non-transitory machine-readable storage medium of claim 16, wherein the instructions cause the machine to:
calculate a first maximum rate of throughput based on a first amount of client data stored within the first volume of the first storage device coupled to the first node of a storage cluster system.

18. The non-transitory machine-readable storage medium of claim 17, wherein the instructions cause the machine to:
limit the rate of throughput based upon the first maximum rate of throughput.

19. The non-transitory machine-readable storage medium of claim 17, wherein the instructions cause the machine to:
limit a second rate of throughput of exchanging the client data between the first node and the first volume based upon the first maximum rate of throughput.

20. The non-transitory machine-readable storage medium of claim 16, wherein the instructions cause the machine to:
transmit a replica of the data access command to a second node to enable performance of the replica by the second node to alter client data stored within a second volume within a second storage device coupled to the second node at least partially in parallel with the performance of the data access command, the performances of the data access command and the replica to cause the client data stored within the second volume to mirror the client data stored within the first volume.

* * * * *